United States Patent [19]

Agrawala et al.

[11] 4,183,013
[45] Jan. 8, 1980

[54] SYSTEM FOR EXTRACTING SHAPE FEATURES FROM AN IMAGE

[75] Inventors: Ashok K. Agrawala, Silver Springs, Md.; Ashok V. Kulkarni, Watertown; Edwin H. Paul, Jr., Natick, both of Mass.

[73] Assignee: Coulter Electronics, Inc., Hialeah, Fla.

[21] Appl. No.: 745,912

[22] Filed: Nov. 29, 1976

[51] Int. Cl.² .............................................. G06K 9/12
[52] U.S. Cl. ........................ 340/146.3 AC; 235/92 PC
[58] Field of Search ............... 340/146.3 AC, 146.3 J, 340/146.3 AE, 146.3 MA, 146.3 D, 146.3 H; 235/92 PC

[56] References Cited

U.S. PATENT DOCUMENTS

| | | | |
|---|---|---|---|
| 3,178,688 | 4/1965 | Hill et al. | 340/146.3 AC |
| 3,347,981 | 10/1967 | Kagan et al. | 340/146.3 H |
| 3,408,485 | 10/1968 | Scott et al. | 235/92 PC |
| 3,873,972 | 3/1975 | Levine | 340/146.3 AC |
| 4,048,615 | 9/1977 | Chuang et al. | 340/146.3 AC |
| 4,103,287 | 7/1978 | Frank | 340/146.3 AC |
| 4,107,648 | 8/1978 | Frank | 340/146.3 H |
| 4,115,804 | 9/1978 | Morton et al. | 235/92 PC |
| 4,115,805 | 9/1978 | Morton | 235/92 PC |
| 4,115,806 | 9/1978 | Morton | 235/92 PC |

FOREIGN PATENT DOCUMENTS 1253302  11/1971  United Kingdom .......... 340/146.3 AC

OTHER PUBLICATIONS

Grimsdale et al., "A System for the Automatic Rec. of Patterns" I.E.E. Paper No. 27, *Proc. of I.E.E.*, vol. 106, Pt.B, No. 26, Mar., 1959, pp. 210–221.

Nolan, "Line/Symbol Separation for Raster Image Processing" *IBM Tech. Disclosure Bulletin*, vol. 15, No. 12, May 1973, pp. 3879–3883.

*Primary Examiner*—Leo H. Boudreau
*Attorney, Agent, or Firm*—Kenway & Jenney

[57] ABSTRACT

A system for sequentially processing an image in order to identify objects in the image, and extract a variety of shape features of the identified objects. The system includes an image preprocessor, a controller, an object boundary resolver and identifier and a feature extractor. The image preprocessor scans the image and generates digital scan line signals wherein each bit is representative of a detected characteristic of an elemental region associated with a current scan position in the image. The object boundary resolver and identifier identifies object edge points from the digital scan line signals and maintains edge point data records representative of the position of the edge points in the two most recent scan lines. The resolver and identifier further processes the edge point data to identify continuation, creation, termination and merge conditions for the various objects within the image. For each of the identified objects, the feature extractor determines the presence of various shape features for the identified objects. These features include object count, perimeter (P), area (A), $P^2/A$, moments, neck features and segmentation features. All the features identified by the feature extractor are extracted in a single pass, sequential processing of the image.

116 Claims, 46 Drawing Figures

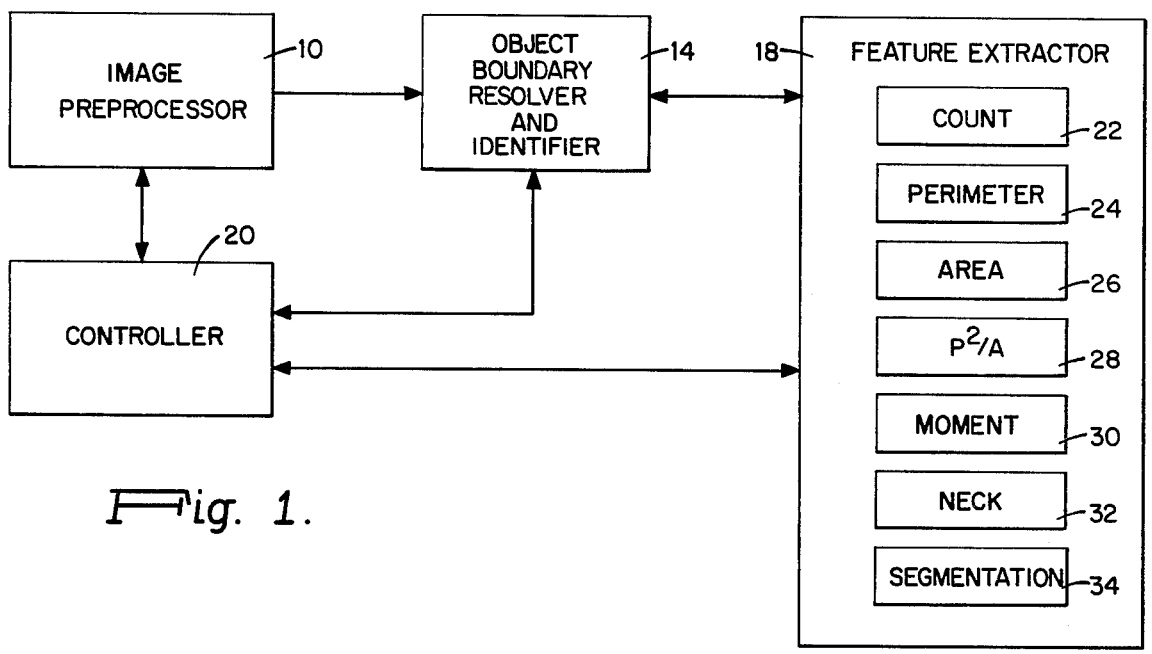
Fig. 1.
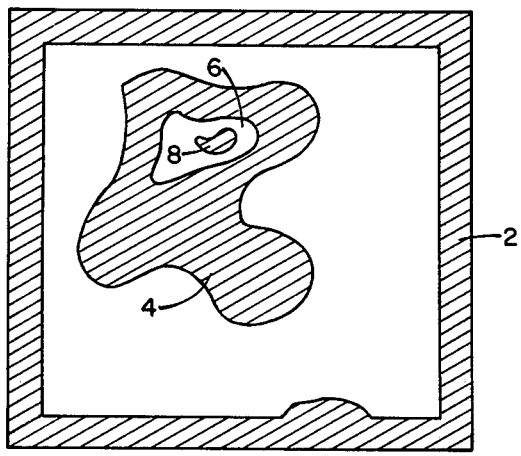
Fig. 2.
| | EDGE POINT | $X_{L1}(k-1)$ | $X_{R1}(k-1)$ | ... |
|---|---|---|---|---|
| LINE k-1 | OBJECT NO | $O_{L1}(k-1)$ | $O_{R1}(k-1)$ | ... |
| LINE k | EDGE POINT | $X_{L1}(k)$ | $X_{R1}(k)$ | ... |
| | OBJECT NO | $O_{L1}(k)$ | $O_{R1}(k)$ | ... |
Fig. 3A.
| OBJECT NO | TYPE | PARENT | STATUS | FEATURE 1 | FEATURE 2 | ... |
|---|---|---|---|---|---|---|
| 1 | | | | | | |
| 2 | | | | | | |
| 3 | | | | | | |
| . | | | | | | |
| . | | | | | | |
Fig. 3B.

*Fig. 9I.*

| SCAN LINE MEMORY | | | | | | |
|---|---|---|---|---|---|---|
| LINE NO | EDGE PT | 6 | 11 | 19 | 36 | |
| 6 | OBJ NO | A | C | C | A | |
| LINE NO | EDGE PT | 19 | 25 | 28 | 36 | |
| 7 | OBJ NO | A | D | D | A | |

END OF SCAN LINE 7

| OBJECT MEMORY | | | |
|---|---|---|---|
| OBJ NO | TYPE | PARENT | STATUS |
| A | BODY | 0 | CONTIN |
| B | HOLE | A | TERM |
| C | HOLE | A | MERG |
| D | HOLE | A | CONTIN |

*Fig. 9J.*

| SCAN LINE MEMORY | | | | | | |
|---|---|---|---|---|---|---|
| LINE NO | EDGE PT | 19 | 25 | 28 | 36 | |
| 7 | OBJ NO | A | D | D | A | |
| LINE NO | EDGE PT | 19 | 24 | 30 | 35 | |
| 8 | OBJ NO | A | D | D | A | |

END OF SCAN LINE 8

| OBJECT MEMORY | | | |
|---|---|---|---|
| OBJ NO | TYPE | PARENT | STATUS |
| A | BODY | 0 | CONTIN |
| B | HOLE | A | TERM |
| C | HOLE | A | MERG |
| D | HOLE | A | CONTIN |

*Fig. 9K.*

| SCAN LINE MEMORY | | | | | | |
|---|---|---|---|---|---|---|
| LINE NO | EDGE PT | 19 | 24 | 30 | 35 | |
| 8 | OBJ NO | A | D | D | A | |
| LINE NO | EDGE PT | 19 | 24 | | | |
| 9 | OBJ NO | A | A | | | |

END OF SCAN LINE 9

| OBJECT MEMORY | | | |
|---|---|---|---|
| OBJ NO | TYPE | PARENT | STATUS |
| A | BODY | 0 | CONTIN |
| B | HOLE | A | TERM |
| C | HOLE | A | MERG |
| D | HOLE | A | MERG |

*Fig. 9L.*

| SCAN LINE MEMORY | | | | | | |
|---|---|---|---|---|---|---|
| LINE NO | EDGE PT | 19 | 24 | | | |
| 9 | OBJ NO | A | A | | | |
| LINE NO | EDGE PT | 0 | 0 | | | |
| 10 | OBJ NO | | | | | |

END OF SCAN LINE 10

| OBJECT MEMORY | | | |
|---|---|---|---|
| OBJ NO | TYPE | PARENT | STATUS |
| A | BODY | 0 | TERM |
| B | HOLE | A | TERM |
| C | HOLE | A | MERG |
| D | HOLE | A | MERG |

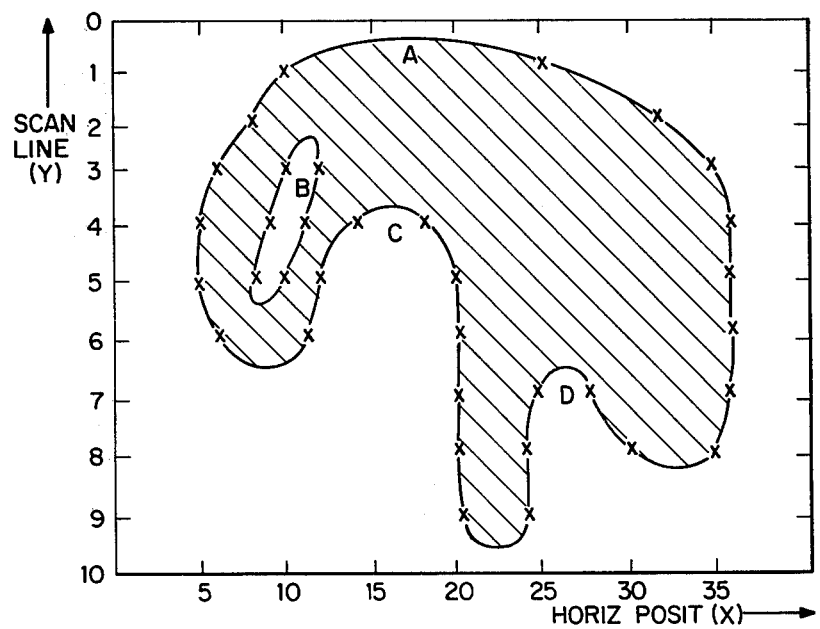

SCAN LINE MEMORY

| LINE NO | EDGE PT | 0 | 0 | 0 | 0 | 0 |
|---|---|---|---|---|---|---|
| 0 | OBJ NO | 0 | 0 | 0 | 0 | 0 |
| LINE NO | EDGE PT | 10 | 25 | | | |
| 1 | OBJ NO | | | | | |

DURING SCAN LINE 1

OBJECT MEMORY

| OBJ NO | TYPE | PARENT | STATUS |
|---|---|---|---|
| 0 | 0 | 0 | 0 |

Fig. 9B.

SCAN LINE MEMORY

| LINE NO | EDGE PT | 0 | 0 | | | |
|---|---|---|---|---|---|---|
| 0 | OBJ NO | | | | | |
| LINE NO | EDGE PT | 10 | 25 | 0 | | |
| 1 | OBJ NO | A | A | | | |

END OF SCAN LINE 1

OBJECT MEMORY

| OBJ NO | TYPE | PARENT | STATUS |
|---|---|---|---|
| A | BODY | 0 | CONTIN |

Fig. 9C.

SCAN LINE MEMORY

| LINE NO | EDGE PT | 10 | 25 | | | |
|---|---|---|---|---|---|---|
| 1 | OBJ NO | A | A | | | |
| LINE NO | EDGE PT | 8 | 32 | | | |
| 2 | OBJ NO | A | A | | | |

END OF SCAN LINE 2

OBJECT MEMORY

| OBJ NO | TYPE | PARENT | STATUS |
|---|---|---|---|
| A | BODY | 0 | CONTIN |

Fig. 9D.

SCAN LINE MEMORY

| LINE NO | EDGE PT | 8 | 32 | | | |
|---|---|---|---|---|---|---|
| 2 | OBJ NO | A | A | | | |
| LINE NO | EDGE PT | 6 | 10 | 12 | 35 | |
| 3 | OBJ NO | A | B | B | A | |

END OF SCAN LINE 3

OBJECT MEMORY

| OBJ NO | TYPE | PARENT | STATUS |
|---|---|---|---|
| A | BODY | 0 | CONTIN |
| B | HOLE | A | CONTIN |

Fig. 9E.

SCAN LINE MEMORY

| LINE NO | EDGE PT | 6 | 10 | 12 | 35 | |
|---|---|---|---|---|---|---|
| 3 | OBJ NO | A | B | B | A | |
| LINE NO | EDGE PT | 5 | 9 | 11 | 14 | 18 | 36 |
| 4 | OBJ NO | A | B | B | C | C | A |

END OF SCAN LINE 4

OBJECT MEMORY

| OBJ NO | TYPE | PARENT | STATUS |
|---|---|---|---|
| A | BODY | 0 | CONTIN |
| B | HOLE | A | CONTIN |
| C | HOLE | A | CONTIN |

Fig. 9F.

SCAN LINE MEMORY

| LINE NO | EDGE PT | 5 | 9 | 11 | 14 | 18 | 36 |
|---|---|---|---|---|---|---|---|
| 4 | OBJ NO | A | B | B | C | C | A |
| LINE NO | EDGE PT | 5 | 8 | 10 | 12 | 19 | 36 |
| 5 | OBJ NO | A | B | B | C | C | A |

END OF SCAN LINE 5

OBJECT MEMORY

| OBJ NO | TYPE | PARENT | STATUS |
|---|---|---|---|
| A | BODY | 0 | CONTIN |
| B | HOLE | A | CONTIN |
| C | HOLE | A | CONTIN |

Fig. 9G.

SCAN LINE MEMORY

| LINE NO | EDGE PT | 5 | 8 | 10 | 12 | 19 | 36 |
|---|---|---|---|---|---|---|---|
| 5 | OBJ NO | A | B | B | C | C | A |
| LINE NO | EDGE PT | 6 | 11 | 19 | 36 | | |
| 6 | OBJ NO | A | C | C | A | | |

END OF SCAN LINE 6

OBJECT MEMORY

| OBJ NO | TYPE | PARENT | STATUS |
|---|---|---|---|
| A | BODY | 0 | CONTIN |
| B | HOLE | A | TERM |
| C | HOLE | A | CONTIN |

Fig. 9H.

SCAN LINE MEMORY

| LINE NO | EDGE PT | 6 | 11 | 19 | 36 | |
|---|---|---|---|---|---|---|
| 6 | OBJ NO | A | C | C | A | |
| LINE NO | EDGE PT | 19 | 25 | 28 | 36 | |
| 7 | OBJ NO | A | | | | |

DURING SCAN LINE 7 AFTER CONTINUATION AT X=19

OBJECT MEMORY

| OBJ NO | TYPE | PARENT | STATUS |
|---|---|---|---|
| A | BODY | 0 | CONTIN |
| B | HOLE | A | TERM |
| C | HOLE | A | MERG |

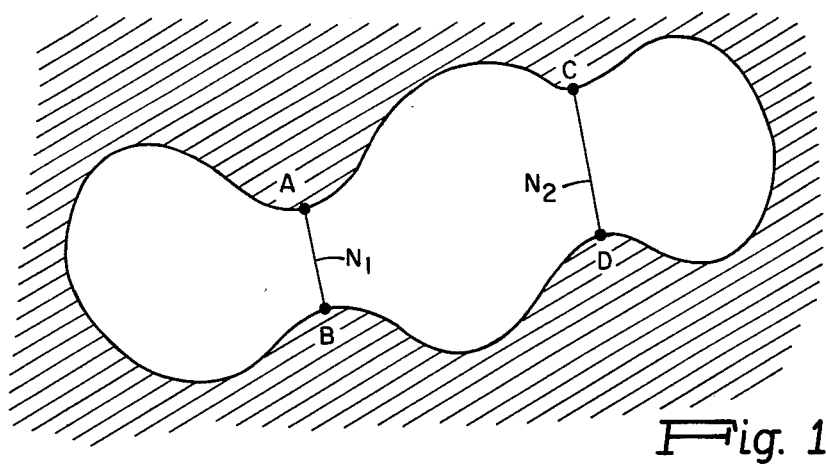
Fig. 10.
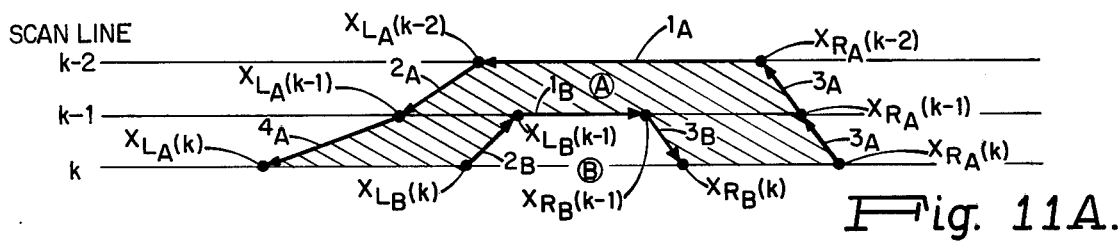
Fig. 11A.
| OBJ NO | SEG NO | SEGMENT COORDINATES | | | |
|---|---|---|---|---|---|
| | | START | | STOP | |
| | | X | Y | X | Y |
| A | $1_A$ | $X_{R_A}(k-2)$ | k-2 | $X_{L_A}(k-2)$ | k-2 |
| A | $2_A$ | $X_{L_A}(k-2)$ | k-2 | $X_{L_A}(k-1)$ | k-1 |
| A | $3_A$ | $X_{R_A}(k)$ | k | $X_{R_A}(k-2)$ | k-2 |
| A | $4_A$ | $X_{L_A}(k-1)$ | k-1 | $X_{L_A}(k)$ | k |
| B | $1_B$ | $X_{L_B}(k-1)$ | k-1 | $X_{R_B}(k-1)$ | k-1 |
| B | $2_B$ | $X_{L_B}(k)$ | k | $X_{L_B}(k-1)$ | k-1 |
| B | $3_B$ | $X_{R_B}(k-1)$ | k-1 | $X_{R_B}(k)$ | k |
Fig. 11B.

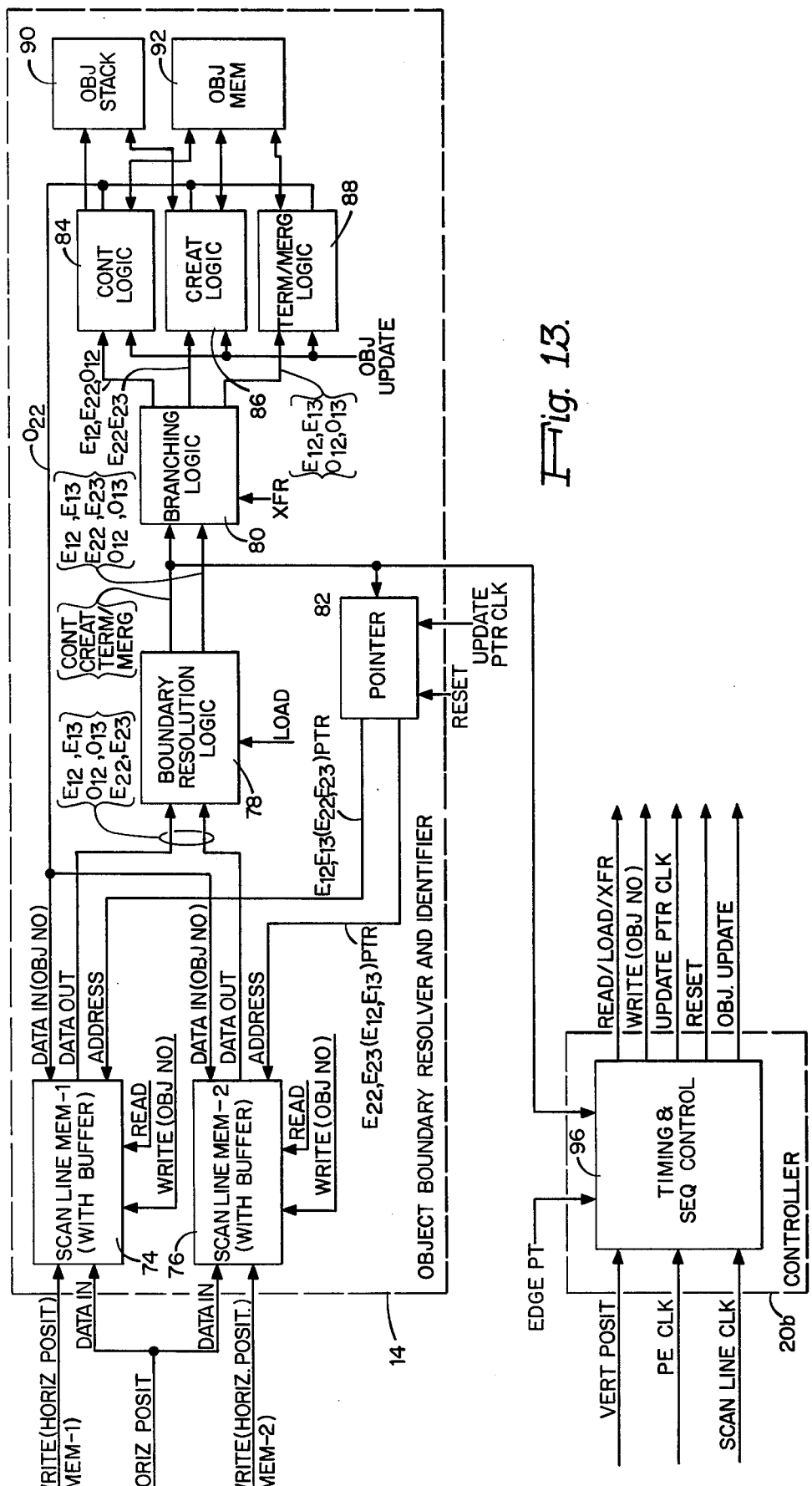

Fig. 16C.   *POINTS RESOLVED

TOP VIEW ARRAY

| ADDRESS (X) | 1 | 2 | 3 | 4 | 5 | 6 | 7 | 8 | 9 | 10 | 11 | 12 | 13 | 14 | ... | M |
|---|---|---|---|---|---|---|---|---|---|---|---|---|---|---|---|---|
| LINE NO (Y) | | | 10 | 9 | 8 | 7 | 3 | 3 | 3 | 8 | 9 | 10 | | | ... | |
| TYPE | | | L | L | L | L | T | T | T | R | R | R | | | ... | |

| SCAN LINE Y COORD | $D_L$ | | | $D_R$ | | |
|---|---|---|---|---|---|---|
| | $X_L$ COORD | MAG | END POINT (X,Y) | $X_R$ COORD | MAG | END POINT (X,Y) |
| 1 | | | | | | |
| 2 | | | | | | |
| 3 | 6 | 4 | 10,3 | 10 | 4 | 6,3 |
| 4 | 5 | 5.2 | 10,3 | 11 | 5.2 | 6,3 |
| 5 | 5 | 6 | 11,5 | 11 | 6 | 5,5 |
| 6 | 6 | 4 | 10,6 | 10 | 4 | 6,6 |
| 7 | 6 | 3* | 9,7 | 9 | 3** | 6,7 |
| 8 | 5 | 4 | 9,8 | 9 | 3.16 | 6,7 |
| 9 | 4 | 5.2 | 9,8 | 10 | 5.2 | 5,8 |
| 10 | 3 | 7.1 | 10,9 | 11 | 7.1 | 4,9 |
| 11 | | | | | | |
| 12 | | | | | | |

\* LEFT EDGE NECK  } IDENTIFIED
\*\* RIGHT EDGE NECK } AT SCAN LINE 8

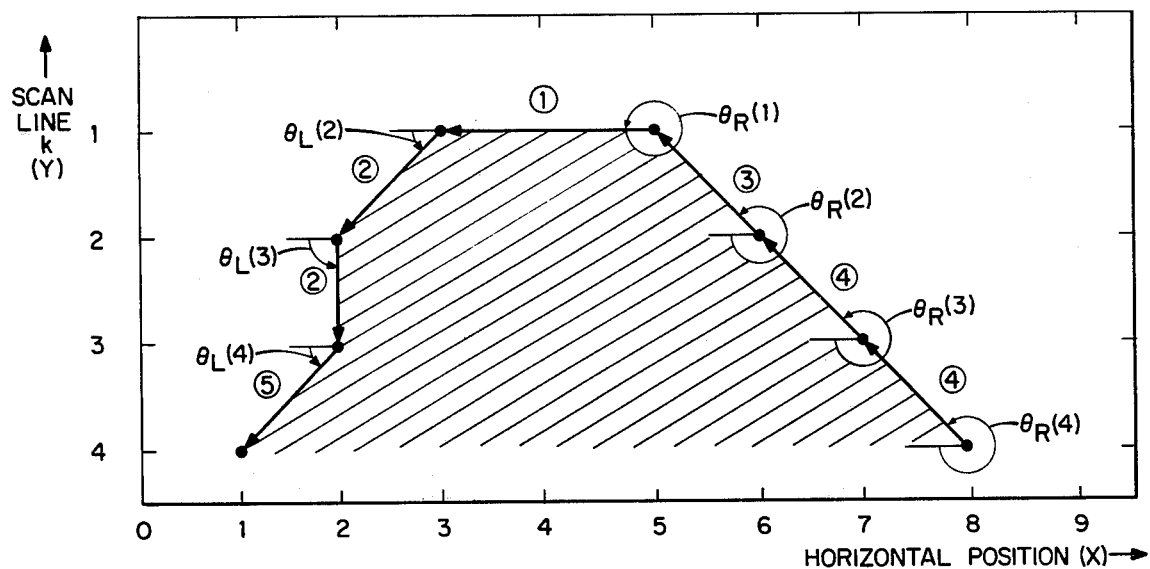
Fig. 20A.
| SCAN LINE k | $X_L(k)$ | $\theta_L(k)$ | $\Delta\theta_L(k)$ | $X_R(k)$ | $\theta_R(k)$ | $\Delta\theta_R(k)$ | SEG TYPE | SEG NO | SEG LNGTH |
|---|---|---|---|---|---|---|---|---|---|
| t1 | 1 | 3 | | | | | | | |
| t2 | 1 | | 0° | | 5 | 360° | | ST LINE | 1 | 2.0 |
| t3 | 2 | 2 | 45° | +45° | | | | CONVEX | 2 | 1.4 |
| t4 | 2 | | | | 6 | 315° | +45° | CONVEX | 3 | 1.4 |
| t5 | 3 | 2 | 90° | +45° | | | | CONVEX | 2 | 2.4 |
| t6 | 3 | | | | 7 | 315° | 0° | ST LINE | 4 | 1.4 |
| t7 | 4 | 1 | 45° | −45° | | | | CONCAVE | 5 | 1.4 |
| t8 | 4 | | | | 8 | 315° | 0° | ST LINE | 4 | 2.9 |
Fig. 20B.
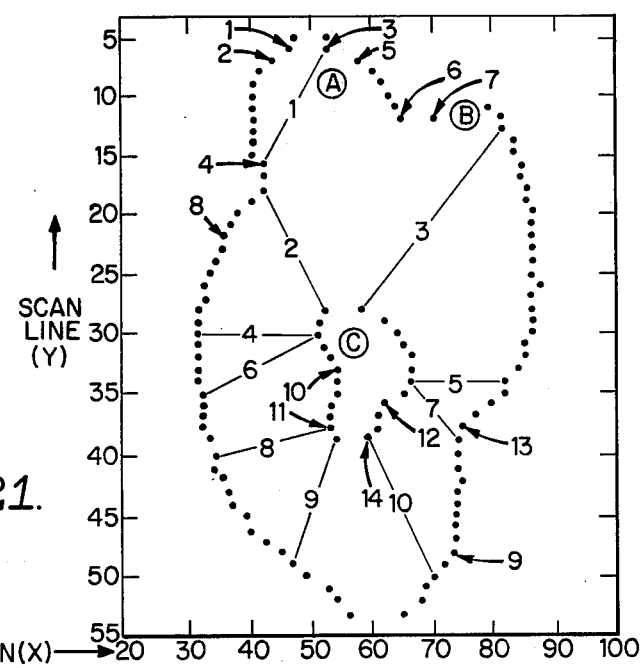
Fig. 21.

SYSTEM FOR EXTRACTING SHAPE FEATURES FROM AN IMAGE

BACKGROUND OF THE DISCLOSURE

This invention relates to systems for object recognition and more particularly, to systems for extracting features related to the shape of objects in a two dimensional image.

Automated object recognition systems have been developed with increasing sophistication in step with the development of data processing techniques and related equipment. Such systems have been applied to object recognition problems arising in a large variety of fields including biomedicine, metallurgy, cartography, character recognition, and industrial automation. Many early systems were directed to particle counting and did little more than identify and count individual objects from a group presented to a sensor. With improved technology, the prior art system capabilities have advanced to include line or contour following, pattern matching, and object shape feature extraction for elementary shape features, such as area, perimeter, moments. Much of the prior art image analysis effort has been directed to systems which detect binary characteristics of cellular regions in an image and compare regional sets of those characteristics with a predetermined set of image sub-patterns or masks. Each of the sometimes complex masks may be effectively scanned over a digital representation of the image so that a common characteristic of such shape feature extraction systems is the requirement for enormous computing resources. Typically, an entire image is stored in a memory while portions of that image are repeatedly scanned to identify the various shape features. The feature extraction techniques thus examine the image many times before extracting values for the shape features.

Certain prior art systems provide a computational advantage over the basic systems by encoding the stored data. Except for very simple features, however, even these systems require the lines of scan to be examined many times in order to convert a sequentially scanned image to the encoded form. This encoding process itself requires substantial computing resources. As a result of the complexity of the prior art feature extraction techniques, only the extraction of relatively simple features, such as area (A), perimeter (P) and $P^2/A$, is within the capability of most prior art systems.

In order to reduce the required computer resources for shape feature extraction, while still providing high speed analysis of an image, sequential processing techniques have been developed so that certain features may be extracted during a single scan of an image. See Rosenfeld, A., *Picture Processing By Compunter*, Academic Press, New York, 1962. Such techniques include the extraction of area, perimeter, and moments. U.S. Pat. No. 3,408,485 illustrates a sequential technique for identifying and counting objects in an image by first identifying portions of objects recurring in successive scan lines. However, even the known sequential techniques fail to provide feature extraction which may be used for the high speed identification of complex features with a relatively low computer resource requirement.

One particular area of use for systems identifying certain shape features of objects in two dimensional images is the field of cytology, and more particularly in systems for classifying white blood cells in a sample. Particular features of interest in such analyses are cell area, perimeter, $P^2/A$, moments, boundary segmentation, and "neck" identification. The latter feature is particulary related to recently developed diagnostic procedures which require relative population counts of band form and polymorphonuclear neutrophils, and counts of normal and atypical lymphocytes. In such applications, white blood cells are examined to determine their maturity level by evaluating the degree of necking (related to the number of lobes of a cell nucleus which are connected by a filament) present in a cell, including the number of such necks and the relative neck size. Although this evaluation of the white blood cells is currently becoming a powerful diagnostic tool in biomedicine, such cell analysis is presently possible only on a manual level, using operators who visually make such analysis through the use of microscopes or microscanning video systems. While prior studies have utilized computer analysis to identify neck features of image objects from identified object boundary points, these efforts generally require the analysis of such boundary points by making pair-wise distance measurements for all points on the object boundary on a non-sequential processing basis, requiring a substantially large number of computational procedures and correspondingly large computer resource. See for example, Rosenfeld, A., "Picture Processing: 1972", *Computer Graphics and Image Processing*, Vol. 1, 1972.

Accordingly, it is an object of the present invention to provide a system for the indentification of shape features of objects in a two dimensional image by sequentially processing data representative of the image.

Still another object is to provide a high speed and efficient system for identification of shape features of objects in a two dimensional image.

SUMMARY OF THE INVENTION

Briefly, the present invention provides a system for the sequential processing of a two dimensional image to extract relativey simple shape features, such as perimeter, area, and moments, to further extract relatively complex features, such as neck identification, size and location, and boundary segmentation. The present invention utilizes a single pass, raster-type image scan preprocessor. Each scan line is divided into a plurality of elemental regions for which a characteristic is detected to provide edge point data representative of scan line points on the succession of edges of objects along each scan line in the image.

According to the present invention, the stored edge point data for a scan line is processed sequentially as it becomes available from the scanning preprocessor, i.e., one scan line at a time in the direction of scan along the line. In addition to the storing of the data from a current line of scan, the system includes means for storage of data representative of a next previous scan line in the image. From these two lines of stored edge point data, tabular records are maintained in a scan line array for each edge point and an associated object designation identifying the objects to which the various edge points belong. Thus, the edge points for the entire image are not required to be stored, considerably reducing the system memory requirements for systems capable of analyzing relatively complex images.

In addition, the system maintains records of the line-to-line connections, or continuations, of all edge boundaries detected to the point of the current scan line in the image. As the scanning of the image continues, the boundary assignments are adjusted to accommodate objects which merge or terminate within the image. The scanning continues until the complete image has been processed.

Tabular data representations are maintained for the edge points in a current and previous scan line. Data is recorded with each edge point identified and having a corresponding object number in a scan line array. In addition, a tabular object data array is established for each identified object, the data therein being representative of the object type, the parent (or surrounding object) identification designation, and the current line status for that object, i.e. whether the body is continuing, has terminated, or has merged with another body in that line.

From the scan line array and the object array, shape features are determined in a sequential manner, retaining up-to-date information about those features. Directly determined features include: (1) number of objects and the number of objects of various types (by maintaining a count of the objects identified as terminated in the object array); (2) the perimeter of a continuing boundary (by updating a previously stored value with the incremental perimeter computed from the difference in position of the corresponding edge points in the current and next previous scan lines); and (3) the area for identified objects in a scan line (by updating a previously stored value with the incremental area computed from the difference in position between the first and second edge points for an object in the current scan line, multiplied by a scan line separation factor).

In addition, the present invention may also include means to extract neck features from an image during the single pass, sequential processing of that image. The system determines for each line of scan, and for each identified object in the line of scan, a minimum distance extending from each of the detected object boundaries to the opposite boundaries of that object in the present or previous lines of scan. As the scan line sequencing continues, the identified distances which are local minimums for the various objects are identified as neck features occurring between identified edge points of the objects encountered throung the current scan line. In alternative embodiments, either internal necks, external necks, or both may be identified by systems in accordance with the present invention. In the various embodiments, the systems may provide data representative of the end point coordinates of the various neck features so that this information may be readily provided as feature data in the tabular object data array of the system.

Systems in accordance with the present invention may also provide extraction of segmentation features during the single pass, sequential processing of an image. In accordance with this aspect of the present invention, the system effectively breaks the boundary of an identified object into primitive segments of various types and stores tabular data representative of the type, length, location, and connectivity of the segments. These segments may be for example, staight line segments, convex segments, and concave segments. In breaking identified object boundary into these primitive segments after first identifying the object in a scan line, the system examines a single scan-intercepted portion of the boundary of that object at a time, in conjuction with data representative of a previously encountered, adjacent portion of the scan boundary from which the current portion continues. The segmentation processing is initiated for object boundary edge point as soon as a boundary has been identified as continuing from a previous line to that boundary in a current scan line. A tabular list of uniquely identified segments is maintained in the system, together with data representative of the associated object, the segment length, and segment end point coordinates. This information may be maintained in various embodiments in the form of a segmentation memory.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1 shows in block diagram form, an embodiment of the present invention;

FIG. 2 shows an exemplary image suitable for feature extraction by the system of FIG. 1;

FIGS. 3A and 3B illustrate the respective memory configurations for the scan line and object arrays of the system of FIG. 1;

FIG. 8 illustrates an exemplary image for object boundary resolution and identification by the system of FIG. 1;

FIGS. 9A–9L illustrate the content of the scan line and object memories in the system of FIG. 1 during the processing of the image in FIG. 8;

FIG. 10 shows a portion of an exemplary image illustrating neck features;

FIGS. 11A–11B show a portion of an exemplary image and table illustrating segmentation features;

FIG. 13 illustrates in block diagram form, an exemplary embodiment of the object boundary resolver and identifier of the system of FIG. 1;

FIGS. 16A–16C show portions of an image for analysis by the system of FIG. 1, together with tabular data illustrating the operation of the object boundary resolver and identifier of FIG. 1;

FIGS. 20A–20B show an exemplary image for analysis by the system of FIG. 1, together with tabular data illustrating the operation of the segmentation feature extractor of the system of FIG. 1; and FIG. 21 shows a further exemplary image for analysis by the system of FIG. 1.

DESCRIPTION OF THE PREFERRED EMBODIMENT

Figure 4:
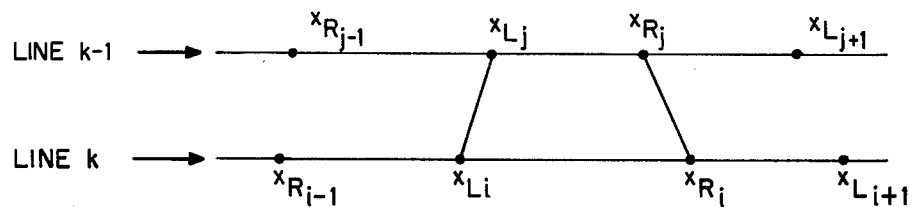
FIGS. 4–7F illustrate the conditions for the continuation, creation, termination and merge states of the system of FIG. 1.

FIG. 1 illustrates in block diagram form, a system for sequentially processing an image in order to identify objects in the image and extract a variety of shape features of the identified objects. These features may include perimeter (P), area (A), P²/A, moments, necks and segments. These specific features are merely exemplary, and not all are required for practicing the present invention, and furthermore, additional features may also be extracted in keeping with the present invention.

The illustrated system is adapted to sequentially process a two-dimensional image from digitized data representative of the image, or from the image itself, which, for example, may be a projection of a three-dimensional object. The processing is accomplished on a line-to-line basis in a manner requiring only a single pass over the image in a conventional raster scan pattern. The present embodiment may readily be configured to operate in an off-line basis from a digital data record representative of the entire image, which data record is processed sequentially on a line-by-line basis.

The present embodiment is described below in terms of a system for optically scanning a two-dimensional image. The image is defined to include one or more objects from a set having two species, defined as body objects and hole objects, respectively, having boundaries. The body objects are characterized within their respective boundaries by an optical reflectivity below a predetermined value. The body objects are contrasted against / a background (hole object) characterized by an optical reflectivity above that threshold. Furthermore, the image is defined to be bounded at its edges by regions characterized by an optical reflectivity below the predetermined threshold. Within this definition, a body object may enclose interior regions characterized by an optical reflectivity above the threshold value. The latter regions are also defined as hole objects. The hole objects, in turn, may enclose interior regions characterized as body objects, and those interior body objects may enclose interior hole objects. Thus, each object in an image may enclose at least one object of the opposite species.

FIG. 2 illustrates an exemplary image falling within this definition wherein the shaded regions represent optical reflectivities below the threshold and the non-shaded regions above the threshold. In FIG. 2 the image is surrounded at its border by region 2 and includes a body object which encloses a hole object 6, which in turn encloses body object 8.

Of course, in other embodiments of the present invention, alternative image definitions may be used. For example, the hole and body reflectivity definitions may be reversed with respect to the threshold value. As a further example, multiple gray level reflectivities may be detected so that, instead of a two species set of objects (i.e., body and hole), there may be intermediate gray level species within the set of possible objects, all of which may readily be processed by the present invention, in accordance with the principles of the present invention. In such systems, an image may comprise one or more objects of one species, with various overlying objects of other species. Although the particular detectable characteristic of the image for the presently described embodiment is optical reflectivity, other systems may utilize alternative detectable characteristics, such as but are not limited to, optical opacity, density, temperature, spectral absorbtivity, electrical conductivity, or in the case of a digitized image, multiple bit signals representative of one or more gray levels.

Thus, in some forms of the present invention, the image may comprise one or more objects, each having a boundary and being characterized within its boundary by a detectable characteristic in one of three or more non-overlapping ranges. In this form, the invention can identify, and extract features from, images having three or more species of objects (in contrast to the presently-described embodiment which processes only two such species of objects, i.e. hole and body objects).

In the present embodiment, the image preprocessor 10 is defined to scan an image by defining a rectangular array having N rows with M elemental regions in each row (or scan line), each elemental region being characterized by optical reflectivity either above or below a predetermined threshold. In the description below and also in the claims, the present embodiment is described, and equivalent embodiments are claimed, in terms of systems characterized by a raster-type scan from left to right and top to bottom over an image. This directional definition is arbitrary of course, and alternative embodiments characterized by a different scanning pattern are fully equivalent to the presently-described and claimed forms, and are considered to come within the scope of the claims. For example, such systems might scan an image from right to left, top to bottom, or from left to right, bottom to top, or right to left, bottom to top. As noted more fully below, such alternative systems are considered to be fully equivalent of the described and claimed systems and methods and are intended to be embraced therein.

In FIG. 1, an image pre-processor 10 is illustrated in conjunction with an object boundary resolver and identifier 14 and a feature extractor 18. Each of these elements is under the contrl of a controller 20. As described more fully below, the pre-processor 10 includes a video-scanner which provides a raster scan along substantially parallel lines of scan from left to right and top to bottom of the image, such as that illustrated in FIG. 2. Accordingly, a succession of N scan line video signals (one for each line of scan) is generated. An edge detector then transforms these video signals to digital scan line signals where each bit is representative of the optical reflectivity of the elemental region associated with a "current" scan position in the image.

In this embodiment, an elemental region characterized by a relatively low optical reflectivity which is immediate to the right of an elemental region characterized by a relatively high optical reflectivity, is defined as a left edge point and represents the intersection of the scan line and the left boundary of a body object (which is also the right boundary of a hole object). Similarly, an elemental region characterized by a relatively high optical reflectivity and which is immediately to the right of an elemental region characterized by a relatively low optical reflectivity, is defined as a right edge point and represents the intersection of the scan line and the right boundary of a body object (which is the left boundary of a hole object). Using the above image definition, left and right edge points always occur in pairs along a scan line. Of course, the number of left and right edge points varies from line to line, depending on the image content.

The object boundary resolver and identifer 14 generates digital signals $X_L$ and $X_R$, respectivey representing the position along the scan line of identified edge points.

In this notation used hereinafter, the "X" portion of the $X_L$ and $X_R$ notation represents the distance along a scan line of the associated edge point and the L and R portions denote the type of edge, left and right, respectively. Furthermore, in the description below, numerical indices i and j are used with the $X_L$ and $X_R$ notation to identify the relative sequential position of each edge point along a scan line.

Along the $k^{th}$ scan line, the $i^{th}$ edge point pair is denoted by $X_{Li}(k)$, $X_{Ri}(k)$, where i and k are integers and $1 < k < N$ and $1 \leq i \leq M/2$ and, similarly, along the $k-1^{th}$ scan line the $j^{th}$ edge point pair is denoted by $X_{Lj}(k-1)$, $X_{Rj}(k-1)$, where j is an integer and $1 \leq j \leq M/2$. The preprocessor 10 provides an edge point coded version of the digitized image in the field of view, in the form of a sequence of $X_L$, $X_R$ pairs for each scan line.

The object boundary resolver and identifer 14 sequentially examines the edge point encoded image data provided by the preprocessor 10 as the data becomes available, i.e., one scan line at a time and from "left" to "right" on the scan line. The block 14 stores only the edge point data for a current scan line and the next previous scan line in the image. In addition to this data, some information about various objects identified during the succession of scans is maintained. As described below, the various shape features of these objects is determined sequentially from these two lines of stored edge point data.

More particularly, the object boundary resolver and identifier 14 keeps track of the connections or continuations of all the boundaries detected so far in the scanned image. As these boundaries can only belong to identified objects, each boundary is uniquely assigned (or resolved) to a particular body or hole object. As the scanning of the image continues, a few identified boundaries may merge. The resolver and identifier 14 adjusts the boundary assignments to accommodate such mergers and the scanning continues until the complete image has been examined. Concurrently with the object boundary resolution and identification processes, the shape feature identifications are also performed by feature extractor 18 in a sequential manner so that the values for shape features can be updated for each scan line. These feature extraction processes are described more fully below.

As described briefly above, the object boundary resolver and identifier 14 stores edge point data for two consecutive scan lines in the image. This data is represented in a scan line memory configured in accordance with the array of FIG. 3A, which contains four rows and as many columns as are needed to store all the edge points likely to be identified on any single scan line. The data representative of the next previous scan line is retained in the two rows labelled line $k-1$. The first of these rows represents the horizontal (or X) position of the actual edge points, $(X_{Li}(k-1), X_{Ri}(k-1))$, for the $k-1^{th}$ line when the current scan line is k. The second row contains the object number $O_{Li}(k-1)$ associated with each edge point, wherein the object number is defined as a symbol representing the object to which the edge is determined to belong. The third and fourth rows in the scan line array represent similar data for the current (or $k^{th}$) line.

In addition, the object boundary resolver and identifier 14 maintains a cumulative data record representative of the various objects identified in an image. This data is maintained in an object array memory adapted to store object data in the format illustrated in FIG. 3B. In the object memory, each row corresponds to a different object (identified by an object number in the first column). The second column indicates the object type, i.e. hole or body object, and the third column represents the object parent, i.e. the object number of the object immediately surrounding the left and right edges of that object in the $k^{th}$ scan line. The fourth column represents the status of the object at a current time in the scanning process as described more fully below. The remaining columns are representative of features extracted in the manner more fully described below (such as object area, object perimeter, and moments).

Briefly, the object boundary resolver and identifier 14 identifies the edge points in each scan line, determines object numbers for these edge points, and stores those object numbers in association with the edge point data in the scan line array memory. Block 14 then updates the feature values and other parameters in the object array memory. In defining the identified edge points to the various objects, the edge points identified in the $k^{th}$ line are compared with the edge points identified in the next previous $(k-1^{th})$ line to determine one of four states: (1) CONTINUATION: the boundaries identified in the $k-1^{th}$ line continue in the $k^{th}$ line; (2) TERMINATION: boundaries identified in the $k-1^{th}$ line terminate between the $k-1^{th}$ and $k^{th}$ line; (3) CREATION: new boundaries are encounterd in the $k^{th}$ line which were not present in the $k-1^{th}$ line; or (4) MERGE: two new body objects in the $k-1^{th}$ line join to become a single body object in the $k^{th}$ line. Using the state definitions set fourth below, the image is processed sequentially by the object boundary resolver and identifier 14 with a set of object numbers and boundary assignments. To initialize the operation, the scan line and object array memories are initialized and then the scan line edge point data read into the various memories. The resolver and identifier 14 includes a buffering configuration so that the rates at which the object and boundary assignments are processed may be achieved independent of the edge point data rate. Of course, if these rates are matched, the system operates fully on an on-line basis.

The detailed conditions defining the various states are as follows:

1. CONTINUATION

For a left boundary at $X_{Lj}(k-1)$ to continue to $K_{Li}(k)$, the following conditions must be satisfied:

$$X_{Ri-1}(k) < X_{Lj}(k-1) < X_{Ri}(k)$$

and $$X_{Ri-1}(k-1) < X_{Li}(k) < X_{Rj}(k-1),$$

and similarly, for a right boundary, at $X_{Rj}(k-1)$ to continue at $X_{Ri}(k)$:

$$X_{Li}(k) < X_{Rj}(k-1) < X_{Li+1}(k)$$

and $$X_{Lj}(k-1) < X_{Ri}(k) < X_{Lj+1}(k-1),$$

where, in the above equations, and in the equations following below, X is representative of the horizontal position, or X coordinate on a scan line; subscripts L and R identify the associated X coordinate as a left or right edge point for a body object, respectively; k and k−1 identify the current and next previous scan lines, respectively; subscripts i and j are integer indices representative of the sequential position of the associated X coordinate in the $k^{th}$ and $k-1^{th}$ scan lines, respectively. The index k ranges between 1 and N for an image having N scan lines, and indices i and j range between 1 and M/2 for an image having M elemental regions per scan line.

In the present embodiment, the process of checking for the continuation starts from the left and goes to the right in an image, examining one boundary from the line k−1 and one from line k at a time. A left boundary may only continue as a left boundary, and, similarly, a right boundary may only continue as a right boundary since the boundaries of all objects are simply connected. Further, the indices i and j for continued boundaries are not required to be the same in the present embodiment since there may be some new boundaries on line k or discontinued boundaries on line k−1, causing an i–j index difference to exist between two continued boundary points.

FIG. 4 shows a succession of four edge points in the $k^{th}$ and $k-1^{th}$ scan lines where the left boundary at $X_{Lj}(k-1)$ continues at $X_{Li}(k)$ and the right boundary at $X_{Rj}(k-1)$ continues at $X_{Ri}(k)$.

Whenever a boundary (either left or right) at X(k−1) continues at X(k), these edge points are defined as resolved. Both edge points of these resolved end points belong to the same object, and accordingly, as the $k^{th}$ line is scanned, the object identifier enters the object number 0(k−1) in the scan line array for X(k). Following identification of a continuing boundary, all the features dependent on the single boundary of an object (e.g. perimeter) are updated in the object memory as described more fully below. Features depending on both boundaries of an object are updated if the boundary at X(k) was the second boundary for the object, i.e. the first boundary was to the left of X(k) and has already been resolved. The backpointers retained in the object array are also updated so that the next encountered edge points may be assigned appropriate object numbers

2. CREATION

A new hole object (i.e. appearing for the first time in the scanning of an image) in line k is identified when a boundary at $X_{Lj}(k-1)$ does not continue at $X_{Li}(k)$, and when:

$$X_{Li+1}(k) < X_{Rj}(k-1)$$

Figure 5A:
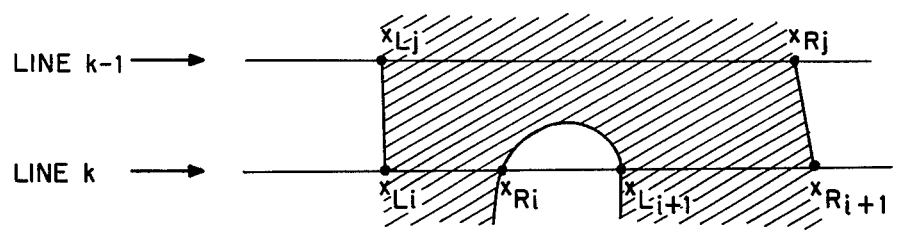

This condition is illustrated in FIG. 5A.

Similarly, a new body object is dientified when a boundary at $X_{Rj}(k-1)$ does not continue at $X_{Ri}(k)$ and when:

$$X_{Ri+1}(k) < X_{Lj+1}(k-1)$$

Figure 5B:
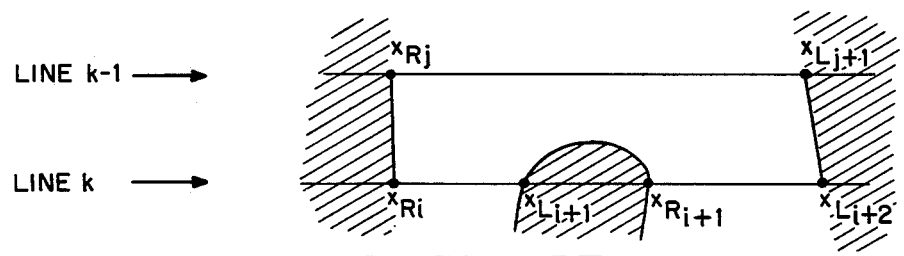

This condition is illustrated in FIG. 5B.

On detecting the condition for creation of either a new hole or body object, the object boundary resolver and identifier 14 defines the corresponding left and right edge points $X_{Ri}(k)$, $X_{Li+1}(k)$, or $X_{Li+1}(k)$, $X_{Ri+1}(k)$, to be resolved. Resolver and identifier 14 further defines a horizontal (top edge) connection between the two edge points on the $k^{th}$ line and then assigns those edge points to a unique object number representing that new object. In the present embodiment, an object number signal is stored in association with the edge point coordinate data. In addition, a new row in the object array is established for the new object with an appropriate type designation (i.e., hole or body, depending on the creation condition). Also a parent designation is entered for this object, with the parent being the next previously identified object which has only a single boundary yet encountered in the current scan line.

3. TERMINATION

An object present in the $k-1^{th}$ scan line is identified as terminated when there are no boundary points for it in the $k^{th}$ scan line.

Figure 6A:
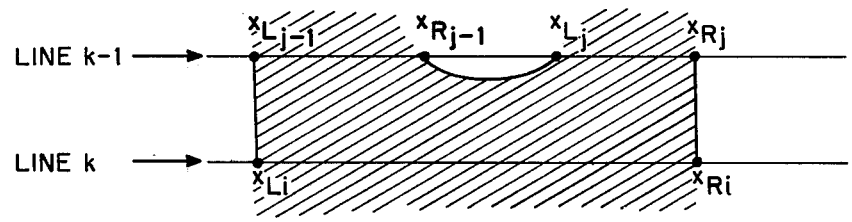

A body object is identified as terminated when an object boundary at $X_{Lj}(k-1)$ is not continued at $X_{Li}(k)$ and when:

$$X_{Rj}(k-1) < X_{Li}(k)$$

and when the object numbers stored in association with $X_{Lj}(k-1)$ and $X_{Rj}(k-1)$ are identical. This condition is illustrated in FIG. 6A.

Figure 6B:
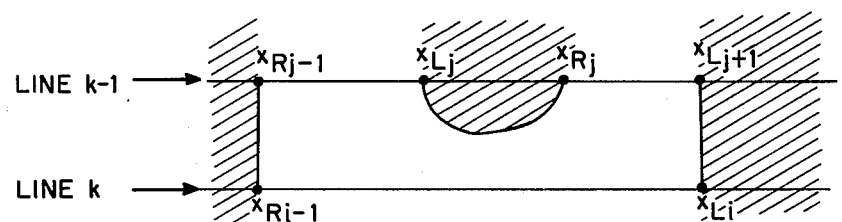

Similarly, a hole object is identified as terminated when an object boundary at $X_{Rj-1}(k-1)$ is not continued at $X_{Ri}(k)$ and $$X_{Lj}(k-1) < X_{Ri}(k)$$

and the object numbers associated with $X_{Rj-1}$ and $X_{Lj}$ are identical. This condition is illustrated in FIG. 6B.

Upon the detection of one of these conditions, the object identifier defines the corresponding edge points $X_{Rj-1}$, $X_{Lj}$ or $X_{Lj}$, $X_{Rj}$ to be resolved, indicating that the corresponding object associated with those respective end points has been traversed completely by the scans prior to line k. The feature identifier 14 further defines a horizontal (bottom edge) connection between the two edge points on line k−1 and then proceeds to update the feature computations, such as perimeter and area.

4. MERGE

When two boundaries on line k−1 do not continue to line k and when the corresponding object numbers for those two edge points are different, then the object identifier 14 determines that a horizontal connection on the k−1 line enters between the two edge points and further that the two objects have merged into a single object. In response, the object identifier 14 assigns a similar object number to the merged object and so updates the scan line array and object array memory data.

Figure 7A:
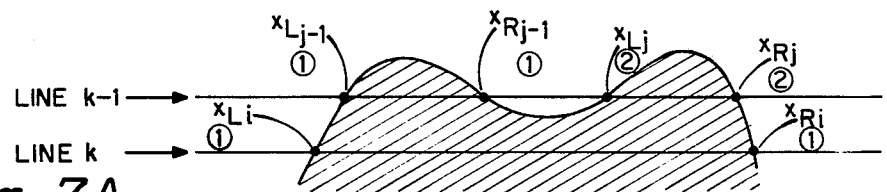
Figure 7B:
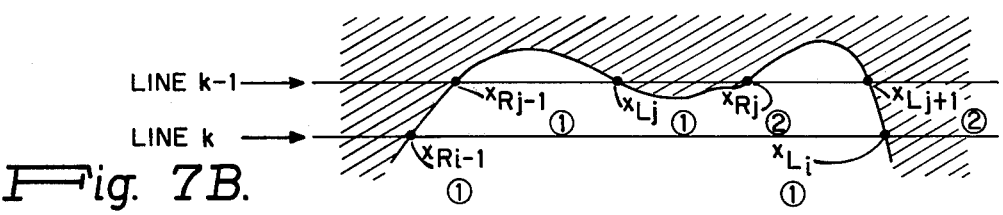
Figure 7C:
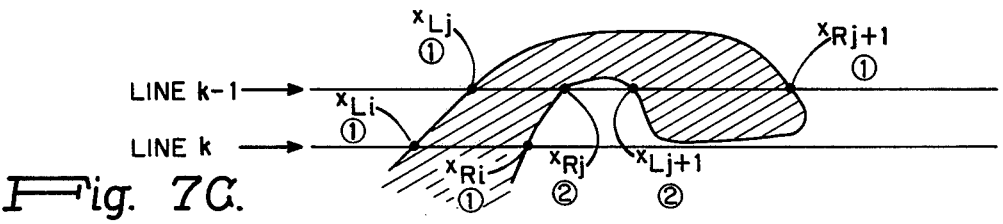
Figure 7D:
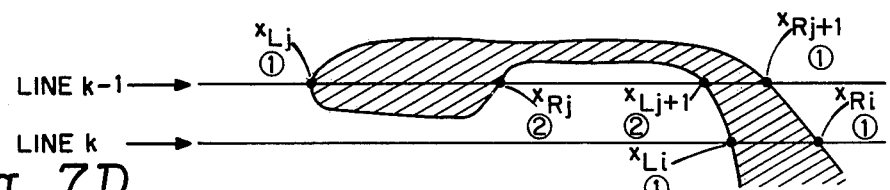
Figure 7E:
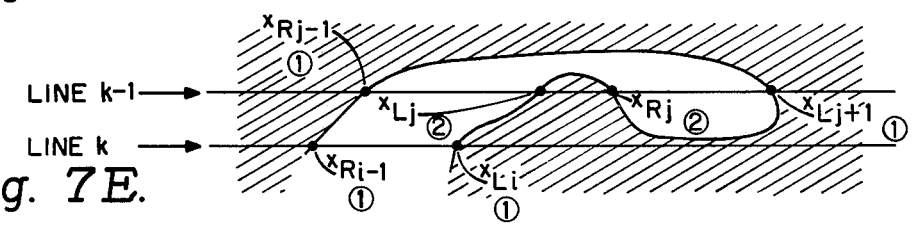
Figure 7F:
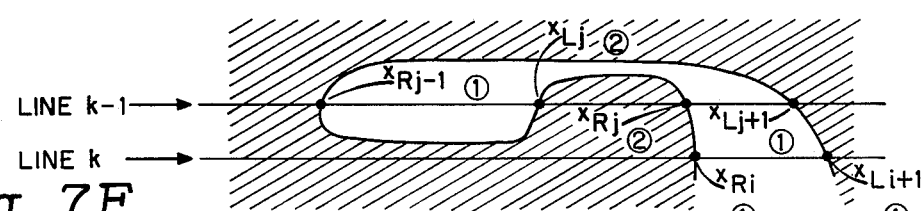

In the present embodiment, the following object merge combinations may take place:

i. two body objects are identified as merged when an object boundary at $X_{Rj-1}(k-1)$ is not continued at $X_{Ri}(k)$ and $X_{Lj}(k-1) < X_{Ri}(k)$ and the object numbers associated with $X_{Rj-1}$ and $X_{Lj}$ are representative of different body objects. This condition is illustrated in FIG. 7A. (In FIGS. 7A–7F, exemplary body object numbers for the edge points of objects in the $k-1^{th}$ and $k^{th}$ lines are denoted by the encircled numerals below the edge point designations.)

ii. two hole objects are identified as merged when an object boundary at $X_{Lj}(k-1)$ is not contined at $X_{Li}(k)$ and $X_{Rj}(k-1) < X_{Li}(k)$ and the object numbers associated with $X_{Lj-1}$ and $X_{Rj}$ are representative of different hole objects. This condition is illustated in FIG. 7B.

iii. a hole object is identified as merging with a body object when:

a. an object boundary at $X_{Lj+1}(k-1)$ is not continued at $X_{Lj}(k)$ and $X_{Rj}(k-1)<X_{Lj}(k)$ and the object number associated with $X_{Lj+1}(k-1)$ is representative of a hole object and the object number associated with $X_{Rj+1}(k-1)$ is representative of a body object; or b. an object boundary at $X_{Lj}(k-1)$ is not continued at $X_{Lj}(k)$ and $X_{Rj}(k-1)<X_{Lj}(k)$ and the object number associated with $X_{Lj}(k-1)$ is representative of a body object, and the object number associated with $X_{Rj}(k-1)$ is representative of a hole object. The latter two conditions are illustrated in FIGS. 7C and 7D, respectively.

iv. A body object is identified as merging with a hole object when:

a. an object left boundary at $X_{Rj}(k-1)$ is not contined at $X_{Rj}(k)$ and $X_{Lj+1}(k-1)<X_{Rj}(k)$ and the object number associated with $X_{Rj}(k-1)$ is representative of a body object and the object number associated with $X_{Lj+1}(k-1)$ is representative of a hole object, or b. an object boundary at $X_{Rj-1}(k-1)$ is not continued at $X_{Rj}(k)$ and $X_{Lj}(k-1)<X_{Rj}(k)$ and the object number associated with $X_{Rj-1}(k-1)$ is representative of a hole object and the object number associated with $X_{Lj}(k)$ is representative of a body object. The latter two conditions are illustrated in FIGS. 7E and 7F.

As noted above, the preferred embodiment is described in terms of image scanning from "left-to-right" and "top-to-bottom". While this particular direction of scan is merely one manner in which the image can be scanned in accordance with the present invention. Similarly, all of the image processing conditions described above are for systems operating with the "left-to-right" and "top-to-bottom" processing procedure. For clarity, the other alternatives are not set forth since the choice of particular directions of scanning and image element processing are considered to be a matter of convenience. Accordingly, corresponding conditions may readily be determined by one skilled in the art for systems which scan and process images in alternative directions. For example, a system which scans and processes images from right-to-left and bottom-to-top may be described in terms identical to those for the present embodiment, except for the interchanging of terms left and right, and the terms top and bottom.

In addition, in FIGS. 4–7F, the status definitions are shown with black and white images only corresponding to the shaded and non-shaded portion of those figures, with the shaded or black regions identified as body objects and the non-shaded portions identified as hole objects. Of course, alternative definitions may be used in lieu of these definitions. In addition, the present invention may be embodied wherein the object boundary resolver and identifier 14 may identify many classes of objects based on various gray level definitions between the so-called black and white in the illustrated embodiment. The only requirement is that the boundaries of the various objects be simply connected and that transitions from one gray level to another within a scan line may be detected. Of course, conventional technology is well adapted to provide such detection systems. Similarly, status conditions may be defined to accommodate these various gray level objects. Accordingly, it is again pointed out that the principles of the present invention may be utilized for systems having multiplicities of types of bodies characterized by various gray levels. Although the present description is confined to processing bi-level optical reflectivity (i.e. black or white) of two-dimensional images, other types of detectable characteristics may readily be utilized in accordance with the principles of this invention.

By way of example, the operation of the object identifier will now be described in conjunction with the image illustrated in FIG. 8. In FIG. 8, a complex shaped body is shown on a ten scan line grid. The boundary intercepts are noted with the edge point data for the horizontal grid arrangement of elemental regions. For convenience, the illustrated body is denoted by a reference designation A and a hole interior to that body is denoted by the reference designation B, and third and fourth bodies by designations C and D. The latter bodies B, C and D are, of course, hole objects having a parent body object A. FIGS. 9A–L represent the contents of the scan line memory and object memory at the indicated times. It should be noted that the object memory maintains a cumulative record which is updated by the processing results provided by the object boundary resolver and identifier 14 in response to the status identification for the various edge points. As indicated in the sequential operation of the object memory, the objects C and D are not actually holes in the body, but are holes which merge with the body, which condition is noted in the processing of scan lines 7 and 9, respectively. In the final form of the object memory, it should be noted that the processed image contained a single body (A) containing a single hole (B).

According to the present invention, a plurality of the subsystems within the feature extractor 18 may operate in conjunction with the object boundary resolver and identifier 14. More particularly, the feature extractor 18 as shown in FIG. 1 includes subsystems for establishing object count, perimeter, area, $P^2/A$, moment, neck and segmentation features. These subsystems are indicated in FIG. 1 by blocks 22, 24, 26, 28, 30, 32 and 34 respectively.

The particular shape features extracted in the blocks 22, 24, 26, 28, 30, 32 and 34 will now be briefly described:

1. Object Count Subsystem 22

The count subsystem 22 maintains a record of the number of identified objects of various types (for example, bodies and holes in the described embodiment). The subsystem 22 includes a counter which is incremented each time an object is terminated. Of course, in various embodiments, the number of objects in the various categories may be appropriately counted.

2. Perimeter Subsystem 24

The perimeter subsystem 24 includes a means for generating a data signal representative of the perimeter for each identified object as the object status is determined for each scan line. The incremental perimeter for each object is added to an accumulated perimeter signal for that respective object in accordance with the following formula:

$$\sqrt{1+[X(k)-X(k-1)]^2}$$

for each identified pair of boundaries which continue from the $k-1^{th}$ to the $k^{th}$ line. Of course, the distance between the two continuing points in the horizontal direction is representative of the X distance while the distance between the scan lines (considered in the above formula to be unit distance) is representative of the y coordinate distance.

3. Area Subsystem 26

Subsystem 26 includes a register which is incremented by the distance between the two edge points for each body on a scan line. Since the scan lines are deemed to be a unit distance apart, this represents the incremental area for that scan line. Of course, it may be readily seen that this area is usually accumulated in the above-described sequential processing by boundary resolver and object identifier 14. In some embodiments, upon identification of a termination of an object, the net area of the hole object may be determined by summing the various holes and bodies within the object as desired.

4. P²/A Subsystem 28

The P²/A subsystem 28 includes the circuit means for providing the stored representation of the ratio of the perimeter squared to the area. This system is accomplished with the relatively straightforward conventional circuit techniques based on the area and perimeter sub-systems 24 and 26 previously described.

5. Moment Subsystem 28

The moment subsystem 28 provides representations of the moments of object shapes using the identified boundary edges for each object, as desired. For example, the first moments in the X and Y directions are obtained by accumulating the boundaries for $M_X$ and $M_Y$ where $$M_X = \tfrac{1}{2}\sum_k (X_R^2(k) - X_L^2(k))$$
$$M_Y = \sum_k k(X_R(k) - X_L(k))$$

The final moment is obtained by determining the ratios of $M_X$ and $M_Y$, respectively with the object area. Similarly, higher order moments may readily be computed by accumulating the appropriate areas.

6. Neck Identification Subsystem 32

A neck is defined to occur between two points on the boundary of an object when the distance between those points is a local minimum. For example, in the hole (non-shaded) object of FIG. 10, necks $N_1$ and $N_2$ are defined to occur between the points A and B and points C and D, respectively. Of course, for a body having mathematically continuous boundaries, boundary points adjacent to a neck may be arbitrarily close to one of the neck end points. For objects with piecewise continuous or digitized boundaries, such as the digital representations produced by boundary resolver and identifier 14, points adjacent to a neck may be at least one incremental distance from the neck end points.

When the neck spans a region which is external to the object defined by the boundary, then the neck is defined as an external neck for that object. Thus, the neck illustrated in FIG. 10 for the hole object is an internal neck. Alternatively, that neck may be termed an external neck for the body object (shaded) in FIG. 10. Thus, for an image characterized by only body and hole objects, the body objects may have internal necks and external necks which respectively correspond to external and internal necks of the hole objects in the image.

While the present invention is equally well suited for identifying internal necks or external necks of either body objects or hole objects, or corresponding necks for any number of gray scale differentiated objects, for clarity the present embodiment is described below to identify only internal necks for body objects. It will be understood that alternative embodiments may readily be configured in accordance with the principles of the present invention in order to accommodate neck identification for external necks for body objects or any form of external or internal necks for hole objects, or any intermediate gray scale object.

Furthermore, the neck identification configuration of the present embodiment is defined in terms of top to bottom and left to right scanning. Of course, other scan directions are equivalent and alternative embodiments of the present invention may be utilized with such scanning in keeping with the principles of the present invention.

As described more fully below, the present invention provides single pass sequential processing to identify internal necks of body objects as the scan line data is provided by object boundary resolver and identifier 14.

In operation, the neck subsystem 32 initially identifies a left edge point on a continued boundary for each body object in the $k^{th}$ line, and then determines the minimum distance, $D_L(k)$, from $X_L(k)$ to the nearest right edge point $X_R$ of that body object identified on lines 1 through k. Since $X_L(k)$ and $X_R$ implicitly define cartesion coordinates (x, y) on the image (with the value for X corresponding to the x value, and the scan line number corresponding to the y value) a conventional circuit means is used to determine the distance $D_L(k)$ in accordance with the pythagorean theorem.

The subsystem 32 monitors the succession of values for $D_L$ produced for the various body objects as the lines are scanned and processed, and identifies a neck occurring from the left boundary of a body object at line k when $D_L(k) < D_L(k-1)$ and $D_L(k) < D_L(k+1)$. The $D_L(k)$ satisfying these conditions is denoted herein as $D_{Lmin}(k)$.

Thus, the neck subsystem 32 determines for each body object a minimum distance $D_L$ extending from a left boundary point in each scan line to a right boundary point identified in that or previously scanned lines. The subsystem 32 identifies a left edge neck when a $D_L$ value ($D_{Lmin}$) for a particular line is less than the $D_L$ value for the scan line preceeding and following that scan line.

The subsystem 32 utilizes a corresponding definition to identify necks occurring from the continued right boundary of each body object on line k to a left boundary in lines 1 through k occurring at a lesser x coordinate value, i.e. the subsystem 32 identifies a neck from a right boundary in line k when a corresponding distance $D_R$ is identified for line k such that $D_R(k) < D_R(k-1)$ and $D_R(k) < D_R(k+1)$. The $D_R(k)$ satisfying these conditions is denoted herein as $D_{Rmin}(k)$.

Thus, the neck subsystem 32 also determines for each body object, a minimum distance $D_R$ extending from a right boundary point in each scan line to a previous (in the x direction) left boundary identified in that or previously scanned lines. The subsystem 32 identifies a right edge neck when a $D_R$ value ($D_{Rmin}$) for a particular line is less than the $D_L$ value for the scan line preceding or following that scan line.

In alternative embodiments, subsystem 32 may identify a left (or right) edge neck at a boundary point in the $k^{th}$ line for which (1) $D_L$ (or $D_R$) monotonically decreases for the $k^{th}$ and immediately preceeding scan lines, i.e. those successive D values either stay the same or decrease to form a non-increasing sequence commencing from a D value greater than the $k^{th}$ line value, and (2) $D_L$ (or $D_R$) monotonically increases for the lines immediately succeeding the $k^{th}$ line, i.e. those successive D values either stay the same or increase to form a non-decreasing sequence terminating in a D value greater than the $k^{th}$ line value. Since in such embodiments a succession of one or more adajcent regions of certain objects may satisfy the broad left or right edge neck definition, the subsystem 32 may be limited to identify only one (e.g. the last one) of such a succession of necks as a neck while disregarding the others.

In addition to the identification of internal body object necks defined from left and right boundaries, the subsystem 32 also identifies necks extending from a body object bottom boundary (identified in the scan line when a body object terminates, or a hole object is first encountered, or two hole objects merge, or a body and hole object merge) to a top boundary (identified in the scane line when a body object is first encountered, a hole object terminates, or two body objects merge) (i.e. a horizontal boundary defined by the object boundary resolver and identifier 14 as a result of a termination or merger status for a body object). The subsystem 32 determines for an identified bottom edge of each body object the distance $D_B$ extending from that bottom edge to a top boundary identified in a previous scan line at the same horizontal position in the image. In addition, subsystem 32 determines both the distance $D_p$ from a boundary in the current scan line and immediately preceding the above-noted bottom boundary to a boundary in a previous scan line at the same horizontal position, and also the distance $D_s$ from a boundary in the current scan line and immediately succeeding the above-noted bottom boundary to a boundary in a previous scan line at the same horizontal position. The subsystem 32 monitors the succession of $D_B$, $D_p$ and $D_s$ values, and identifies a bottom neck when a $D_B$ value for a particular horizontal position is less than the $D_p$ and $D_s$ corresponding values for the adjacent boundary portions of the image.

In alternative embodiments, subsystem 32 may identify a bottom neck at a bottom edge point for which: (1) one or more successive $D_p$ values for immediately preceding horizontal positions monotonically decrease to the $D_B$ for the bottom edge point from a value greater than that $D_B$ value, and (2) one or more successive $D_s$ values for immediately succeeding horizontal positions monotonicaly increase from the $D_B$ value for the bottom edge point to a value greater than that $D_B$ value. Since in such embodiments a succession of one or more adjacent regions of certain objects may satisfy the broad bottom edge neck definition, subsystem 32 may be limited to identify only one (e.g. the last occurring one) of such a succession of adjacent bottom edge necks as a neck while disregarding the others.

In the above-described embodiment, subsystem 32 may store the $D_L$ and $D_R$ values, and $D_B$, $D_p$ and $D_s$ values for the duration of the processing of an image. Alternatively, subsystem 32 may store only the most recent $D_L$ and $D_B$ value together with a flag signal representative of the direction of change (increase or decrease) of the immediately preceding corresponding values during the sequential processing, since these signals contain sufficient information to identify a local minimum for those parameters. For example, a current D value may be compared with the immediately preceding corresponding D value and its flag signal to determine if the flag indicates that the D value was decreasing, and that the current D value exceeds the stored previous value. If so, a neck is identified from the edge associated with the stored preceding D value.

The above-described sequential processing, whereby the scan lines are processed from top to bottom in an image, and whereby distances $D_L$ are measured from a left boundary to a right boundary, and distances $D_R$ are measured from a right boundary to a previous (in the x direction) left boundary, and distances $D_B$, $D_s$ and $D_p$ are measured from a bottom boundary to a top boundary, provides the measurement of internal necks only.

It will be noted that in each of the scan line memories, the actual coordinates of the end points of the various neck distances are stored in association with the point so that the end point coordinates for the various necks may be stored in a memory upon identification of a neck. In the present embodiment, the neck end point coordinates are stored in the object memory in association with the object which includes the identified neck.

7. Segmentation Subsystem 34

The segmentation subsystem 34 extracts a class of shape features of object boundaries in a scanned image by applying a syntactic analysis technique during the single pass sequential processing of that image. In accordance with this technique, the subsystem 34 effectively breaks the boundary of an object into primitive segments of various types, and stores tabular data representative of the type, length, location and connectivity of the segments. The primitive segment types defined in the presently described embodiment are straight line segments, convex segments (characterized by a positive radius of curvature relative to a point within the body object circumscribed by the boundary), and concave segments (characterized by a negative radius of curvature relative to a point within the body object circumscribed by the boundary).

In breaking an object boundary into these primitive segments after first identifying the object in a scan line, subsystem 34 examines a single scan-intercepted portion of the boundary of that object at a time, in conjunction with data representative of an adjacent portion of the scan boundary from which the current portion continues. The segmentation processing is initiated for an object left or right edge point as soon as a boundary has been identified as continuing from a previous line to that boundary in the current line. In order to complete the segmentation processing for an entire image in a single pass, the subsystem 34 identifies the primitive segments in an on-line manner for all boundaries intercepted by a current scan line.

Subsystem 34 further links identified primitive segments so that all segments of a single object provide a descriptor of the entire object boundary. To establish this linking, each segment is treated as a piecewise continuous, directed line (straight or curved) which follows the boundary of a body object in a counter-clockwise direction and a hole object in a clockwise direction. As a result, a segment on a body object left boundary is defined as directed downward and a segment on the body object right boundary is defined as directed upward. Segments on the top (identified in the scan line when a body object is first encountered, or a hole object terminates, or two body objects merge) are defined as directed from right to left, and segments on the bottom (identified in the scan line when a body object terminates, or a hole object is first encountered, or two hole objects merge, or a body and hole object merge) are defined as directed from left to right. For a hole object, the above-noted segment directions are reversed. Of course, all of these directions are arbitrarily selected, and in other embodiments, the left, right, up, down and counterclockwise definitions may be interchanged to provide equivalent systems in keeping with the present invention. FIG. 11A illustrates a body object A and an interior hole object B. The objects A and B are shown with their boundaries broken into straight line, convex, and concave segments through the $k^{th}$ scan line. FIG. 11B shows segmentation memory data representative of the segment numbers, next linked segment, and start and stop coordinates for those segments.

In the present embodiment, upon the detection of a new object in a scan line (e.g. upon the identification of a left edge followed by a right edge, neither being continued from boundaries of the next previous scan line), subsystem 34 generates segmentation signals representative of a horizontal (negative x-directed) straight line segment in the current scan line, having magnitude equal to the distance between the identified left and right edges for that new object and having initial (start) and final (stop) coordinates corresponding to the coordinates of the identified left and right edges, respectively. These segmentation signals are stored together with a unique numerical designation signal and object number signal in a segmentation memory. In addition, a $\theta$ memory is updated to store $\theta_L$ and $\theta_R$ signals at locations associated with the locations in the scan line memory in which the respective $X_L$ and $X_R$ signals are stored for the object in the current line. For the scan line in which an object is first encountered, the $\theta_L$ and $\theta_R$ signals are representative of a reference angle, denoting an initial horizontal straight line segment.

Following the scan line in which the object was initially encountered, upon the detection of a left edge point, $X_L(k)$, for the object in the $k^{th}$ scan line, subsystem 34 determines the distance between $X_L(k)$ and $X_L(k-1)$ and the angular orientation $\theta_L(k)$ of the directed straight line extending from $X_L(k-1)$ to $X_L(k)$ with respect to the initial horizontal straight line segment (i.e. the horizontal straight line segment between $X_L$ and $X_R$ in the scan line in which the object was first encountered). The $\theta_L$ values are defined to be within the range: $0° < \theta \leq 360°$ as measured counter-clockwise from the initial horizontal straight line segment to the line joining $X_L(k)$ and $X_L(k-1)$.

Following these determinations, the subsystem 34 extracts the $\theta_L(k-1)$ value from the $\theta$ memory and compares that value with $\theta_L(k)$ to determine $\Delta\theta(k)$ representative of $\theta_L(k) - \theta_L(k-1)$. In the event $\Delta\theta_L(k)$ is greater than zero, the line joining $X_L(k)$ and $X_L(k-1)$ is defined by subsystem 34 to be a portion of a convex segment; in the event $\Delta\theta_L(k)$ is less than zero, the line joining $X_L(k)$ and $X_L(k-1)$ is defined by subsystem 34 to be a portion of a concave segment; and in the event $\Delta\theta_L(k)$ equals zero, the line joining $X_L(k)$ and $X_L(k-1)$ is defined by subsystem 34 to be a portion of a straight line segment.

In the event the polarities of $\Delta\theta_L(k)$ and $\Delta\theta_L(k-1)$ are the same or when $\Delta\theta(k)=0$, then the subsystem 34 identifies the segment portion between $X_L(k-1)$ and $X_L(k)$ to $X_L(k)$ to be a continuation of the previous primitive segment, and subsystem 34 updates the data for that segment in the segmentation memory to include the added segment length, new segment end points and additional edge point count. When the polarity of $\Delta\theta_L(k-1)$ and $\Delta\theta_L(k)$ differ, the subsystem 34 enters data in the segmentation memory which is representative of a new segment, including a unique numerical designation signal, segment length, segment type, and segment end points. The subsystem 34 also stores the $\theta_L(k)$ value at a location in the $\theta$ memory associated with $X_L(k)$ for extraction during a subsequent scan line.

For each right edge point, $X_R(k)$, identified in the $k^{th}$ line, subsystem 34 similarly determines the distance between $X_R(k-1)$ and $X_R(k)$, and the orientation $\theta_R(k)$ of the directed straight line extending from $X_R(k)$ to $X_R(k-1)$ with respect to the horizontal primitive segment. $\theta_R$ is similarly defined to be in the range $0° < \theta_R \leq 360°$, as measured counterclockwise from the initial horizontal segment to the directed straight line. Following these determinations, subsystem 34 extracts the $\theta_R(k-1)$ value from the $\theta$ memory and compares that value with $\theta_R(k)$ to determine $\Delta\theta_R(k)$ representative of $\theta_R(k-1) - \theta_R(k)$. With the same conditions on $\Delta\theta_R(k)$ corresponding to the left boundary segmentation determination, subsystem 34 identifies the directed line between $X_R(k)$ and $X_R(k-1)$ to be a continued or new convex, concave or straight line segment in the right boundary of the object. The subsystem similarly stores the $\theta_R(k)$ value at a location in the $\theta$ memory associated with $X_R(k)$ for extraction during a subsequent scan line.

In the event a termination or merge condition is identified in the $k^{th}$ scan line, a horizontal straight line segment is identified by subsystem 34, wherein that segment is defined to extend between the adjacent left and right edges of the terminated or merged objects.

The above-described process is repeated for subsequent scan lines in which the object is encountered with the result that the segmentation memory maintains an updated tabular list of the uniquely identified segments, together with data representative of the object number, segment length, next linked segment, number of identified edge points in the segment and segment end point coordinates.

Thus, in accordance with the above-described embodiment, the subsystem 34 provides tabular data representative of the straight line, convex and concave segments of the boundary of the objects intercepted during the scanning of an image. In alternative embodiments, different segmentation decision rules may be utilized to yield differing types of primitive segments. For example, where segment continuation is defined to include only cases where $\Delta\theta$ equals zero, straight line segments only are identified. Similarly, if the rules provide for segment continuation only as long as the sign of $\Delta\theta$ remains the same, the boundaries are broken up into convex and concave segments only. Furthermore, in alternative embodiments, for convex or concave segment systems, in addition to the segment length, the subsystem 34 may also retain data representative of the total angular change as the angle descriptor in lieu of the termination angle.

As described, subsystem 34 provides segmentation features of object boundaries as a sequence of connected segments. Due to quantization noise for certain images in some implementations, the segments are likely to be too small to provide useful information. For example, a straight line at certain angles may be digitized in a manner resulting in a very large number of small straight line segments. In order to reduce sensitivity to such quantization errors, subsystem 34 may be adapted to effectively smooth the defined segments. For example, such smoothing (or segment reduction) may be attained by treating the identified horizontal segments as portions of convex segments continuing at least to the next scan line, or, as a further example, by identifying straight line segments only for segments having a single boundary point and having a length greater than two unit distances. In the latter case, a segment which initially is convex but then continues along a series of co-linear points would be considered to continue as a convex segment, until a point is identified for which $\Delta\theta$ becomes negative. This point would then mark the beginning of the next segment, either concave or straight line depending upn the position of that point and the next identified boundary point.

Figure 12:
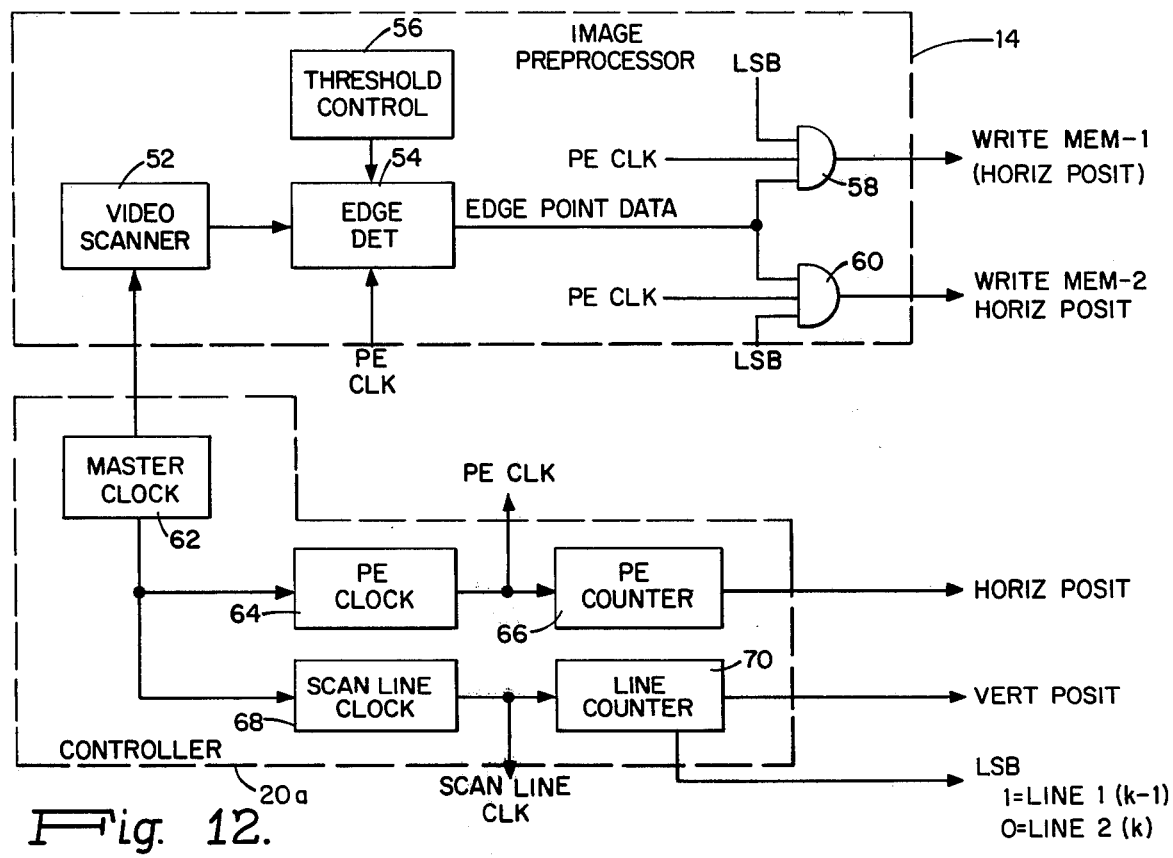
FIG. 12 shows in block diagram form, an embodiment of the image preprocessor of the system of FIG. 1.
Figure 17:
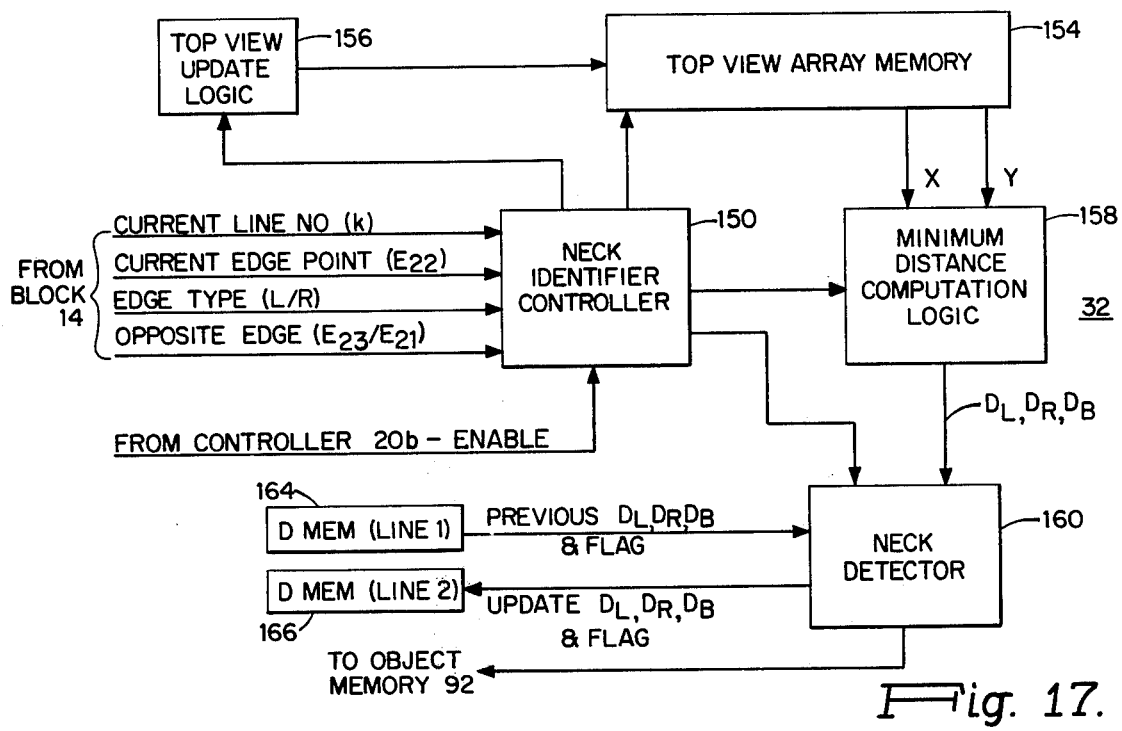
FIG. 17 shows in block diagram form, an embodiment of the neck feature extractor of the system of FIG. 1.

The following is a detailed description of a hardware implementation of the system of FIG. 1, wherein FIG. 12 illustrates an image preprocessor 14 and a portion 20a of the controller 20. FIG. 13 illustrates the object boundary resolver and identifier 14 and the timing and sequence control portion 20b of controller 20, FIG. 17 illustrates the neck identification subsystem 32.

As shown, the preprocessor 14 includes a video scanner 52, edge detector 54, threshold control 56, and gates 58 and 60. The controller portion 20a includes a master clock 62, a picture element (PE) clock 64 and associated counter 66, and a scan line clock 68 and associated line counter 70.

In operation, the master clock 62 provides an initial synchronizing signal to the scanner 52, which for example, may be a conventional video scanner. The master clock 62 also provides a signal to PE clock 64 and scan line clock 68, which in turn provide PE and scan line signals, respectively, for use as indicated in FIG. 13 and the subsequent figures.

The counters 66 and 70 are appropriate modulus counters so that they recycle to zero when the scanner 52 completes a line and completes scanning of an image, respectively. The counters 66 and 70 provide horizontal and vertical position signals corresponding to their respective count states which are representative of the coordinates of the scanner 52 sensor element measured with respect to the image being scanned. The edge detector 54 and associated threshold control 56 are responsive to the scanner 52 and PE clock 64 to provide a digital sigal comprised of a sequence of levels corresponding to a binary representation of the portions of the image scanned by scanner 52 as a function of time. Gates 58 and 60 are responsive to the PE clock 64 and to the least significant bit (LSB) of the line counter 70 (which alternates between binary states on successive scan lines). The signals are applied as described more fully below to the "write" input for the scanner line array memory.

Figure 15:
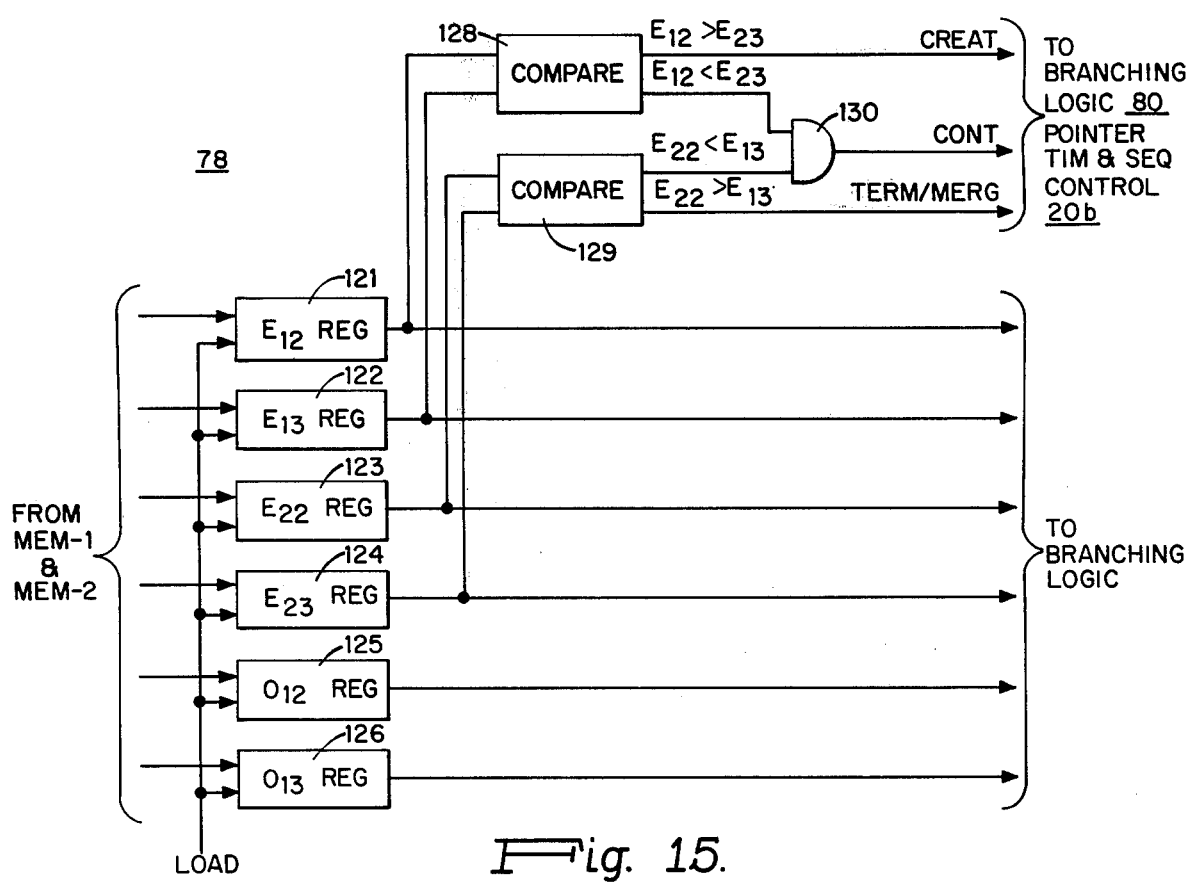
FIG. 15 shows in block diagram form, an exemplary embodiment of the boundary resolution logic of the object boundary resolver and identifier of FIG. 13.
Figure 14:
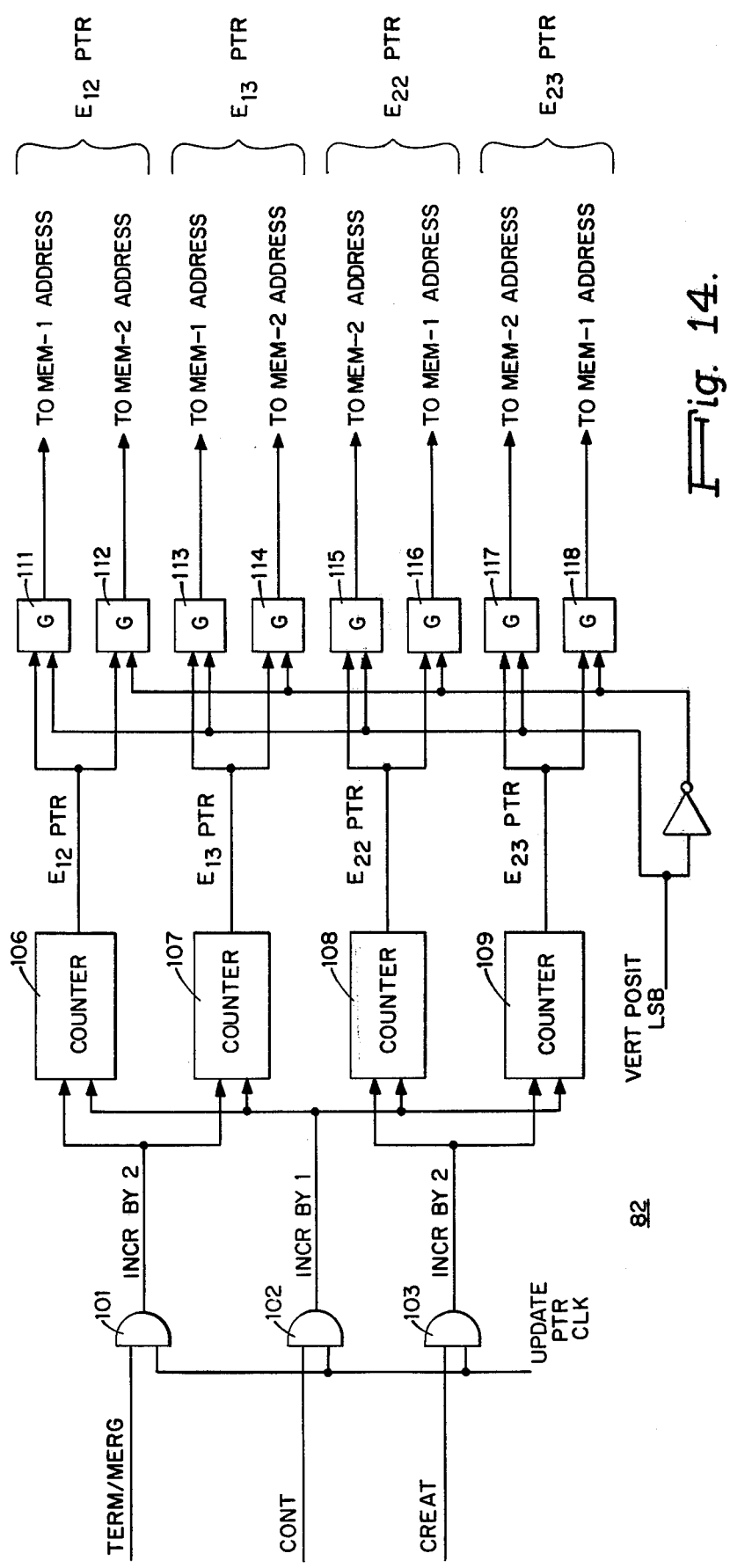
FIG. 14 shows in block diagram form, an exemplary embodiment of the pointer of the object boundary resolver and identifier of FIG. 13.

FIG. 13 illustrates the object boundary resolver and identifier 14 and the timing and sequence control portion 20b of controller 20. The object boundary resolver and identifier 14 includes a pair of buffered scan line memories 74 and 76, boundary resolution logic 78, branching logic 80 and pointer network 82. The pointer network 82 is illustrated in more detailed form in FIG. 14, and, similarly, the boundary resolution logic 78 is illustrated more fully in FIG. 15. The object boundary resolver and identifier 14 further includes continuation logic 84, creation logic 86, termination/merge logic 88, object stack 90, and object memory 92.

The pointer network 82 includes gates 101–103, 111–118 and counters 106–109, and provides pointer address signals for the scan line memories 74 and 76. These address signals are derived status signals produced by boundary resolution logic 78 acting in concert with the timing and sequence control 20b. Boundary resolution logic 78 includes a set of six registers 121–126, comparator networks 128 and 129, and gate 130.

With this configuration, the object boundary resolver and identifier 14 together with the controller portion 20b continuously examines a set of two edge points from each of the $k-1^{th}$ lines and determines which of two edge points are connected by an object boundary. More particularly, three adjacent edge points in the $k-1^{th}$ (old) line are denoted $E_{11}$, $E_{12}$, $E_{13}$, and three adjacent edge points in the $k^{th}$ (current) line are denoted $E_{21}$, $E_{22}$, $E_{23}$, where E represnts the horizontal position (or coordinate) of the indexed edge point. Of the two sequences of three adjacent points, the initial points, $E_{11}$ and $E_{21}$, are assumed to be resolved prior to a current examination by resolver and identifier 14 so that, in effect, only the leftmost unresolved points ($E_{12}$, $E_{22}$ and $E_{13}$, $E_{23}$) in each of the old and current scan lines are examined at any time. With these two sequences of points, three specific connectivity conditions may be identified:

(1) CONTINUATION:
$E_{22} < E_{13}$
$E_{12} < E_{22}$
$E_{12}$ and $E_{22}$ are connected when a CONTINUATION condition exists;

(2) TERMINATION/MERGER:
$E_{22} > E_{13}$
$E_{12}$ and $E_{13}$ are connected when a TERMINATION/MERGER condition exists;

(3) CREATION:
$E_{12} > E_{23}$
$E_{22}$ and $E_{23}$ are connected when a CREATION condition exists.

These comparisons are accomplished in the boundary resolution logic 78 in the present embodiment, wherein the condition indicating output signals from that block are applied to the branching logic 80, pointer 82 and timing and sequence control 20b. The branching logic 80 transfers the resolved edge point data to the respective one of continuation logic 84, creation logic 86 and termination/merge logic 88 in the following manner: following a CONTINUATION condition, $E_{12}$, $E_{22}$, $O_{12}$ to continuation logic 84; following a CREATION condition, $E_{22}$, $E_{23}$ to creation logic 86; and following a TERMINATION or MERGE condition, $E_{12}$, $E_{13}$, $O_{12}$, $O_{13}$ to termination/merge logic 88.

Following the identification of the connectivity of two edge points, the pointers for the scan line memory 74 and 76 are incremented by the appropriate incrementing of the counters 106–109 depending on the connectivity condition. In addition, feature exterior 18 identifies changes in the various shape features and updates its records.

In response to the determination of the CONTINUATION condition, the resolver and identifier 14 determines that point $E_{12}$ from the old line is connected to point $E_{22}$ on the current line. The object number of the two lines are considered to be the same and a new entry $O_{22}$ ($=O_{12}$) is generated by continuation logic 84 and entered into the scan line memory for the current line. Logic 84 also interrogates a memory in the object stack 90 to determine whether the boundary resolved for the identified object is the second such boundary in the current scan line. If the resolved boundary is the second one for the object in the line, then data representative of that object is deleted from stack 90 and the area subsystem 26 of feature extractor 18 increments the area count stored in object memory 92 by a value proportional to the separation of the two edges in the current line. In addition, the perimeter subsystem 24 computes the perimeter change from $E_{12}$ to $E_{22}$ and adds that value to the previously generated perimeter value in the object array in memory 92.

In the event a CREATION condition is identified, the creation logic 86 assigns a new object number to the two edges $E_{22}$ and $E_{23}$ and these object numbers are entered in the scan line array in association with the edge points for the current line. In addition, logic 86 updates the object stack 90 to indicate that a first boundary of a new object has been identified for the current line, storing the object number, body type, and edge coordinate. Logic 86 also updates object memory 92 with a new object entry in the object array. The new object entry into memory 92 is accompanied by entry of object type data (representative of the object type, body or a hole, depending on the nature, i.e. left or right, of the $E_{22}$ boundary; when the object is at left edge, the object is a body, otherwise it is a hole). The parent portion of the object array is also derived at this time from the object stack 92 with the object parent designation being representative of the rightmost object of the opposite type which has only one boundary resolved. Following the identification of the CREATION condition, the perimeter and area subsystems 24 and 26 compute and update the respective perimeter and area data signals stored in the object array of object memory 92.

In response to the identification of a TERMINATION condition, the system determines that there is a connection between edges $E_{12}$ and $E_{13}$ with no connecting point on the current line. This condition may indicate the termination of an object with the merging of two objects. To distinguish between these two cases, the objects to which the two edges belong are examined from the old line of the scan line array. When the object numbers for the two edges $E_{12}$ and $E_{13}$ is the same, then a TERMINATION condition is defined. Upon detecting a TERMINATION condition, termination/merge logic 88 changes the status in the object array of memory 92 to "terminated." In addition, at this time, the perimeter subsystem 24 updates the stored object perimeter data by adding the increment $E_{13}$-$E_{12}$ to the accumulated perimeter.

A MERGE condition is identified when it is determined that there is a connection between edge points $E_{12}$ and $E_{13}$ with no connecting point on the new line, and when the object numbers for the two edge points $E_{12}$ and $E_{13}$ are different. Termination logic 88 determines when the two merged objects are the same type from the object memory, and, at such times, the leftmost object (for $E_{12}$) is marked as merged in the object array of memory 92 while the right most object is denoted as continued. When the two objects are of a different type, one of the two is always the parent of the other, and logic 88 identifies the parent as the one to continue. Logic 88 further changes the object number for the resolved boundary for the objects being merged to the object number of the continuing object. The primary features are also updated by the subsystems of extractor 18.

Figures 16A, 16B:
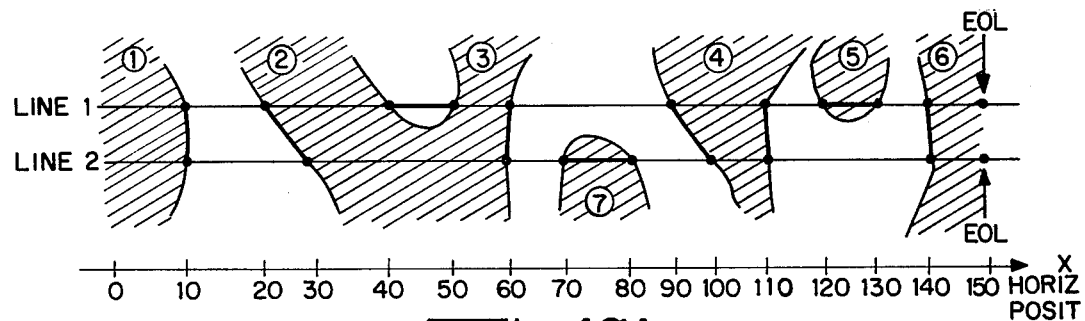

FIGS. 16A–16C illustrate the boundary resolving and connectivity determining operation of the system described in conjunction with FIGS. 1 and FIGS. 12–15. FIG. 16A shows two scan lines for an image wherein the object numbers are illustrated by the encircled numerals. The Memory (Line 1) portion of FIG. 16B illustrates an exemplary twelve address scan line memory array for the old ($k-1^{th}$) scan line, showing the edge point (or X coordinate) and the object number.

There are eleven entries in the Memory (Line 1) of FIG. 16B. Memory (Line 2) illustrates the scan line memory for the current ($k^{th}$) scan line, showing the address for twelve locations while only nine edge points are encountered in that line. The object numbers are shown together with parenthetical designations as to the time of entry ($t_1$–$t_{10}$) for that data during the scan line, as described below in conjunction with FIG. 16C. FIG. 16C illustrates the $E_{12}$ pointer and $E_{13}$ pointer addresses (for the old line memory), together with the $E_{22}$ and $E_{23}$ pointer (for the new line memory). The asterisks in association with the various pointers in FIG. 16B illustrate the edge points which are resolved at the corresponding times $t_1$–$t_{10}$. FIG. 16C also shows the horizontal coordinate values for the $E_{12}$, $E_{13}$, $E_{22}$ and $E_{23}$ of the image of FIG. 16A, together with the operative connectivity condition (being marked by a check for the corresponding time), and status.

As depicted in FIGS. 16A–C, object number 1 is shown to continue, objects 2 and 3 merge, object 7 is a new object in the current scan line, object 4 continues, object 5 terminates between the old and current scan line, and object 6 continues in the current scan line.

FIG. 17 illustrates a neck identification subsystem 32 in detailed block diagram form. The subsystem 32 includes a neck identifier controller 150 which is adapted to control the operation of a topview array memory 154, topview update logic 156, minimum distance computation logic 158, neck detector 160 and D memory (line 1) 164 and D memory (line 2) 166. The controller 150 is coupled to the controller 20b by an enabling line which directs subsystem 32 to be operative at a current position in a scan line to identify left and right boundary necks upon detection of a CONTINUATION condition, and operative to identify bottom-top boundary necks upon detection of a hole CREATION, TERMINATION, or MERGER condition creating a bottom edge.

In order to reduce the required computational and storage networks for the neck computations, the topview array memory 154 is configured with an M×2 element data array derived from the scan line memory of object boundary resolver and identifier 14. The memory 154 includes two explicit entries for each of the M elemental regions along a scan line: (1) the Y coordinate (i.e., scan line number) for a body object boundary occurring most recently at that corresponding X value; and (2) data representative of the type of boundary (i.e., left, right, top or bottom) at the most recent identified boundary points along the scan line. Through the various location addresses, memory 154 also implicitly includes the X coordinate associated with each of the M elemental regions represented by the stored Y coordinate.

Therefore, at the $k^{th}$ scan line, the topview array memory 154 contains the view of the image looking up from that scan line. Other embodiments may include a third entry for each position which is representative of the object number for each boundary so that necks for the various objects may be identified.

The D memories 164 and 166 respectively represent the $k-1^{th}$ and $k^{th}$ scan lines, and include a plurality of entries, each being associated with an updated D value ($D_L$, $D_R$, or $D_B$) for a corresponding one of the edge points in scan line memories 74 and 76 in block 14. Each entry in D memories 164 and 166 further includes a flag bit representative of the direction of change in the updated D value from a previous line to the stored line.

When a CONTINUATION condition is detected, for a $k^{th}$ line edge point, controller 150 is responsive to signals representative of the edge type (left or right) and opposite boundary ($E_{23}$ or $E_{21}$) determined from block 14, to extract a succession of X and Y coordinate pairs from topview memory 154, and to apply those extracted signals to the computation logic 158. Controller 150 also applies signals representative of the current X and Y coordinates (determined from $E_{22}$ and k signals from block 14) to logic 158. Logic 156 performs a succession of distance computations between the points identified by the coordinate pairs, identifies the minimum distance as $D_L$ (or $D_R$) as appropriate for the current edge type (determined by block 14), and applies that signal to the neck detector 160. Detector 160 is operative under the control of controller 150 to recall a previous $D_L$ (or $D_R$), and the associated flag from the D memory (line 1) 164 and compare with that the current $D_L$ (or $D_R$) value provided by logic 158. Detector 160 then compares the present $D_L$ (or $D_R$) value from logic 158 with the previous value and its flag. Logic 158 determines that a neck is present from the $k-1^{th}$ line left (or right) edge only when the flag indicates that the $D_L$ (or $D_R$) had been monotonically decreasing until the $k-1^{th}$ line, and that $D_L$ (or $D_R$) value increased in the $k^{th}$ line. In the event that such a neck is detected, the coordinates of the neck end points are then transferred to the object memory 92 in object boundary resolver and identifier 14. Then, the D memory (line 2) 166 is updated with the current value for $D_L$ (or $D_R$), so that during the scan of the next line, the memories 164 and 166 may interchange function in the same fashion as the scan line memory 74 and 76 of block 14. In addition, the topview update logic 156 replaces its line number and type entry with the current ($k^{th}$ line) value.

When a hole CREATION, TERMINATION, or MERGER condition creating a bottom edge is detected for a $k^{th}$ line edge point, controller 150 operates in a similar manner to extract top edge coordinates from topview memory 150 and to control logic 158 to determine the distance from the $k^{th}$ line to the line associated with the extracted coordinates, and further to monitor this distance to identify an edge point for which $D_B$ is a local minimum.

In detailed operation, to determine the distance $D_L(k)$ from a continued left boundary point of a body in the $k^{th}$ line, controller 150 first directs the computation of the distance between the left edge in the $k^{th}$ line and the next succeeding right edge point on that line. Controller 150 then directs the computation of the distances between the identified $k^{th}$ line left edge and all right edges identified in previously scanned lines for the image and stored in the topview memory 154. Since the subsystem 32 is at this point seeking the minimum distance from the $k^{th}$ line left edge to a right edge previously scanned, the present embodiment is configured to only compute those distances from previous line right edges which are less than or equal to the distance to the nearest right edge in the current ($k^{th}$) scan line. The $D_L(k)$ value is stored in the D memory 162 for subsequent comparision with similar values of other scan lines.

Also upon the processing for a continued left boundary point of a body in the $k^{th}$ scan line, the subsystem 32 determines the distance in the image between each left edge identified in the previously scanned lines (i.e., lines 1 throuhg $k-1$) and which is less than $D_L(k)$ from and to the right of the $k^{th}$ line left edge, and all right edges identified through the current scan line and less than $D_L(k)$ from and to the right of the identified left edge in the $k^{th}$ scan line. When the distance from the left edge of one of the previously scanned lines to one of the right edges is less than $D_L$ value as stored in D memory 164 for that previous scan line, then that value replaces the stored $D_{Lmin}$ value for that previous line.

The stored $D_L$ values in memories 164 and 166 are compared and a left edge neck is identified in the $k-1^{th}$ line when the $D_L$ value in D memory 164 is a local minimum, $D_{Lmin}$, i.e. when that value is less than the corresponding value stored in the D memory 166 and the direction signal stored in D memory 166 indicates that the $D_L$ value for the $k-1^{th}$ line had been monotonically decreasing.

Using the topview array, the calculation of $D_L(k)$ merely requires the calculating distances to the right boundary entries in the topview array between the X locations $X_L(k)$ and $X_R(k)$. In order to further simplify the computational procedures, the subsystem 32 only utilized right boundaries which are within the distance $X_R(k) - X_L(k)$, and thus only considers scan lines displaced from the current scan line by distances corresponding to the separation between the $k^{th}$ line left and right boundaries. This aspect of the present embodiment limits the area of computational search for $D_L$ to be a rectangle. In other embodiments, more refined searching techniques may be utilized, for example, if a distance less than $D_L$ is found, that value $D_L$ may be used to limit the area of further search. Ideally, the area of search is bounded by a circular arc with radius $D_L$ and center $X_L(k)$.

A similar procedure to that for $D_L$ is followed by the neck subsystem 32 to identify right edge necks as a current line scanned for each identified right edge in that scan line. Briefly, the subsystem 32 identifies $D_R$ which is the minimum distance from the identified right edge and the next identified left edge in the direction opposite to the scan direction. Similarly, in a similar manner to that for left edge detector, the distance between each right edge identified in previously scanned lines is measured to all left edges identified in the previously scanned lines which are less than $D_R$ from and to the left of the identified right edge. A right edge local neck is identified when the minimum distance determined is less than the corresponding distances for two adjacent scan lines.

A bottom edge neck is identified as a current line is scanned for each identified bottom edge by recording the distance $D_B$ between each identified bottom edge in the image and a top edge identified at the same horizontal position along one of the previously scanned lines. By monitoring such distances, the system readily identifies the distances and their end points for the $D_B$ which is a local minimum among the list of corresponding distances. This is denoted as a bottom edge neck.

Figures 18A, 18B, 18C:
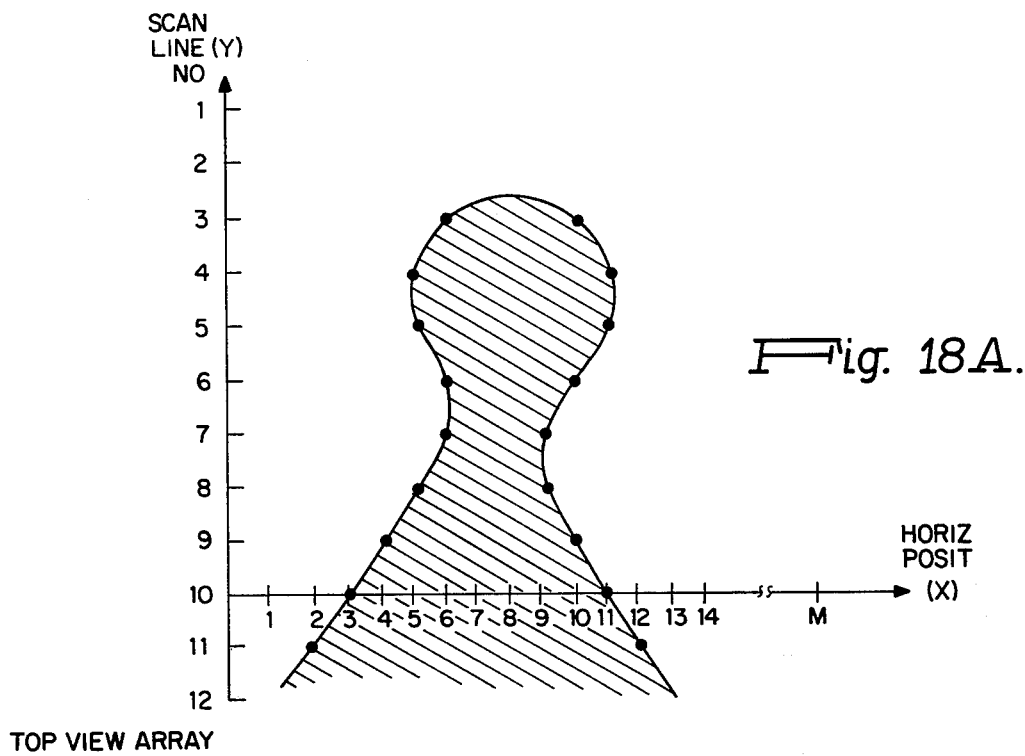
FIGS. 18A–18C show portions of an image for analysis by the system of FIG. 1, together with tabular data illustrating the operation of the neck feature extractor of the system of FIG. 1.

FIGS. 18A–C illustrate the operation of the neck identification subsystem 32 described above in conjunction with FIG. 17. FIG. 18A shows an image including a body object illustrated against a coordinate system imposed by the scanning operation. In effect, the horizontal position (X) axis is swept downward across the image as the line-by-line scanning proceeds. FIG. 18B is representative of the topview array memory 154 corresponding to the image in FIG. 18A during the $10^{th}$ scan line.

The illustrated topview array includes M addressed locations, each corresponding to a position along the $10^{th}$ scan line, and representing the X coordinate of that position. Each of the addressed locations includes a line number (Y coordinate) entry and a boundary type (Left, Top or Bottom) entry which are determined in accordance with the above description relating to object boundary resolver and identifier 14 and the topview array memory 154. For example, the entries for position 3 indicate that a left edge was detected in the 10$^{th}$ scan line.

FIG. 18C shows, in tabular form, a Neck Array produced by minimum distance computation logic 158, including $D_L$ and $D_R$ magnitude values and coordinate data for those distances, for the first ten illustrated scan lines of the image of FIG. 18A. While in the system of FIG. 17, only the most recent two of the $D_L$ and $D_R$ values would be retained in the D memories 164 and 166, together with a direction flag, FIG. 18C shows all those values for the first ten scan lines of the image so that local minimums in $D_L$ and $D_R$ may more readily be identified in this Figure.

The respective $D_L$ and $D_R$ entries in FIG. 18C are produced for each scan line by logic 158 when the corresponding image border element is currently being scanned. Neck detector 160 monitors these values as they are produced and identifies left and right edge necks during the scan line where the $D_L$ and $D_R$ values cease to be monotonically decreasing and begin to increase. Accordingly, coincident left (* in FIG. 18C) and right ( in FIG. 18C) edge necks are identified by detector 160**, with each neck having length 3 and extending between the coordinates (6,7) and (9,7).

Figure 19:
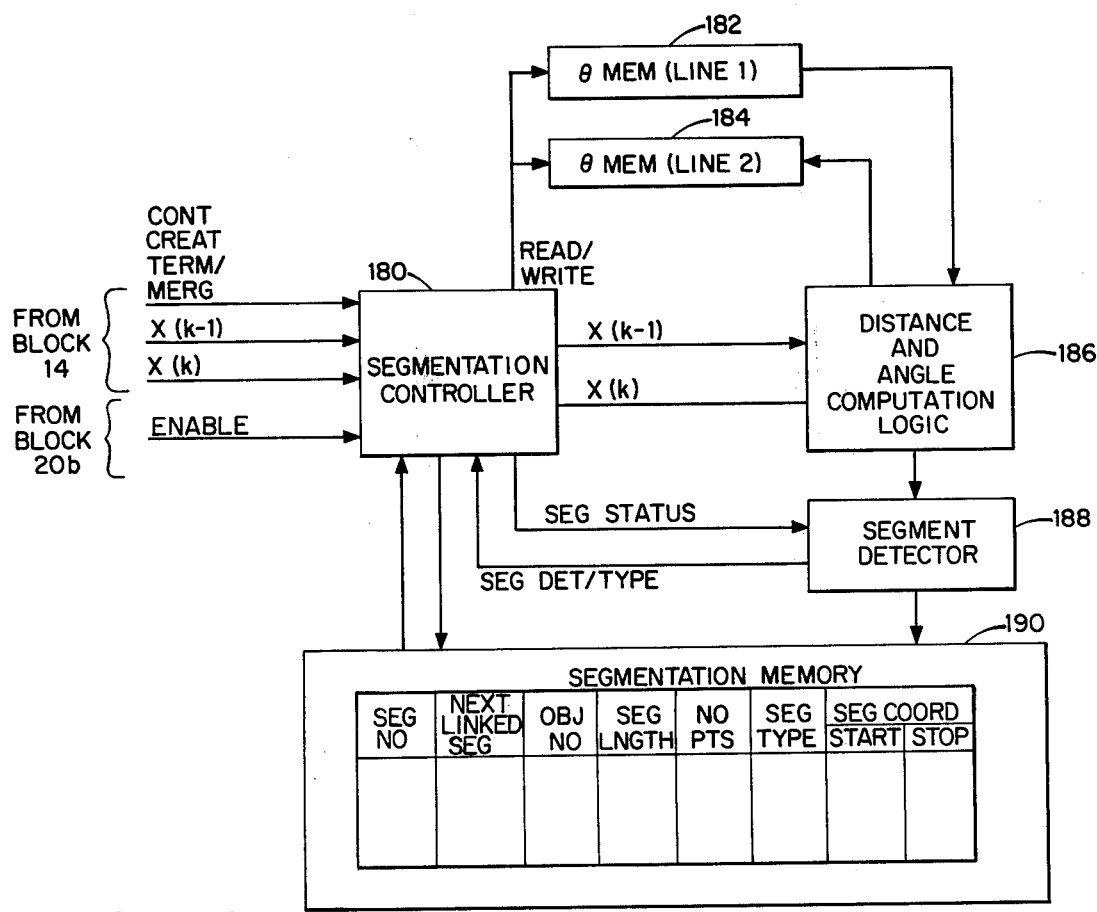
FIG. 19 shows in block diagram form, an exemplary embodiment of the segmentation feature extractor of the system of FIG. 1.

FIG. 19 illustrates a segmentation subsystem 34 in detailed block diagram form. The subsystem 32 includes a segmentation controller 180, θ memory (line 1), 182, θ memory (line 2) 184, distance and angle computation logic 186, segment detector 188 and segmentation memory 190. The segmentation controller 180 is coupled to the controller 20b by an enabling line which directs subsystem 34 to be operative at a current position in a scan line corresponding to an identified left or right edge. Controller 180 is further coupled to the object boundary resolver and identifier 14 in a manner providing data signals representative of the horizontal position of a current (k$^{th}$) line edge point and a previous (k−1$^{th}$) line edge point, and the connectivity status (CONTINUATION, CREATION, TERMINATION, or MERGE). The θ memories 182 and 184 are conventional memory elements having a storage location associated with each location in the scan line memories 74 and 76, so that a θ signal may be stored in one of those memories in association with each of the edge point signals, $X_L$ and $X_R$, in the scan line memory 74 and 76. It will be understood that the memories 182 and 184 are controlled by controller 180 so that they alternately represent the current and next previous lines following updating in a similar manner to the scan line memories 174 and 176.

The distance and angle computation logic 186 is a conventional circuit means for computing the distance between two coordinate points (represented by edge point data provided by segmentation controller 180 from scan line memories 74 and 76), and further for providing signals representative of the angular orientation of such a line joining those points relative to a reference line. In addition, logic 186 includes conventional means to compute the difference between the θ signal representative of that determined orientation and a stored θ signal transferred under control of controller 180 from one of θ memories 182 and 184.

A segment detector 188 includes circuitry means for determining from the Δθ signal provided by logic 186 whether the currently examined boundary portion is a straight line, convex or concave segment and whether that segment is continued from the previous segment portion encountered in the next previous scan line. Detector 188 further includes means to transfer data representative of the segment length (from logic 186), and type to the segmentation memory 190. The segment controller 180 further provides the segmentation memory 190 with data inputs representative of a segment number, the object number for the current object encountered, the number of boundary points identified so far to be a part of that boundary, signals representative of the segment start and stop coordinates, and the segment number for the next linked segment in the direction of the linked primitive segments.

In operation, upon the identification by block 14 of a new object (i.e. CREATION condition), the segmentation controller 180 is effective to store in memory 190 signals representative of a negative x-directed initial horizontal segment. During subsequent scan lines, for edge points which continue from the next previous scan line, the controller 180 directs the computation of the length of the new segment portion and its angular orientation by logic 186, the determination of the type of that primitive segment portion by detector 188, and then the updating of the segmentation memory 190 to include data representative of a new segment, if applicagle, or a continued segment with updated segment length and edge point coordinate data and number of points data.

FIGS. 20A and 20B illustrate the operation of the segmentation subsystem 34 described above in conjunction with FIG. 19. FIG. 20A shows four scan lines of an image including a body object (shaded) illustrated against a coordinate system imposed by the scanning operation. In effect, the horizontal position (X) axis is swept downward across the image as the line-by-line scanning proceeds. FIG. 20B illustrates the operation of subsystem 34 for eight successive time periods, $t_1$ through $t_8$. The time periods $t_1$ through $t_8$ respectively correspond to the interception by the scan of the left and right edge points of the body object in FIG. 20A. FIG. 20B further illustrates a portion of the data stored in the segmentation memory 190 at the various times $t_1$ through $t_8$, notably, the segment type, segment number, and segment length. The start and end coordinates of the segment are not shown in FIG. 20B.

In FIG. 20A, the orientation angles $\theta_L(k)$ and $\theta_R(k)$ are illustrated for the scan lines 1 through 4. The various primitive segment portions are identified between the edge points by the directed arrows. The segments identified by subsystem 34 are marked with encircled segment number designations.

In operation, at $t_1$, the left edge point is identified at x=3 in the first scan line (i.e. k=1). At time $t_2$, the right edge point of the new body object is identified at x=5, and at this time, $\theta_L$ is set equal to zero for line 1 in the θ memory (line 1) and $\theta_R$ to set equal to 360° in the θ memory (line 2). In addition, entry is made into the segmentation 190 representative of a horizontal straight line segment, segment number 1, with length 2.0 units. At time $t_3$, the left edge at scan line 2, is identified at x=2, and $\theta_L(2)$ is determined to be 45° by logic 186, and $\Delta\theta_L(2)$ is identified to be +45°. The segment detector 188 identifies this portion as a convex segment, segment number 2 having length 1.4 units. In addition, the segmentation memory 190 is updated for segment number 1 to indicate that the next linked segment is segment number 2. Similarly, at t₄, a convex segment, segment number 3, is identified. In addition, the segmentation memory 190 stores data indicating that the next linked segment from segment number 3 is segment number 1. At t₅, the line 3 left edge point is identified and the $\Delta\theta_L$ is determined to continue with a positive sign and thus segment detector 188 identifies a convex segment portion which is a part of segment number 2. As a result, the segmentation memory for segment 2 is updated to reflect the increased segment length to be 2.4 units. Similarly, the subsystem 34 operates in the manner set forth in the remainder of FIG. 20B, the result that five primitive segments are identified in the first four scan lines of the body object illustrated in FIG. 20A.

By way of example, the presently-described embodiment may be implemented utilizing a conventional scanner, edge detector and threshold determining device in the preprocessor 10, wherein the object boundary resolver and identifier 14, feature extractor 18 and controller 20 are in the form of a SPC-16/65 computer manufactured by General Automation, Anaheim, California, with the DBOS operating system, and programmed as set forth in the Appendix.

FIG. 21, together with Tables 1-3, further illustrate the operation of an exemplary system in accordance with the present invention. Boundary points for an image are shown in FIG. 21. This image may represent a lake (body object) having an island (hole object), with detected boundary points of the lake marked by the dots. The encircled symbols A, B, and C represent the objects identified by resolver and identifier 14. In operation, resolver and identifier 14 identifies a single object (A) at line 5, a second object (B) at line 11, a merger of A and B at line 12, a third object (C) at line 28, termination of C at line 39 and termination of A at line 53.

The necks identified by the neck subsystem 32 are shown by the respective chords identified by reference numerals 1 through 10 in FIG. 21. Table 1 illustrates the content of the object memory for the sample image of FIG. 21, following the processing. These primary features indicated are the area, perimeter and $P^2/A$. Table 2 indicates the neck features for necks 1-10 with the computer neck length object termination points and coordinate termination points.

In addition to the general segmentation rules defined above in conjunction with FIGS. 11A and 11B, the present exemplary system utilizes the following segment smoothing rules: (1) the initially encountered portion of the boundary (i.e. that which causes a creation condition) is a portion of a continuing convex segment of a body or continuing concave segment of a hole; (2) the last encountered portion of the boundary (i.e. that which causes a termination condition) is a portion of a continuing convex segment; (3) the portion of the boundary between two objects in a scan in which those objects merge is a straight line segment; (4) any other boundary portion between two points which is more than three unit distances in length is a straight line segment; (5) an identified convex portion continues as such unless $\Delta\theta$ becomes less than zero for two points in the succession of boundary points without being greater than zero between those points, and (6) an identified concave portion continues as such unless $\Delta\theta$ becomes greater than zero for two points in the succession of boundary points without being less than zero between those points. With these smoothing rules, the number of primitive segments for an identified boundary is relatively small in spite of the quantization noise which might be present in the image digitizing performed by the system. FIG. 21 illustrates the segments identified by segmentation system 34. In that figure, the segment end points are denoted by the arrows identified by reference numerals 1-14. Table 3 shows the segmentation features of these identified segments.

TABLE 1

| | PRIMARY FEATURES | | | | |
|---|---|---|---|---|---|
| Object No. | Object Type | Parent | Area | Perimeter | $P^2/A$ |
| A | Body | — | 1595 | 170.78 | 1.45 |
| C | Hole | A | 111 | 44.00 | 1.39 |

Note - Object B merged with object A on line 28.

TABLE 2

| | | | | NECK FEATURES | | | |
|---|---|---|---|---|---|---|---|
| Neck No. | Neck Length | Left Object | Right Object | Left Coordinates | | Right Coordinates | |
| | | | | X | Y | X | Y |
| 1 | 14.9 | A | A | 42 | 16 | 52 | 6 |
| 2 | 14.9 | A | C | 42 | 18 | 52 | 28 |
| 3 | 28.0 | C | A | 58 | 28 | 81 | 12 |
| 4 | 20.0 | A | C | 31 | 30 | 51 | 30 |
| 5 | 16.0 | C | A | 66 | 34 | 82 | 34 |
| 6 | 19.7 | A | C | 32 | 35 | 51 | 30 |
| 7 | 9.4 | C | A | 66 | 34 | 74 | 39 |
| 8 | 19.1 | A | C | 34 | 40 | 53 | 38 |
| 9 | 12.2 | A | C | 47 | 49 | 54 | 39 |
| 10 | 15.6 | C | A | 59 | 39 | 70 | 50 |

TABLE 3

| | | | | SEGMENTATION FEATURES | | | | |
|---|---|---|---|---|---|---|---|---|
| Segment No. | Next Linked segment | Object No. | No. of Points | Start Coordinates | | End Coordinates | | Segment Type |
| | | | | X | Y | X | Y | |
| 1 | 2 | A | 4 | 52 | 6 | 46 | 6 | Convex |
| 2 | 4 | A | 1 | 46 | 6 | 43 | 7 | St Line |
| 3 | 1 | A | 1 | 57 | 7 | 52 | 6 | St Line |
| 4 | 8 | A | 9 | 43 | 7 | 42 | 16 | Convex |
| 5 | 3 | A | 5 | 64 | 12 | 57 | 7 | Convex |
| 6 | 5 | A | 1 | 69 | 12 | 64 | 12 | St Line |
| 7 | 6 | A | 29 | 75 | 38 | 69 | 12 | Convex |
| 8 | 9 | A | 6 | 42 | 16 | 32 | 22 | Concave |
| 9 | 13 | A | 37 | 32 | 22 | 74 | 48 | Convex |
| 10 | 12 | C | 12 | 54 | 33 | 62 | 36 | Concave |
| 11 | 10 | C | 9 | 53 | 38 | 54 | 33 | Convex |
| 12 | 14 | C | 13 | 62 | 36 | 59 | 39 | Convex |
| 13 | 7 | A | 10 | 74 | 48 | 75 | 38 | Concave |
| 14 | 11 | C | 7 | 59 | 39 | 53 | 38 | Concave |

APPENDIX

```
0001:C   THIS IS EDITED MAIN PROGRAM FOR SHAPE
0002:         SUBROUTINE SHAPE(BODY,TANG,NUKCEL,IUNCL)
0003:C
0004:         REAL MX,MY,IX,IY
0005:         INTEGER BODY,A,B,C,BI,BI1,RIGHTB
0006:         INTEGER CAVEX,CONPTR
0007:         INTEGER OBJ1,OBJ2,POB
0008:         INTEGER AREA,BP,COUNT
0009:         INTEGER PAR,PTR,TER,SCAN,TYP
0010:         DIMENSION MX(20),MY(20),IX(20),IY(20),ENERGY(20)
0011:         DIMENSION BODY(1),NXTX(8,2),NXTY(2),IOUT(31),RATE(2)
0012:         DIMENSION PERCNT(2)
0013:         DIMENSION SCAN(2,20),PTR(2,20),TYP(20),PAR(20),TER(20),AREA(2
0014:        10),PERIM(20),BP(2,20,2),COUNT(2),LAST(2),KENDS(2,20)
0015:         DIMENSION CONPTR(2,20),TANG(30)
0016:         DIMENSION CAVEX(251,6),CONPER(251),CONERR(251),CURANG(251)
0017:         DIMENSION ALNECK(2,20),LOCBX(2,20,2),ILINE(256),ITYPE(256)
0018:        1,IBODY(256),ISEG(256),NECK(50,3)
0019:         DIMENSION LOCSEG(2,20)
0020:C C C C C C C C C C C C C C C C C C C C
0021:C
0022:C SHAPE BEGINS HERE
0023:C
0024:C C C C C C C C C C C C C C C C C C C C
0025:         LEFTB = BODY(2)/256
0026:         RIGHTB= (BODY(2).AND.X'FF')+5
0027:         TANG(1)=0.
0028:         FACT=630./11.
0029:         DO 567 I=2,21
0030:         X=I-1
0031:         TANG(I)=ATAN(X)*FACT
0032:567      CONTINUE
0033:         ICLA=1650
0034:         IF(NUKCEL.LT.0)ICLA=3912
0035:         NXTY(2)=-2
0036:         LUMP=2
0037:         SCAN(1,2)=255
0038:         CURNEK=1000.
0039:         IOVFL=0
0040:         NCAVEX=1
0041:         INEK=0
0042:         NO=1
0043:         SCAN(1,1)=0
0044:         SCAN(2,1)=0
0045:         COUNT(1)=0
0046:         JIFF=251
0047:         NOBJ=0
0048:         LINE = 255
0049:         LENRUN=0
0050:         NOLD=0
0051:         NNEW=0
0052:         DO 10 K=1,20
0053:         PAR(K)=0
0054:         TER(K)=0
0055:         AREA(K)=0
0056:         MX(K)=0
0057:         MY(K)=0
0058:         IX(K)=0
0059:         IY(K)=0
0060:         PERIM(K)=0
0061:         TYP(K)=0
0062:         DO 10 J=1,2
0063:         PTR(J,K)=0
0064:         SCAN(J,K)=0
0065:         LOCSEG(J,K)=-1
0066:         DO 10 I=1,2
0067:10       BP(I,K,J)=0
0068:         DO 12 I=1,JIFF
0069:12 CAVEX(I,1)=0
0070:C
0071:         DO 15 I=1,256
0072:         ISEG(I)=0
0073:         IBODY(I)=0
0074:         ILINE(I)=0
```

```
0075:15      ITYPE(I)=0
0076:20       N1=3-NO
0077:21      IF(NXTY(2).EQ.0) GO TO 325
0078:25      CALL NXTLIN (NXTX,NXTY,NR,KCLA,NUKCEL,BODY)
0079:        IF(NR.GT.9) GO TO 9897
0080:        IF(LUMP.GT.0)LUMP=NXTY(1)
0081:        IF(NR.GT.0)LENRUN=1
0082:        IF (NR.GT.0) GO TO 30
0083:        IF (LENRUN.EQ.0) GO TO 21
0084:        GO TO 36
0085:30      DO 35 I=1,NR
0086:        SCAN(N1,2*I)=NXTX(I,1)
0087:35      SCAN(N1,2*I+1)=NXTX(I,2)
0088:36      COUNT(N1)=NR*2
0089:        NOLD=NNEW
0090:        NNEW=NR*2
0091:C * * * *
0092:C   ERROR LOGIC FOLLOWS
0093:C
0094:        LIM = 2*NR+1
0095:        LLINE = -NXTY(1)
0096:        IF(LLINE.GT.LINE) GO TO 9895
0097:        IF(NR.LE.0) GO TO 39
0098:        DO 37 I = 2,LIM
0099:        IF(SCAN(N1,I).LE.SCAN(N1,I-1).OR.SCAN(N1,I).GT.RIGHTB.
0100:       + OR.SCAN(N1,I).LT.LEFTB) GO TO 9899
0101:   37   CONTINUE
0102:   39   LINE = -NXTY(1)
0103:        IFLAG=0
0104:        C=0
0105:        LAST(1)=0
0106:        LAST(2)=0
0107:        LR=1
0108:        N1=NO
0109:        NO=3-NO
0110:        N2=NO
0111:        SCAN(N2,NNEW+2)=255
0112:        K1=NNEW+2
0113:        DO 40 K=1,K1
0114:        LOCSEG(N2,K)=-1
0115:40      PTR(N2,K)=0
0116:        DO 45 K=1,NOBJ
0117:        DO 45 L=1,2
0118:45      BP(N2,K,L)=0
0119:        I=2
0120:        J=2
0121:50      IF (I.LE.NOLD+1) GO TO 100
0122:        IX1=1
0123:55      IF (J.GT.NNEW+1) GO TO 295
0124:        NOBJ=NOBJ+1
0125:        IF(NOBJ.GT.20) GO TO 9894
0126:        IF (IFLAG.EQ.0) GO TO 60
0127:        IFLAG=0
0128:        LOCBOX(N2,J-1,LR)=NOBJ
0129:60      TYP(NOBJ)=3-LR
0130:        TER(NOBJ)=1
0131:        PTR(N2,J)=NOBJ
0132:        PTR(N2,J+1)=NOBJ
0133:        BP(N2,NOBJ,LR)=J
0134:        BP(N2,NOBJ,3-LR)=J+1
0135:        K1=SCAN(N2,J)
0136:        K2=SCAN(N2,J+1)
0137:        N=N2
0138:        B=NOBJ
0139:        PERIM(B)=K2-K1
0140:        ENERGY(B)=0.
0141:        KENDS(2,B)=LINE
0142:        COMPTR(N2,J)=NCAVEX
0143:        COMPTR(N2,J+1)=NCAVEX
0144:        CAVEX(NCAVEX,1)=B
0145:        CONPER(NCAVEX)=PERIM(B)
0146:        CAVEX(NCAVEX,4)=1
0147:        CAVEX(NCAVEX,5)=0
0148:        CAVEX(NCAVEX,6)=0
0149:        IF(TYP(B).EQ.1) GO TO 65
0150:        CONERR(NCAVEX)=0.
```

```
0151:          CURANG(NCAVEX)=0.
0152:          CAVEX(NCAVEX,2)=0
0153:          GO TO 59
0154:       65 CONERR(NCAVEX)=0.
0155:          CURANG(NCAVEX)=180.
0156:          CAVEX(NCAVEX,2)=0
0157:       59 IF(NCAVEX.EQ.JIFF) GO TO 9898
0158:C
0159:          IF(NCAVEX.LT.JIFF) NCAVEX=NCAVEX+1
0160:          IF (LR.EQ.1) GO TO 85
0161:          DO 75 M=1,2
0162:          ICODE=7-M
0163:          J1=M-1
0164:           JPJ1=J+J1
0165:          CALL FINDX ICODE,N,JPJ1,I,DIST,LINUM,IBOD,ICON,SCAN,PTR,
0166:         +ITYPE,ILINE,IBODY,ISEG,LINE,CURNEK,CONPTR)
0167:          ALNECK(N,J+J1)=DIST
0168:          LOCSEG(N,JPJ1)=ICON
0169:          IF(LINUM.EQ.LINE)ALNECK(N,J+J1)=-DIST
0170:          LOCBD(N,J+J1,3-M)=B
0171:          LOCBD(N,J+J1,M)=IBOD
0172:          IF (LINUM.EQ.LINE.OR.IBOD.EQ.0) GO TO 75
0173:          IF(ICODE.EQ.5)CALL PUTNEK(DIST,B,IBOD,AREA,ICLA
0174:         +,NECK,INEK,NCAVEX-1,ICON)
0175:          IF(ICODE.EQ.6)CALL PUTNEK(DIST,IBOD,B,AREA,ICLA
0176:         +,NECK,INEK,NCAVEX-1,ICON)
0177:       75 CONTINUE
0178:          DIST=LINE-ILINE(K1)
0179:          MOD=ABS(LINE-ILINE(K1-1))
0180:          DXST1=DSFN(MOD)
0181:          IF(DXST1.GT.DIST)DIST=-DIST
0182:           LQ=0
0183:          CALL FINDO(K1,K2,LINE,LQ,DIST,PTR,IBODY,AREA,ILINE,N,J
0184:         1,ICLA,NECK,INEK,NCAVEX-1,ISEG)
0185:          IF (DIST.GT.-.0001) GO TO 80
0186:          MOD=ABS(LINE-ILINE(K2+1))
0187:          DXST1=DSFN(MOD)
0188:           QDIST=-DIST
0189:          IF(DXST1.GT.QDIST)CALL PUTNEK(QDIST,PTR(N,J),B
0190:         1,AREA,ICLA,NECK,INEK,NCAVEX-1,ISEG(K2))
0191:       80 ITYPE(K1)=2
0192:          ITYPE(K2)=1
0193:          ILINE(K1)=LINE
0194:          ILINE(K2)=LINE
0195:          IBODY(K1)=B
0196:          IBODY(K2)=B
0197:          ISEG(K1)=NCAVEX-1
0198:          ISEG(K2)=NCAVEX-1
0199:          L=4
0200:          GO TO 90
0201:       85 ILINE(K1)=LINE
0202:          ILINE(K2)=LINE
0203:          ITYPE(K1)=1
0204:           ITYPE(K2)=2
0205:          IBODY(K1)=B
0206:          IBODY(K2)=B
0207:          ISEG(K1)=NCAVEX-1
0208:          ISEG(K2)=NCAVEX-1
0209:          ALNECK(N,J)=K2-K1
0210:          ALNECK(N,J+1)=K2-K1
0211:          LOCBD(N,J,1)=B
0212:          LOCBD(N,J,2)=B
0213:          LOCBD(N,J+1,1)=B
0214:          LOCBD(N,J+1,2)=B
0215:          LOCSEG(N,J)=NCAVEX-1
0216:          LOCSEG(N,J+1)=NCAVEX-1
0217:          L=3
0218:       90 K1=K1+1
0219:          K2=K2-1
0220:          IF (K2.LT.K1) GO TO 95
0221:          DO 92 KM=K1,K2
0222:          ILINE(KM)=LINE
0223:          IBODY(KM)=B
0224:          ISEG(KM)=NCAVEX-1
0225:       92 ITYPE(KM)=L
0226:       95 J=J+2
0227:          IF (IX1.EQ.1) GO TO 55
```

```
0228:         K=TYP(NOBJ)
0229:         PAR(NOBJ)=LAST(3-K)
0230:100      IF (J.GT.NNEW+1) GO TO 185
0231:         IX1=0
0232:         IF (SCAN(N1,I-1).GT.SCAN(N2,J).OR.SCAN(N1,I).GT.SCAN(N2,J+1)) GO T
0233:         10 55
0234:         IF (SCAN(N2,J).GT.SCAN(N1,I+1).OR.SCAN(N2,J-1).GT.SCAN(N1,I)) GO T
0235:         10 185
0236:         B=PTR(N1,I)
0237:         BP(N2,B,LR)=J
0238:          IF(IFLAG.EQ.0)GO TO 105
0239:         IFLAG=0
0240:         LOCBD(N2,J-1,LR)=B
0241:105      PTR(N2,J)=PTR(N1,I)
0242:         K1=SCAN(N2,J)
0243:         K2=SCAN(N1,I)
0244:         MOD=ABS(K1-K2)
0245:         PMOD=DSFN(MOD)
0246:         PERIM(B)=PERIM(B)+PMOD
0247:         NCAV=CONPTR(N1,I)
0248:         IX1=SCAN(N1,I)
0249:         IX2=SCAN(N2,J)
0250:         IARG=ABS(IX1-IX2)+1
0251:          IF(IARG.GT.21)IARG=21
0252:         CONPTR(N2,J)=NCAV
0253:         IF(LR.EQ.2) GO TO 115
0254:         ANGLE=TANG(IARG)+90.
0255:         IF(IX2.LT.IX1) ANGLE=90.-TANG(IARG)
0256:         ANGC=ABS(ANGLE-CURANG(NCAV))
0257:         ENERGY(B)=ENERGY(B)+ANGC*ANGC/PMOD
0258:         IF(CAVEX(NCAV,2))113,114,112
0259:    112   ICERR=0
0260:         IF(ABS(ANGLE-CURANG(NCAV)).LE..001) GO TO 118
0261:         ICERR=-1
0262:         IF(ANGLE.LT.CURANG(NCAV)-.001) GO TO 118
0263:    111  CURANG(NCAV)=ANGLE
0264:         CONPER(NCAV)=CONPER(NCAV)+PMOD
0265:         CAVEX(NCAV,4)=CAVEX(NCAV,4)+1
0266:         GO TO 119
0267:    113  ICERR=0
0268:         IF(ABS(ANGLE-CURANG(NCAV)).LE..001) GO TO 118
0269:         ICERR=1
0270:         IF(ANGLE.GT.CURANG(NCAV)+.001) GO TO 118
0271:         GO TO 111
0272:    114  ICERR=1
0273:         IF(ANGLE.GT.CURANG(NCAV)+.001) GO TO 118
0274:         ICERR=-1
0275:         IF(ANGLE.LT.CURANG(NCAV)-.001) GO TO 118
0276:         GO TO 111
0277:    115  ANGLE=TANG(IARG)+270.
0278:         IF(IX2.LT.IX1) ANGLE=270.-TANG(IARG)
0279:         ANGC=ABS(ANGLE-CURANG(NCAV))
0280:         ENERGY(B)=ENERGY(B)+ANGC*ANGC/PMOD
0281:         IF(CAVEX(NCAV,2))117,127,126
0282:    126  ICERR=0
0283:         IF(ABS(ANGLE-CURANG(NCAV)).LE..001) GO TO 118
0284:         ICERR=-1
0285:         IF(ANGLE.GT.CURANG(NCAV)+.001) GO TO 118
0286:    116  CURANG(NCAV)=ANGLE
0287:         CONPER(NCAV)=CONPER(NCAV)+PMOD
0288:         CAVEX(NCAV,4)=CAVEX(NCAV,4)+1
0289:         GO TO 119
0290:    117  ICERR=0
0291:         IF(ABS(ANGLE-CURANG(NCAV)).LE..001) GO TO 118
0292:         ICERR=1
0293:         IF(ANGLE.LT.CURANG(NCAV)-.001) GO TO 118
0294:         GO TO 116
0295:    127  ICERR=1
0296:         IF(ABS(CURANG(NCAV)).LE..001) GO TO 118
0297:         IF(ANGLE.LT.CURANG(NCAV)-.001) GO TO 118
0298:         ICERR=-1
0299:         IF(ANGLE.GT.CURANG(NCAV)+.001) GO TO 118
0300:         GO TO 116
0301:    118  CONPTR(N2,J)=NCAVEX
0302:         IF(CURANG(NCAV).EQ.180.) GO TO 128
```

```
0303:            CONERR(NCAV)=CURANG(NCAV)-CONERR(NCAV)
0304:            IF(LR.EQ.2) CONERR(NCAV)=-CONERR(NCAV)
0305:128         IF(LR.EQ.1)CAVEX(NCAV,3)=ANGLE-CURANG(NCAV)
0306:            IF(LR.EQ.2)CAVEX(NCAVEX,3)=CURANG(NCAV)-ANGLE
0307:            IF(LR.EQ.1.AND.CAVEX(NCAV,3).LT.-180)
0308:           + CAVEX(NCAV,3)=360.+CAVEX(NCAV,3)
0309:            IF(LR.EQ.2.AND.CAVEX(NCAVEX,3).LT.-180)
0310:           + CAVEX(NCAVEX,3)=360.+CAVEX(NCAVEX,3)
0311:            CAVEX(NCAV,7-LR)=NCAVEX
0312:            CAVEX(NCAVEX,4+LR)=NCAV
0313:            CONERR(NCAVEX)=ANGLE
0314:            CURANG(NCAVEX)=ANGLE
0315:            CAVEX(NCAVEX,2)=ICERR
0316:            CONPER(NCAVEX)=PMOD
0317:            CAVEX(NCAVEX,1)=B
0318:            CAVEX(NCAVEX,4)=1
0319:            IF(NCAVEX.EQ.JIFF) GO TO 9898
0320:C
0321:            IF(NCAVEX.LT.JIFF) NCAVEX=NCAVEX+1
0322:            NCAV=NCAVEX-1
0323:    119 LOCBD(N2,J,LR)=B
0324:            CALL FIND(LR,N2,J,I,ALNECK(N2,J),LINUM,LOCBD(N2,J,3-LR),
0325:           +ICON,SCAN,PTR,ITYPE,ILINE,IBODY,ISEG,LINE,CURNEK,CONPTR)
0326:            LOCSEG(N2,J)=ICON
0327:            IF (ALNECK(N1,I).LT.0.) GO TO 155
0328:            IF ((ALNECK(N1,I)-ALNECK(N2,J)).LT.0.001) GO TO 160
0329:150         ALNECK(N2,J)=-ALNECK(N2,J)
0330:            GO TO 160
0331:155         IF (ALNECK(N2,J)+ALNECK(N1,I).LT.+.001) GO TO 150
0332:            QLNECK=-ALNECK(N1,I)
0333:            ICON=LOCSEG(N1,I)
0334:            CALL PUTNEK(QLNECK,LOCBD(N1,I,1),LOCBD(N1,I,2),AREA
0335:           1,ICLA,NECK,INEK,NCAV,ICON)
0336:160         INC=1
0337:            IF(K2.LT.K1)INC=-1
0338:            ILINE(K1)=LINE
0339:            IBODY(K1)=B
0340:            ISEG(K1)=NCAV
0341:            ITYPE(K1)=LR
0342:            IF (K1.EQ.K2.OR.K1+INC.EQ.K2) GO TO 170
0343:            K3=K2-INC
0344:            K4=K1+INC
0345:            IF(K2.LT.K1)K4=K3
0346:            IF(K2.LT.K1)K3=K1+INC
0347:            DO 165 M=K4,K3
0348:            ILINE(M)=LINE-(2*(M-K1))/(K2-K1)
0349:            IBODY(M)=B
0350:            ISEG(M)=NCAV
0351:165         ITYPE(M)=LR
0352:170         K=TYP(B)
0353:            LAST(K)=B
0354:            IF(BP(N2,B,3-LR).GT.0)LAST(K)=0
0355:            I=I+1
0356:            J=J+1
0357:            LR=3-LR
0358:            GO TO 50
0359:185         BI=PTR(N1,I)
0360:            BI1=PTR(N1,I+1)
0361:            IF (BI.EQ.BI1) GO TO 290
0362:            IF (TYP(BI).NE.TYP(BI1)) GO TO 195
0363:            A=BP(N1,BI1,LR)
0364:            PTR(N1,A)=BI
0365:            BP(N1,BI,LR)=A
0366:            TER(BI1)=4
0367:            DO 190 K=1,NOBJ
0368:190         IF(PAR(K).EQ.BI1)PAR(K)=BI
0369:            L=2
0370:            GO TO 215
0371:195         IF (PAR(BI1).NE.BI) GO TO 205
0372:            A=BP(N1,BI1,LR)
0373:            PTR(N1,A)=BI
0374:            BP(N1,BI,LR)=A
0375:            TER(BI1)=5
0376:            DO 200 K=1,NOBJ
0377:200         IF(PAR(K).EQ.BI1)PAR(K)=PAR(BI)
0378:            L=3
0379:            GO TO 215
0380:205         A=BP(N2,BI,3-LR)
```

```
0381:            PTR(N2,A)=BI1
0382:            BP(N2,BI1,3-LR)=A
0383:            TER(BI)=5
0384:            DO 210 K=1,NOBJ
0385:  210       IF(PAR(K).EQ.BI)PAR(K)=PAR(BI1)
0386:            L=7
0387:            B=BI1
0388:            C=BI
0389:            GO TO 225
0390:  215       C=BI1
0391:  220       B=BI
0392:  225       N=N1
0393:            INC=1
0394:            NCAV1=CONPTR(N,I)
0395:             NCAV2=CONPTR(N,I+1)
0396:            IF(LR.EQ.2) GO TO 600
0397:            CAVEX(NCAV1,3)=180-CURANG(NCAV1)
0398:            CAVEX(NCAVEX,3)=CURANG(NCAV2)-180
0399:            CONERR(NCAV1)=CURANG(NCAV1)-CONERR(NCAV1)
0400:            CONERR(NCAV2)=CONERR(NCAV2)-CURANG(NCAV2)
0401:            GO TO 602
0402:  600       CAVEX(NCAVEX,3)=CURANG(NCAV1)-360
0403:            CAVEX(NCAV2,3)=-CURANG(NCAV2)
0404:            CONERR(NCAV1)=CONERR(NCAV1)-CURANG(NCAV1)
0405:            CONERR(NCAV2)=CURANG(NCAV2)-CONERR(NCAV2)
0406:  602       CAVEX(NCAV1,7-LR)=NCAVEX
0407:            CAVEX(NCAVEX,7-LR)=NCAV2
0408:            CAVEX(NCAVEX,4+LR)=NCAV1
0409:            CAVEX(NCAV2,4+LR)=NCAVEX
0410:            CONERR(NCAVEX)=0.
0411:            CONPER(NCAVEX)=SCAN(N,I+1)-SCAN(N,I)
0412:            CAVEX(NCAVEX,4)=1
0413:            CAVEX(NCAVEX,1)=B
0414:            CAVEX(NCAVEX,2)=0
0415:            ANGC=ABS(CAVEX(NCAV1,3))+ABS(CAVEX(NCAV2,3))
0416:            ENERGY(B)=ENERGY(B)+ANGC*ANGC/(SCAN(N,I+1)-SCAN(N,I))
0417:             IF(NCAVEX.EQ.JIFF) GO TO 9898
0418:C
0419:            IF(NCAVEX.LT.JIFF) NCAVEX=NCAVEX+1
0420:            IF (L.EQ.2) GO TO 245
0421:            IF (L.EQ.3.OR.L.EQ.7) GO TO 250
0422:            L=-3
0423:            IF (TYP(B).EQ.1) GO TO 265
0424:            K1=SCAN(N,I)
0425:            K2=SCAN(N,I+1)
0426:            INC=0
0427:            GO TO 255
0428:  245       PERIM(B)=PERIM(B)+PERIM(C)+SCAN(N,I+1)-SCAN(N,I)
0429:            AREA(B)=AREA(B)+AREA(C)
0430:            ENERGY(B)=ENERGY(B)+ENERGY(C)
0431:            MX(B)=MX(B)+MX(C)
0432:            MY(B)=MY(B)+MY(C)
0433:            IX(B)=IX(B)+IX(C)
0434:            IY(B)=IY(B)+IY(C)
0435:            IF(KENDS(2,B).LT.KENDS(2,C)) KENDS(2,B)=KENDS(2,C)
0436:            IF (TYP(B).EQ.1) GO TO 255
0437:            L=-3
0438:            GO TO 265
0439:  250       PERIM(B)=PERIM(B)+PERIM(C)+SCAN(N,I+1)-SCAN(N,I)
0440:            ENERGY(B)=ENERGY(B)+ENERGY(C)
0441:            L=-3
0442:            IF (TYP(B).EQ.1) GO TO 265
0443:  255       K1=SCAN(N,I)+1
0444:            K2=SCAN(N,I+1)-1
0445:            IF (K2.LT.K1) GO TO 260
0446:            DIST=LINE-ILINE(K1)
0447:             LQ=1
0448:            CALL FINDO(K1,K2,LINE,LQ,DIST,PTR,IBODY,AREA,ILINE,N,I
0449:           1,ICLA,NECK,INEK,NCAVEX-1,ISEG)
0450:C C C C C C C C C C C C C C C C C
0451:  260       L=4
0452:            IF (INC.EQ.0) GO TO 270
0453:  265       K1=SCAN(N,I)+1
0454:            K2=SCAN(N,I+1)-1
0455:            IF (K2.LT.K1) GO TO 275
0456:  270       DO 272 KM=K1,K2
0457:            ILINE(KM)=LINE-INC
```

```
0458:          IBODY(KM)=B
0459:          ISEG(KM)=NCAVEX-1
0460:272       ITYPE(KM)=L
0461:   275 I=I+2
0462:          GO TO 50
0463:290       TER(BI)=3
0464:          KENDS(1,BI)=LINE
0465:          PERIM(BI)=PERIM(BI)+SCAN(N1,I+1)-SCAN(N1,I)
0466:          L=6
0467:          GO TO 220
0468:295       N=N2
0469:          M=1
0470:305       M=M+1
0471:          KST=1000
0472:          IF(M.GT.NNEW)GO TO 20
0473:          OBJ1=PTR(N,M)
0474:          OBJ2=PTR(N,M+1)
0475:          SK3=SCAN(N,M+1)
0476:          SK2=SCAN(N,M)
0477:          K1=SK3-SK2
0478:          IF (OBJ1.NE.OBJ2) GO TO 310
0479:          POB=OBJ1
0480:          GO TO 320
0481:310       IF (PAR(OBJ1).NE.PAR(OBJ2)) GO TO 315
0482:          POB=PAR(OBJ1)
0483:          IF (POB) 305,305,320
0484:315       POB=OBJ1
0485:          IF(PAR(OBJ1).EQ.OBJ2)POB=OBJ2
0486:320       AREA(POB)=AREA(POB)+K1
0487:          MX(POB)=MX(POB)+K1*LINE
0488:          MY(POB)=MY(POB)+K1*(SK2+SK3)/2
0489:          IX(POB)=IX(POB)+K1*FLOAT(LINE)*LINE
0490:          IY(POB)=IY(POB)+(SK3**3.-SK2**3.)/3.
0491:          GO TO 305
0492:325       PERCNT(1)=.100
0493:          PERCNT(2)=.1
0494:          DO 326 I=1,NCAVEX
0495:          IF(CAVEX(I,4).EQ.1)CAVEX(I,2)=0
0496:326       CONTINUE
0497:          NUKCEL=33
0498:          DO 1550 I=1,NUKCEL
0499:          TANG(I)=0.
0500: 1550    IOUT(I)=0
0501:          IF(NOBJ.EQ.0) GO TO 2700
0502:          R=0.
0503:          NC=NCAVEX-1
0504:          RATE(1)=0.
0505:          RATE(2)=0.
0506:          OT8=0.
0507:          OT9=0.
0508:          OT10=0.
0509:          OT11=0.
0510:          DO 1599 I=1,NOBJ
0511:          IF(TER(I).NE.3) GO TO 1499
0512:          DO 1590 K=1,NC
0513:          LINK=K
0514:          IF(CAVEX(LINK,1).NE.I)GO TO 1490
0515:          ISTART=LINK
0516: 1489    IT=CAVEX(LINK,2)
0517:          IF(IT.LT.0) GO TO 1500
0518:          IF(IT.EQ.0) GO TO 1600
0519:          IF(IT.GT.0) GO TO 1700
0520:1500     IOUT(16)=IOUT(16)+1
0521:          IOUT(21)=IOUT(21)+CONERR(LINK)
0522:          RT=CONERR(LINK)/CONPER(LINK)
0523:          IF(RATE(2).GT.RT) RATE(2)=RT
0524:          GO TO 1800
0525: 1600    IOUT(19)=IOUT(19)+1
0526:          GO TO 1800
0527: 1700    IOUT(18) = IOUT(18) + 1
0528:          IOUT(20) = IOUT(20) + CONERR(LINK)
0529:          RT=CONERR(LINK)/CONPER(LINK)
0530:          IF(RATE(1).LT.RT) RATE(1)=RT
0531:1800     LINK=CAVEX(LINK,6)
0532:          IF(LINK.NE.ISTART) GO TO 1489
0533:          GO TO 1499
```

```
0534:1490       CONTINUE
0535:1590       CONTINUE
0536:1499       CONTINUE
0537:1599       CONTINUE
0538:  1502     K=0
0539:           XTOL=0.
0540:           DO 335 I=1,NOBJ
0541:           IF (TER(I).NE.3) GO TO 335
0542:           K=K+1
0543:           IF(TYP(I).EQ.2)XTOL=XTOL+AREA(I)
0544:           ILINE(K)=I
0545: 335       CONTINUE
0546:           DO 345 I=1,K
0547:           L=ILINE(I)
0548:           IF(TYP(L).EQ.2) GO TO 345
0549:           IF(AREA(L).LT.XTOL*PERCNT(2)) GO TO 342
0550:           IOUT(2)=IOUT(2)+1
0551:           GO TO 345
0552:    342    IOUT(6)=IOUT(6)+AREA(L)
0553:           OT8=OT8+MX(L)
0554:           OT9=OT9+MY(L)
0555:           OT10=OT10+IX(L)
0556:           OT11=OT11+IY(L)
0557:           IOUT(3)=IOUT(3)+AREA(L)
0558:    345    CONTINUE
0559:           KST=1000
0560:           KEND=0
0561:           DO 355 I=1,K
0562:           L=ILINE(I)
0563:           IF(TYP(L).EQ.1) GO TO 355
0564:           IF(AREA(L).LT.XTOL*PERCNT(1)) GO TO 352
0565:           IF(KST.GT.KENDS(1,L)) KST=KENDS(1,L)
0566:           IF(KEND.LT.KENDS(2,L)) KEND=KENDS(2,L)
0567:           IOUT(1)=IOUT(1)+1
0568:           IOUT(3)=IOUT(3)+AREA(L)
0569:           IOUT(4)=IOUT(4)+PERIM(L)
0570:           R=R+ENERGY(L)
0571:           OT8=OT8+MX(L)
0572:           OT9=OT9+MY(L)
0573:           OT10=OT10+IX(L)
0574:           OT11=OT11+IY(L)
0575:           GO TO 355
0576:    352    IOUT(5)=IOUT(5)+AREA(L)
0577:    355    CONTINUE
0578:           IOUT(7)=KEND-KST
0579:           APPLES=IOUT(3)
0580:           IOUT(3)=IOUT(3)-IOUT(5)+IOUT(6)
0581:           IOUT(8)=OT9/APPLES
0582:           IOUT(9)=OT8/APPLES
0583:           IOUT(10)=(OT10-APPLES*IOUT(9)*IOUT(9))/1000.
0584:           IOUT(11)=(OT11-APPLES*IOUT(8)*IOUT(8))/1000.
0585:           IOUT(12)=IOUT(10)+IOUT(11)
0586:           CALL LOBE1(CAVEX,CONPER,NECK,NCAVEX,INEK,TER,TYP,PERIM,
0587:          +NOBJ,AREA,IOUT)
0588:           DO 2626 I=1,NUKCEL
0589:   2626    TANG(I)=IOUT(I)
0590:           TANG(22)=RATE(1)
0591:           TANG(23)=RATE(2)
0592:           TANG(24)=TANG(4)**2/TANG(3)
0593:           TANG(25)=TANG(3)/TANG(4)
0594:           TANG(26)=TANG(5)/TANG(3)
0595:           TANG(27)=TANG(6)/TANG(3)
0596:           TANG(28)=TANG(13)/TANG(7)
0597:           TANG(29)=TANG(13)/TANG(24)
0598:           TANG(30)=TANG(13)/TANG(25)
0599:           TANG(31)=R/TANG(4)
0600:           SK2=KCLA-TANG(3)
0601:           IF(SK2.LT.0.1) GO TO 2700
0602:           TANG(33)=SK2/TANG(3)
0603:   2700    TANG(32)=KCLA-TANG(3)
0604:           IUNCL = 0
0605:           RETURN
0606:  C
0607:   9894    CONTINUE
0608:           *SBIT     0,IUNCL,Z
0609:           GO TO 9999
0610:   9895    CONTINUE
```

```
0611:        *SBIT       1,IUNCL,Z
0612:          GO TO 9999
0613:9896  CONTINUE
0614:        *SBIT       5,IUNCL,Z
0615:          GO TO 9999
0616: 9897  CONTINUE
0617:        *SBIT       2,IUNCL,Z
0618:          GO TO 9999
0619: 9898  CONTINUE
0620:        *SBIT       3,IUNCL,Z
0621:          GO TO 9999
0622: 9899  CONTINUE
0623:        *SBIT       4,IUNCL,Z
0624: 9999  RETURN
0625:C
0626:         END

0001:C
0002:         SUBROUTINE LOBE1(CAVEX,CONPER,NECK,NCAVEX,INEK,TER,
0003:        +TYP,PERIM,NOBJ,AREA,NLB)
0004:         INTEGER TER,TYP,CAVEX,AREA
0005:         DIMENSION CAVEX(251,6),NECK(50,3)
0006:         DIMENSION TER(20),TYP(20),PERIM(20),CONPER(251)
0007:         DIMENSION NLB(30),AREA(20)
0008:C
0009:         NLB(13)=999
0010:         NLB(14)=0
0011:         NLB(15)=0
0012:         NLB(17)=NLB(1)
0013:         P1=0.15
0014:         P2=2.5
0015:         P3=0.15
0016:         NOB=NOBJ
0017:         TOTPR=0.
0018:         DO 100 I=1,NOBJ
0019:         IF(TER(I).NE.3) GO TO 100
0020:         DO 50 J=1,NCAVEX
0021:         IF(CAVEX(J,1).EQ.I) GO TO 60
0022:     50 CONTINUE
0023:     60 IEND=CAVEX(J,5)
0024:         CALL CHANGE(I,CAVEX,J,IEND)
0025:         IF(TYP(I).EQ.2) TOTPR=TOTPR+PERIM(I)
0026:    100 CONTINUE
0027:      5 MIN=999
0028:         IF(INEK.EQ.0) GO TO 11
0029:         DO 10 IN=1,INEK
0030:         IF(NECK(IN,1).GE.MIN) GO TO 10
0031:         IN1=IN
0032:         MIN=NECK(IN,1)
0033:     10 CONTINUE
0034:         IF(MIN.NE.999) GO TO 12
0035:11       IF(NLB(13).NE.999) RETURN
0036:         NLB(13)=25
0037:         NLB(15)=25
0038:         RETURN
0039:12       ISTART=NECK(IN1,2)
0040:         IEND=NECK(IN1,3)
0041:         IF(ISTART.LE.0.OR.IEND.LE.0) GO TO 15
0042:         IF(ISTART.GT.NCAVEX.OR.IEND.GT.NCAVEX) GO TO 15
0043:         IF(ISTART.GE.251.OR.IEND.GE.251) GO TO 15
0044:         IOB=CAVEX(ISTART,1)
0045:         IF(IOB.EQ.CAVEX(IEND,1)) GO TO 13
0046:         IOB1=CAVEX(IEND,1)
0047:         IF(TYP(IOB).EQ.TYP(IOB1)) GO TO 15
0048:         IF(TYP(IOB).EQ.2) IOB=IOB1
0049:         IF(AREA(IOB).LT.0.1*NLB(3)) GO TO 15
0050:         IF(MIN.LT.NLB(13)) NLB(13)=MIN
0051:         NLB(14)=NLB(14)+1
0052:         IF(MIN.GT.NLB(15)) NLB(15)=MIN
0053:         GO TO 15
0054:13       IF(TYP(IOB).NE.2) GO TO 15
0055:         IF(PERIM(IOB).LT.P3*TOTPR) GO TO 15
0056:         GO TO 20
0057:     15 NECK(IN1,1)=999
0058:         GO TO 5
0059:     20 LINK=ISTART
0060:         PRM=0.
```

```
0061:    25 PRM=PRM+CONPER(LINK)
0062:       IF(LINK.GE.251) GO TO 15
0063:       IF(LINK.EQ.IEND) GO TO 30
0064:       LINK=CAVEX(LINK,6)
0065:       GO TO 25
0066: 30    PRM1=PRM
0067:       IF(PRM1.GT.(PERIM(IOB)-PRM1))PRM1=PERIM(IOB)-PRM1
0068:       IF(PRM1.LT.P1*PERIM(IOB))GO TO 15
0069:       NLB(14)=NLB(14)+1
0070:       IF(MIN.GT.NLB(15)) NLB(15)=MIN
0071:       PQ=1.*PRM1/MIN
0072:       IF(PQ.LT.P2)GO TO 15
0073:       IF(MIN.LT.NLB(13)) NLB(13)=MIN
0074:       IF(MIN.GT.10) GO TO 15
0075:       NOB=NOB+1
0076:       IF(NOB.GT.20) RETURN
0077:       PERIM(NOB)=PRM1
0078:       TYP(NOB)=2
0079:       PERIM(IOB)=PERIM(IOB)-PRM1
0080:       CALL CHANGE(NOB,CAVEX,ISTART,IEND)
0081:       IST1=CAVEX(ISTART,5)
0082:       IEND1=CAVEX(IEND,6)
0083:       CAVEX(IEND,6)=ISTART
0084:       CAVEX(ISTART,5)=IEND
0085:       CAVEX(IST1,6)=IEND1
0086:       CAVEX(IEND1,5)=IST1
0087:       NLB(17)=NLB(17)+1
0088:       GO TO 5
0089:       END

0001: C-----SUBROUTINE THAT COMPUTES LOCAL NECK-CALLED BY PARAM
0002:       SUBROUTINE FIND(ICODE,N,J,I,DIST,LINUM,IBOD,ICON,SCAN,
0003:      1PTR,ITYPE,ILINE,IBODY,ISEG,LINE,CURNEK,CONPTR)
0004:       INTEGER SCAN,PTR,CONPTR
0005:       DIMENSION SCAN(2,20),PTR(2,20),CONPTR(2,20)
0006:       DIMENSION ITYPE(256),ILINE(256),IBODY(256),ISEG(256)
0007:       INC=3-ICODE-ICODE
0008:       IF(ICODE.GT.4)INC=11-ICODE-ICODE
0009:       K1=SCAN(N,J)
0010:       K2=SCAN(N,J+INC)
0011:       IY=INC*(K2-K1)
0012:       Y=IY
0013:       LINUM=LINE
0014:       IBOD=PTR(N,J)
0015:       ICON=CONPTR(N,J+INC)
0016:       IF(ICODE.EQ.1) ICON=-1
0017:       DIST=Y
0018:       IFLAG=0
0019:       IF(Y.GT.CURNEK)Y=CURNEK
0020:       IY=Y+0.5
0021:       IYY=IY*IY
0022:       IX=0
0023:       K2=K2-INC
0024:       M=K1
0025:       IF(PTR(N,J).NE.PTR(3-N,I))GO TO 9
0026:       IF(INC*(SCAN(3-N,I)-K1).LE.0)GO TO 9
0027:       M1=SCAN(3-N,I)+INC
0028:       IX=INC*(M1-M)
0029:       M=M1
0030:       IYY=IYY-IX*IX
0031: 9     ICOD1=3-ICODE
0032:       IF(M-INC.EQ.K2) RETURN
0033: 10    IF(ICODE.GT.4)GO TO 20
0034:       IF(ITYPE(M).NE.ICOD1)GO TO 30
0035: 20    LD=LINE-ILINE(M)
0036:       LD=LD*LD
0037:       IF(LD.GT.IYY)GO TO 30
0038:       IFLAG=1
0039:       IYY=LD
0040:       LINUM=ILINE(M)
0041:       IBOD=IBODY(M)
0042:       ICON=ISEG(M)
0043: 30    IF(M.EQ.K2)GO TO 40
0044:       M=M+INC
0045:       IYY=IYY-2*IX-1
0046:       IX=IX+1
0047:       IF(IYY.GT.0)GO TO 10
```

```
0048:40      IF( IFLAG.EQ.0)RETURN
0049:        Y=IYY+IX*IX
0050:        DIST=SQRT(Y)
0051:        RETURN
0052:        END

0001:        SUBROUTINE FINDO(K1,K2,LINE,INC,DIST,PTR,IBODY,AREA,ILINE,
0002:       1N,J,KCLA,NECK,INEK,ICON,ISEG)
0003:        INTEGER AREA,PTR
0004:        DIMENSION AREA(20),PTR(2,20)
0005:        DIMENSION IBODY(256),ILINE(256),ISEG(256)
0006:        DIMENSION NECK(50,3)
0007:        DIST1=ABS(DIST)
0008:        CALL PUTNEK(DIST1,PTR(N,J),IBODY(K1),AREA,KCLA
0009:       1 ,NECK,INEK,ICON,ISEG(K1))
0010:        K1=K1+1
0011:        DO 20 M=K1,K2
0012:        DIST1=LINE-INC-ILINE(M)
0013:        IF (DIST.LT.0) GO TO 10
0014:        IF (DIST1.LT.DIST) GO TO 5
0015:        DIST=DIST1
0016:        GO TO 20
0017:5       DIST=-DIST1
0018:        GO TO 20
0019:10      IF (-DIST.LT.DIST1) GO TO 15
0020:        DIST=-DIST1
0021:        GO TO 20
0022:15      QDIST=-DIST
0023:        CALL PUTNEK(QDIST,PTR(N,J),IBODY(M-1),AREA,KCLA,
0024:       +NECK,INEK,ICON,ISEG(M-1))
0025:        DIST=DIST1
0026:20      CONTINUE
0027:        RETURN
0028:        END

0001:C------SUBROUTINE THAT PUTS NECK VALUES, ETC. FOR OUTPUT LATER.
0002:        SUBROUTINE PUTNEK(D,IBOD1,IBOD2,AREA,KCLA
0003:       +,NECK,INEK,ICON1,ICON2)
0004:        INTEGER AREA
0005:        DIMENSION AREA(20),NECK(50,3)
0006:C
0007:        AR=AREA(IBOD1)
0008:        IF(AR.LT.AREA(IBOD2)) AR=AREA(IBOD2)
0009:        IF(AR.LT..050*KCLA)RETURN
0010:        INEK=INEK+1
0011:        IF(INEK.GT.50) INEK=50
0012:        NECK(INEK,1)=D
0013:        NECK(INEK,2)=ICON1
0014:        NECK(INEK,3)=ICON2
0015:        IF(D.LT.0.5) NECK(INEK,1)=1
0016:        RETURN
0017:        END

0001:C
0002:        SUBROUTINE CHANGE(ID,CAVEX,ISTART,IEND)
0003:        INTEGER CAVEX(251,6)
0004:        LINK=ISTART
0005:9       CAVEX(LINK,1)=ID
0006:        IF(LINK.EQ.IEND.OR.LINK.GE.251)RETURN
0007:        LINK=CAVEX(LINK,6)
0008:        GO TO 9
0009:        END

0001:C       FUNCTION TO COMPUTE DISTANCE.
0002:        FUNCTION DSFN(MOD)
0003:        IF(MOD.LT.5) GO TO 10
0004:        DSFN=FLOAT(MOD)
0005:        RETURN
0006:10      MM=2**(MOD)
0007:        A=FLOAT(MM)
0008:        DSFN=MOD+A
0009:        RETURN
0010:        END
```

```
00/00/00        PAGE 001
                0001  *
                0002  *   70197-AH
                0003  *   X/Y COORDINATE DATA UNPACKING SUBROUTINE
                0004  *   JULY 22,1976
                0005  *   B.F.HULL
                0006  *
                0007  *
                0008  *
                0009  *-=-=-=-=-=-=-=-=-=-=-=-=-=-=-=-=-=-=-=
                0010  *
                0011  *   N X T L I N
                0012  *
                0013  *
                0014  *
                0015  *
                0016  *   MAIN ENTRY:
                0017              DEF      NXTLIN
                0018  *
                0019  *   MAIN RETURN:
                0020              REF      F$RET
                0021  *
                0022  *   REQUIRED SUBROUTINES:
                0023              REF      F$SBT
                0024  *
                0025  *
                0026  *-=-=-=-=-=-=-=-=-=-=-=-=-=-=-=-=-=-=-=
                0027  *
0000            0028              DSECT    0
                0029  *
0000            0030  REGS        DS       9
0009            0031  XA          DS       1
000A            0032  YA          DS       1
000B            0033  NRA         DS       1
000C            0034  AREA        DS       1
000D            0035  ICLAA       DS       1
000E            0036  BODYA       DS       1
                0037  *
000F            0038  XA2         DS       1
0010            0039  TEMP        DS       1
                0040  *

00/00/00        PAGE 002
        0011    0041  DL          EQU      $-$$
                0042  *
0000            0043              PSECT
                0044  *
                0045  NXTLIN ENT  DL
0000  F4C0
0001  C020
0002  09D5
0003  0139
0004  0011
0005  D020
0006  05E1
0007  6449    0046              JSR      F$SBT
                0047  *
0008  06A0    0048              ZERO     C
0009  0640    0049              ZERO     Y       CLEAR NOW AS CONTINUATING    FLAG
000A  DCAB    0050              STR      C,*NRA       RESET RUN #
000B  CF2A    0051              LDR      X,*YA,Z      CHECK IF DONE
000C  0935    0052              RTR      X,X
000D  2C42    0053              SKZ      NXT8         DONE.
000E  2E0B    0054              SKP      NXT1         GOING.
000F  DCAC    0055              STR      C,*AREA
0010  0155    0056              LDV      Y,3          START:
0011  0003
0012  CE2E    0057              LDR      X,*BODYA,Y   DATA INDEX
0013  0939    0058              ADD      X,X          *2
0014  0136    0059              SUBV     X,57         -57
0015  0039
0016  DF2A    0060              STR      X,*YA,Z      =BYTE INDEX
0017  8F4E    0061              LDBY     Y,*BODYA,Z   INITIAL Y
0018  0740    0062              CMPL     Y            -Y - 1
0019  DC4A    0063              STR      Y,*YA
                0064  *
```

```
001A  FC0A        0065  NXT1    INCM    *YA         Y + 1
001B  0126        0066          SUBVC   X,11        DONE ?
001C  000B
001D  262A        0067          SKM     NXT2        YES.
001E  8DAE        0068          LDBY    C,*BODYA,X  Y POSITION
001F  4C0A        0069          LDA     *YA
0020  0D19        0070          ADD     A,C

00/00/00   PAGE 003
0021  2C04        0071          SKZ     OK          NORMAL MATCH - OK
0022  2627        0072          SKM     NXT4        A GAP HAS BEEN DETECTED
0023  0700        0073          CMPL    A           OUT OF SYNC
0024  5C0B        0074          STA     *NRA        MAKE # RUN LTS NEGATIVE
0025  7022        0075          JMP     NXT2        AND TERMINATE CELL
                  0076  *
0026  0640        0077  OK      ZERO    Y
0027  C889        0078          LDR     B,XA        XL ADDR
0028  0199        0079          ADDV    B,8         +8 = XR ADDRESS
0029  0008
002A  D88F        0080          STR     B,XA2
002B  0722        0081          DECR    X
002C  0722        0082  NXT3    DECR    X           -> XR
002D  8DAE        0083          LDBY    C,*BODYA,X
002E  0722        0084          DECR    X           -> XR
002F  8D0E        0085          LDBY    A,*BODYA,X  GET DEL X
0030  0117        0086          ANDV    A,X'FF'     TEST FOR NEW LINE
0031  00FF
0032  2C1A        0087          SKZ     NXT5        ITS A NEW LINE
0033  ADEE        0088          TBIT    7,*BODYA,X
0034  2C07        0089          SKZ     NXT6
0035  D810        0090          STR     A,TEMP
0036  0117        0091          ANDV    A,X'7F'     CELL RL-KICK FLAG BIT
0037  007F
0038  CC8C        0092          LDR     B,*AREA     GET INPUT(HELD)AREA
0039  0899        0093          ADD     B,A         ADD NEW AREA
003A  DC8C        0094          STR     B,*AREA     SAVE FOR OUTPUT
003B  C810        0095          LDR     A,TEMP
003C  0604        0096  NXT6    EXBY    A
003D  CC8D        0097          LDR     B,*ICLAA
003E  0888        0098          XORC    B,A         CHECK FOR REQUESTED RL TY
003F  27EC        0099          SKM     NXT3        NOT REQUESTED TYPE
0040  0604        0100          EXBY    A
0041  0117        0101          ANDV    A,X'7F'     TEST FOR NEW LINE
0042  007F
0043  DEAF        0102          STR     C,*XA2,Y    STORE XR
0044  08B6        0103          SUB     C,A
0045  DEA9        0104          STR     C,*XA,Y     STORE XL
0046  074E        0105          INCR    Y
0047  73E4        0106          JMP     NXT3        CONTINUE

00/00/00   PAGE 004
                  0107  *
0048  0640        0108  NXT2    ZERO    Y
0049  DF4A        0109          STR     Y,*YA,Z     TERMINATE FOR THIS CELL
                  0110  *
004A  0A55        0111  NXT4    RTR     Y,Y         IS THIS FIRST CALL
004B  2E04        0112          SKP     NXT8        NO - A GAP IS PRESENT
004C  73CD        0113          JMP     NXT1        YES - NEW CELL - FIND DATA
                  0114  *
004D  072E        0115  NXT5    INCR    X           -> Y POSITION
004E  DF2A        0116          STR     X,*YA,Z     SAVE
004F  DC4B        0117          STR     Y,*NRA
                  0118  *
0050  7401        0119  NXT8    JMP     F$RET
                  0120          END
```

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended bo be embraced therein.

We claim:

1. Method for extracting features of one or more objects against a background in a digitized image forming a multiple cell array having M rows and N columns, said objects having boundaries and being characterized by cells of a first binary state, and said background being characterized by cells of a second binary state, comprising the steps of:
   A. scanning said array along said rows in a single pass and detecting and identifying edges of objects in a succession of contiguous pairs of adjacent rows of said image, generating edge signals representative thereof, and
   B. processing said edge signals to identify segmentation features as a current line is scanned for each identified edge by identifying a portion of the boundary of the object associated with that identified edge as a primitive segment.

2. The method according to claim 1 wherein said segmentation feature identifying step includes the substeps of:
   means to identify a new object in said current scan line,
   identifying in a current scan line in which a new object is identified, the portion of said new object boundary in said current line as a directed reference segment, and
   identifying in a current scan line following said line in which a new object is identified, the portion of said new object which continues to said identified edge in said current line from a previously identified edge in the next previous line as a directed primitive segment.

3. Method for extracting features of one or more objects against a background in a digitized image forming a multiple cell array having M rows and N columns, said objects having boundaries and being characterized by cells of a first binary state, and said background being characterized by cells of a second binary state, comprising the steps of:
   A. detecting and identifying boundaries of objects in a succession of contiguous pairs of adjacent rows of said image and generating boundary signals representative thereof,
   B. processing said boundary signals to generate and store boundary data for each of the most recent pair of rows in said succession, said boundary data including:
      dta representative of the position and type of edges of objects intercepted by said most recent pair of rows, said type being left, right, top or bottom,
   C. generating and updating for each pair of rows, top view data from said boundary data, said top view data being representative of the cell position in said image and type of the left, right, top or bottom edge of an object which is both nearest to the respective cells in the most recent row of said succession and which is located at the same point along a previous row as the respective cells.

4. The method according to claim 3 comprising the further step of:
   D. extracting left edge necks from said generated top view data for each pair of rows, and for each identified left edge in said most recent row, by:
      i. determining and temporarily storing data for said most recent row which is representative of the minimum of the distance, $D_L$, in said image between said identified left edge and the next identified right edge along said most recent row in said predetermined direction, and the distances between said identified left edge and all right edges identified in the previously scanned lines which are represented in said top view data and are less than $D_L$ from said identified left edge, and which is further representative of the position of the cells which bound that minimum distance,
      ii. determining the distance in said image between each left edge identified in the previous rows represented in said top view data, and less than $D_L$ from and to the right of said identified left edge, and all right edges identified through said most recent row represented in said top view data, and less than $D_L$ from, and to the right of said identified left edge, and when the distance from the left edge of one of said previous rows to one of said right edges is less than the $D_L$ data previously stored for that row, replace said $D_L$ data previously stored for that row with replacement $D_L$ data representative of said lesser distance, and representative of the position of the cells which bound that distance,
      iii. identifying as a left edge neck the portion of an identified body defined from a left edge in an identified row by the distance $D_L$ when said $D_L$ data monotonically decreased for rows immediately previous to and including said identified row, and monotonically increased for rows immediately following said identified row,
   E. extracting right edge necks from said generated top view data for each pair of rows, and for each identified right edge in said most recent row, by:
      i. determining and temporarily storing data for said most recent row which is representative of the minimum of the distance, $D_R$, in said image between said identified right edge and the next identified left edge along said most recent row in a direction opposite to said predetermined direction, and the distance between said identified right edge and all left edges identified in the previous rows which are represented in said top view data and are less than $D_R$ from said identified right edge, and which is further representative of the position of the cells which bound that minimum distance,
      ii. determining the distance in said image between each right edge identified in said previous rows, represented in said top view data, and less than $D_R$ from, and to the left of said identified right edge, and all left edges identified through said most recent row represented in said top view data, and less than $D_R$ from, and to the left of said identified right edge, and when the distance from the right edge of one of said previous rows to one of said left edges is less than the $D_R$ data previously stored for that line, replace said $D_R$ data previously stored for that row with replacement $D_R$ data representative of said lesser distance and representative of the position of the cells which bound that distance, iii. identifying as a right edge neck the portion of an identified body defined from a right edge in an identified row by the distance $D_R$ when said $D_R$ data monotonically decreased for rows immediately previous to and including said identified row, and monotonically increased for rows immediately following said identified row, F. extracting bottom edge necks from said generated top view data for each pair of rows, and for each identified bottom edge in said most recent row, by:

i. determining and temporarily storing data for said most recent two representative of the distance $D_B$ in said image between said identified bottom edge and a top edge identified at the same position along one of said previous rows and represented in said top view data, ii. determining and temporarily storing data for said most recent row representative of the distance $D_P$ in said image between an edge immediately preceding said identified bottom edge and an edge identified at the same position along one of said previous rows, and represented in said top view data, iii. determining and temporarily storing data for said most recent row representative of the distance $D_S$ in said image between an edge immediately succeeding said identified bottom edge and an edge identified at the same position along one of said previous rows, and represented in said top view data, and iv. identifying as a bottom edge neck the portion of an identified body defined from that identified bottom edge in said most recent row by the distance $D_B$ when said $D_P$ data monotonically decreased for identified edges immediately previous to and including said identified bottom edge, and said $D_S$ data monotonically increased for identified edges immediately following said identified bottom edge.

5. Method for extracting features of one or more objects in a two dimensional image, each of said objects having a boundary and being characterized within said boundary by a value of a detectable characteristic in one of r predetermined ranges, where r is an integer, comprising the steps of:

A. scanning said image in a single pass along a succession of substantially parallel lines of scan, B. detecting the value of said characteristic of a succession of contiguous regions of said image along each of said scan lines, and generating scan signals representative thereof, C. processing said scan signals to identify left edges of objects in each scan line as said lines are scanned, and concurrently generating a left edge signal for each identified left edge, said left edge signal being representative of the position of said identified left edge along said current scan line, D. processing said scan signals to identify right edges of objects in each scan line as said lines are scanned, and concurrently generating a right edge signal for each identified right edge, said right edge signal being representative of the position of said identified right edge in said current scan line, E. storing current scan line data, said current scan line data including left and right edge signals generated as a current line is scanned, and storing previous scan line data, said previous scan line data including left and right edge signals generated during the scan of the next previous line, F. identifying objects by comparing each stored left and right edge signal of said current scan line data with said left and right edge signals of said stored previous scan line data, and including the substeps of:

i. identifying a new object in said current scan line, ii. identifying an object left boundary which continues from said next previous scan line to the current scan line, iii. identifying an object right boundary which continues from said next previous scan line to said current scan line, iv. identifying an object which has terminated between said next previous and said current scan lines, v. identifying an object which has merged with another object between said next previous and current scan lines.

6. The method according to claim 5 comprising the further steps of:

identifying the left, right, top and bottom edges defining at least one identified object in a current scan line as that line is scanned, and generating corresponding update edge point data and associated update line data, said update edge point data including:

A. left edge data words representative of the position of regions in said current scan line identified as left edges of said identified object, B. right edge data words representative of the position of regions in said current scan line identified as right edges of said identified object, C. top edge data words representative of the position of regions in said current scan line including top edges of said identified object, D. bottom edge data words representative of the position of regions in current scan line including bottom edges of said identified object, E. a line data word representative of the relative position of said current scan line among said succession of scan lines for each of said left edge, right edge, top edge, and bottom edge data words.

7. The method according to claim 6 comprising the further steps of:

A. generating projection data including current top view edge point data and current top view line data for at least one identified object in said current scan line as that line is scanned, said current top view data edge point data and current top view line data being representative of said update edge point data and update line data for the regions of said current scan line represented by said updata data and being the same as the top view edge point data and top view edge point data and top view line data of the next previous scan line for the remaining regions of said current scan line.

8. The method according to claim 7 comprising the further steps of:

identifying as a current line is scanned, the position of internal neck features in said image for portions of said one identified object scanned by the previous lines of scan, including the substeps of:

B. extracting left edge necks as a current line is scanned for the identified left edge of said one identified object in said current scan line, by:

i. determining and temporarily storing data for the current line which is representative of the minimum of the distance, $D_L$, in said image between said identified left edge and the next identified right edge along said current scan line in said predetermined direction, and the distances between said identified left edge and all right edges identified in the previously scanned lines which are represented in said top view edge point and top view line data and are less than $D_L$ from said identified left edge, and which is further representative of the position of the end points which bound that minimum distance, ii. determining the distance in said image between each left edge identified in said previously scanned lines represented in said top view edge point and top view line data, and less than $D_L$ from and to the right of said identified left edge, and all right edges identified through the current scan line represented in said top view edge point and top view line data, and less than $D_L$ from, and to the right of said identified left edge, and when the distance from the left edge of one of said previously scanned lines to one of said right edges is less than the $D_L$ data previously stored for that line, replace said $D_L$ data previously stored for that line with replacement $D_L$ data representative of said lesser distance, and representative of the position of the end points which bound that distance, iii. identifying as a left edge neck the portion of said one identified object defined from a left edge in an identified scan line by the distance $D_L$ when said $D_L$ data monotonically decreased for scan lines immediately previous to and including said identified scan line, and monotonically increased for scan lines immediately following said identified scan line, C. extracting right edge necks as a current line is scanned for the identified right edge of said one identified object in said current scan line, by:

i. determining and temporarily storing data for the current line which is representative of the minimum of the distance, $D_R$, in said image between said identified right edge and the next identified left edge along said current scan line in a direction opposite to said predetermined direction, and the distance between said identified right edge and all left edges identified in the previously scanned lines which are represented in said top view edge point and top view line data and are less than $D_R$ from said identified right edge, and which is further representative of the position of the end points which bound that minimum distance, ii. determining the distance in said image between each right edge identified in said previously scanned lines, represented in said top view edge point and top view line data, and less than $D_R$ from, and to the left of said identified right edge, and all left edges identified through the current scan line represented in said top view edge point and top view line data, and less than $D_R$ from, and to the left of said identified right edge, and when the distance from the right edge of one of said previously scanned lines to one of said left edges is less than the $D_R$ data previously stored for that line, replace said $D_R$ data previously stored for that line with replacement $D_R$ data representative of said lesser distance and representative of the position of the end points which bound that distance, iii. identifying as a right edge neck the portion of said one identified object defined from a right edge in an identified scan line by the distance $D_R$ when said $D_R$ data monotonically decreased for scan lines immediately previous to and including said identified scan line, and monotonically increased for scan lines immediately following said identified scan line, D. extracting bottom edge necks as a current line is scanned for the identified bottom edge of said one identified object in said current scan line, by:

i. determining and temporarily storing data for said current line representative of the distance $D_B$ in said image between said identified bottom edge and a top edge identified at the same position along one of said previously scanned lines, and represented in said top view edge point and top view line data, ii. determining and temporarily storing data for said current line representative of the distance $D_P$ in said image between an edge immediately preceding said identified bottom edge and an edge identified at the same position along one of said previously scanned lines, and represented in said top view edge point and top view line data, iii. determining and temporarily storing data for said current line representative of the distance $D_S$ in said image between an edge immediately succeeding said identified bottom edge and an edge identified at the same position along one of said previously scanned lines and represented in said top view edge point and top view line data, iv. identifying as a bottom edge neck the portion of said one identified object defined from that identified bottom edge in said current scan line by the distance $D_B$ when said $D_P$ data monotonically decreased for identified edges immediately previous to and including said identified bottom edge, and said $D_S$ data monotonically increased for identified edges immediately following said identified bottom edge.

9. The method according to claim 6 comprising the further step of:

determining object perimeters as a current line is scanned, by maintaining a cumulative count from line to line of said identified left edges, right edges, top edges and bottom edges for an identified object, said cumulative count being representative of the perimeter, P, of the portion of said identified object covered by the first through the current scan lines.

10. The method according to claim 9 comprising the further step of:

determining object areas as a current line is scanned, by determining the number of regions between identified left and right edges for an object in said current scan line, and maintaining a cumulative count from line to line of said numbers for the first through the current scan lines, said cumulative count being representative of the area, A, of the portion of said identified object covered by those scan lines.

11. The method according to claim 10 comprising the further step of:

generating a signal representative of the ratio $P^2/A$.

12. The method according to claim 6 comprising the further step of:

determining object areas as a current line is scanned, by determining the number of regions between identified left and right edges for an object in said current scan line, and maintaining a cumulative count from line to line of said numbers for the first through the current scan lines, said cumulative count being representative of the area, A, of the portion of said identified object covered by those scan lines.

13. The method according to claim 6 comprising the further step of:

determining object Y-moments as a current line is scanned, by generating an incremental Y-moment signal for an identified object representative of the product of the distance between said current and the first scan lines and the difference in position of the left and right edges of said object in said current scan line, and maintaining a cumulative Y-moment signal proportional to the sum of said incremental Y-moment signals, said cumulative Y-moment signal being representative of the first moment in the direction perpendicular to the direction of said scan lines of the portion of said identified object covered by the first through the current scan lines.

14. The method according to claim 6 comprising the further step of:

determining object X-moments as a current line is scanned, by generating an incremental X-moment signal for an identified object representative of the difference between the square of the position of the left edge of said object in said current scan line and the square of the position of the right edge of said object in said current scan line, and maintaining a cumulative X-moment signal proportional to the sum of said incremental X-moment signals, said cumulative X-moment signal being representative of the first moment in the direction of the scan lines of the portion of said identified object covered by the first through the current scan lines.

15. The method according to claim 5 comprising the further step of:

identifying segmentation features as a current line is scanned for each identified edge by identifying a portion of the boundary of the object associated with that identified edge as a primitive segment.

16. The method according to claim 15 wherein said segmentation feature identifying step includes the substeps of:

identifying in a current scan line in which a new object is identified, the portion of said new object boundary in said current line as a directed reference segment, identifying in a current scan line following said line in which a new object is identified, the portion of said new object which continues to said identified edge in said current line from a previously identified edge in the next previous line as a directed primitive segment.

17. Method for extracting features of one or more body objects against a background in a two dimensional image, said body objects having boundaries and being characterized within said boundaries by a value of a detectable characteristic in a first predetermined range, and said background being characterized by a value of said characteristic in a second predetermined range, and said image having a border characterized by a value of said characteristic in said first range, comprising the steps of:

A. scanning said image in a single pass, along a succession of N substantially parallel lines of scan, where N is an integer, B. detecting the value of said characteristic of M contiguous regions of said image along each of said scan lines, and generating scan signals representative thereof, where M is an integer, C. processing said scan signals to identify left edge regions in each scan line as said lines are scanned, each of said left edge regions being the first region along said scan line which is characterized by a value of said characteristic in said first range and which follows a region characterized by a value of said characteristic in said second range, and concurrently generating a left edge signal $X_{Li}(k)$ for each identified left edge region, said left edge signal being representative of the scan line k currently being scanned and in which said left edge region is identified, where k is an integer and $1 \leq k < N$, and being further representative of the displacement $X_L$ from the left boundary of said image and the sequential position i of said left edge region along said current scan line, where i is an integer and $1 \leq i \leq M/2$, D. processing said scan signals to identify right edge regions in each scan line as said lines are scanned, each of said right edge regions being the first region along said scan line which is characterized by a value of said characteristic in said second range, and which follows a region characterized by a value of said characteristic in said first range, and concurrently generating a right edge signal $X_{Ri}(k)$ for each identified right edge region, said right edge signal being representative of the scan line k currently being scanned and in which said right edge region is identified, and being further representative of the displacement $X_R$ from the left edge of said image and the sequential position i of said pair in said current scan line, E. storing as generated said current ($k^{th}$) line left and right edge signals, $X_{L1}(k), X_{L2}(k), \ldots, X_{Li}(k), \ldots$ and $X_{R1}(k), X_{R2}(k), \ldots, X_{Ri}(k), \ldots$ and following the detection of the Mth region in said $k^{th}$ scan line, storing said $k^{th}$ line left and right edge signals as the next previous $(k-1)^{th}$ line left and right edge signals, $X_{L1}(k-1), X_{L2}(k-1), \ldots, X_{Lj}(k-1), \ldots$, and $X_{R1}(k-1), X_{R2}(k-1), \ldots, X_{Rj}(k-1), \ldots$, where j is an integer and is representative of the sequential position of one of said edge signals in said $k-1^{th}$ line, and $1 \leq j \leq M/2$, F. identifying objects as said $k^{th}$ line is scanned by comparing each stored $k^{th}$ line left and right edge signal with said stored $k^{th}$ line left and right edge signals, and generating and storing an object number signal in said memory in association with each $k^{th}$ line left and right edge signal, including the substeps of:

i. identifying a new body object having a left boundary at $X_{Li+1}(k)$ when $$X_{Ri+1}(k) < X_{Lj+1}(k-1)$$

unless $$X_{Ri-1}(k) < X_{Lj}(k-1) < X_{Ri}(k)$$

$$X_{Rj-1}(k-1) < X_{Li}(k) < X_{Rj}(k-1),$$

and a right boundary at $X_{Ri+1}(k)$, and generating a unique object number signal for each identified new body object and storing said object number signal in said memory in association with $X_{Li+1}(k)$ and $X_{Ri+1}(k)$, ii. identifying a new hole object having a left boundary at $X_{Ri}(k)$ when $$X_{Li+1}(k) < X_{Rj}(k-1),$$

unless $$X_{Li}(k) < X_{Rj}(k-1) < X_{Li+1}(k)$$

$$X_{Lj}(k-1) < X_{Ri}(k) < X_{Lj+1}(k-1),$$

and a right boundary at $X_{Li+1}(k)$, and generating a unique object number signal for each identified new hole object and storing said object number signal in said memory in association with $X_{Li+1}(k)$ and $X_{Ri}(k)$, iii. identifying an object boundary which continues from $X_{Lj}(k-1)$ to $X_{Li}(k)$ when $$X_{Ri-1}(k) < X_{Lj}(k-1) < X_{Ri}(k)$$

$$X_{Rj-1}(k-1) < X_{Li}(k) < X_{Rj}(k-1)$$

and generating the same object number signal stored in association with $X_{Lj}(k-1)$ for each identified continued object left boundary and storing said same object number signal in said memory in association with $X_{Li}(k)$, iv. identifying an object boundary which continues from $X_{Rj}(k-1)$ to $X_{Ri}(k)$ when $$X_{Li}(k) < X_{Rj}(k-1) < X_{Li+1}(k)$$

$$X_{Lj}(k-1) < X_{Ri}(k) < X_{Lj+1}(k-1)$$

and generating the same object number signal stored in association with $X_{Rj}(k-1)$ for each identified continued object right boundary and storing said same object number signal in said memory in association with $X_{Ri}(k)$, v. identifying a terminated body object when an object boundary at $X_{Lj}(k-1)$ is not continued at $X_{Li}(k)$ and $$X_{Rj}(k-1) < X_{Li}(k)$$

and the object number signals stored in association with $X_{Lj}(k-1)$ and $X_{Rj}(k-1)$ are identical, vi. identifying a terminated hole object when an object boundary at $X_{Rj-1}(k-1)$ is not continued at $X_{Ri}(k)$ and $$X_{Lj}(k-1) < X_{Ri}(k)$$

and the object number signals stored in association with $X_{Rj-1}(k-1)$ and $X_{Lj}(k-1)$ are identical, vii. identifying merged body objects when an object boundary at $X_{Rj-1}(k-1)$ is not continued at $X_{Ri}(k)$ and $$X_{Lj}(k-1) < X_{Ri}(k)$$

and the object number signals stored in association with $X_{Rj-1}(k-1)$ and $X_{Lj}(k-1)$ are representative of different body objects, viii. identifying merged hole objects when an object boundary at $X_{Lj}(k-1)$ is not continued at $X_{Li}(k)$ and $$X_{Rj}(k-1) < X_{Li}(k)$$

and the object number signals stored in association with $X_{Lj}(k-1)$ and $X_{Rj}(k-1)$ are representative of different hole objects, ix. identifying a hole object which merges with a body object when:
   a. an object boundary at $X_{Lj+1}(k-1)$ is not continued at $X_{Li+1}(k)$ and $$X_{Rj+1}(k-1) < X_{Li+1}(k)$$

and the object number signals stored in association with $X_{Lj+1}(k-1)$ is representative of a hole object and the object number signal stored in association with $X_{Rj+1}(k-1)$ is representative of a body object, or
   b. an object boundary at $X_{Lj}(k-1)$ is not continued at $X_{Li}(k)$ and $$X_{Rj}(k-1) < X_{Li}(k)$$

and the object number signals stored in association with $X_{Lj}(k-1)$ is representative of a body object and the object number signal stored in association with $X_{Rj}(k-1)$ is representative of a hole object, x. identifying a body object which merges with a hole object when:
   a. an object left boundary at $X_{Rj}(k-1)$ is not continued at $X_{Ri}(k)$ and $$X_{Lj}(k-1) < X_{Ri}(k)$$

and the object number signal stored in association with $X_{Rj}(k-1)$ is representative of a body object and the object number signal stored in association with $X_{Lj+1}(k-1)$ is representative of a hole object, or
   b. an object boundary at $X_{Rj-1}(k-1)$ is not continued at $X_{Ri}(k)$ and $$X_{Lj}(k-1) < X_{Ri}(k)$$

and the object number signals stored in association with $X_{Rj-1}(k-1)$ is representative of a hole object and the object number signal stored in association with $X_{Lj}(k)$ is representative of a body object.

18. The method according to claim 17 comprising the further step of:
G. tabulating objects by generating and storing type, status, and parent data for each identified object at a location in said memory associated with said object, and updating said stored type, parent and status data at least once per scan line, said tabulating step including the substeps of:
   i. generating said type data in response to the identification of a new object in the $k^{th}$ scan line, said type data being representative of a first type when said new object is a body object and of a second type when said new object is a hole object,
   ii. generating said status data, said status data being representative of:
      a. continuation status when continued left and right boundaries of said object are identified in said $k^{th}$ scan line,
      b. termination status when said object is identified to be a terminated body or hole object in the $k^{th}$ scan line,
      c. merge status when said object is identified in the $k^{th}$ scan line to be a body or hole object with which a body or hole object has merged,
   iii. generating said parent data for an identified new object in response to the identification of said new object in the $k^{th}$ scan line, said parent data being representative of the object number of the next previous object currently having only a single edge signal identified when said new body is identified, and
   iv. updating said parent data for two objects identified as merged objects in the $k^{th}$ scan line, said updated parent data being representative of the object number of a predetermined one of said merged objects.

19. The method according to claim 17 comprising the further step of:

identifying the left, right, top and bottom edges of the boundaries defining each identified body object in said $k^{th}$ scan line as said $k^{th}$ line is scanned, and generating corresponding update edge point data and associated update line data, said update edge point data including:

A. left edge data words representative of:
  i. the position in said $k^{th}$ scan line of an identified left edge region, and
  ii. the position of each region in said $k^{th}$ scan line between an identified left edge region and the region in said $k^{th}$ scan line corresponding to an identified left edge region on an identified boundary continuing from said $k-1^{th}$ scan line to said identified left edge region, B. right edge data words representative of:
  i. the position in said $k^{th}$ scan line of an identified right edge region, and
  ii. the position of each region in said $k^{th}$ scan line between an identified right edge region and the region in said $k^{th}$ scan line corresponding to an identified right edge region on an identified boundary continuing from said $k-1^{th}$ scan line to said identified right edge region, C. top edge data words representative of:
  i. the position in said $k^{th}$ scan line of each region between the identified left and right edge regions in said $k^{th}$ scan line associated with a body object identified as a new body object in said $k^{th}$ scan line, and
  ii. the position in said $k^{th}$ scan line of each region between regions in said $k^{th}$ scan line corresponding to the identified right and left edge regions in said $k-1^{th}$ scan line associated with a hole object identified as terminated in said $k^{th}$ scan line,
  iii. the position in said $k^{th}$ scan line of each region between regions in said $k^{th}$ scan line corresponding to successive identified right edge and left edge regions in said $k-1^{th}$ scan line when said right edge and left edge regions are associated with body objects identified as merged in said $k^{th}$ scan line, D. bottom edge data words representative of:
  i. the position in said $k^{th}$ scan line of each region between regions in said $k^{th}$ scan line corresponding to identified left edge and right edge regions in said $k-1^{th}$ scan line when said left and right edge regions are associated with a body object identified as terminated in said $k^{th}$ scan line,
  ii. the position in said $k^{th}$ scan line of each region between the identified right and left edge regions in said $k^{th}$ scan line associated with a hole object identified as a new hole object in said $k^{th}$ scan line,
  iii. the position in said $k^{th}$ scan line of each region in said $k^{th}$ scan line corresponding to successive identified left edge and right edge regions in said $k-1^{th}$ scan line when said left and right edge regions are associated with hole objects identified as merged in said $k^{th}$ scan line,
  iv. the position in said $k^{th}$ scan line of each region in said $k^{th}$ scan line corresponding to successive identified left edge and right edge regions in said $k-1^{th}$ scan line when said left and right edge regions are associated with hole and body objects identified as merged in said $k^{th}$ scan line, E. a line data word representative of the identity of said $k^{th}$ scan line for each of said left edge, right edge, top edge, and bottom edge data words.

20. The method according to claim 19 comprising the further step of:

A. generating and storing current top view edge point and current top view line data for each identified body object in said $k^{th}$ scan line as said $k^{th}$ line is scanned, current top view edge point and top view line data being representative of:
  i. said generated update edge point and update line data for regions of said $k^{th}$ scan line for which said update edge point data is generated,
  ii. the same edge point and line data in said top view line data for said $k-1^{th}$ scan line for the remaining regions of said $k^{th}$ scan line.

21. The method according to claim 20 comprising the further step of:

identifying as the $k+1^{th}$ line is scanned, the position of internal neck features in said image for portions of an identified body object scanned by the first k of said lines of scan, including the substeps of:

B. extracting left edge necks as the $k+1^{th}$ line is scanned for each identified left edge region in said $k+1^{th}$ scan line, by:
  i. determining and temporarily storing data for the $k+1^{th}$ line representative of the minimum of the distance, $D_L$, in said image between that identified $k+1^{th}$ line left edge region and the next identified right edge region along said $k+1^{th}$ scan line in said predetermined direction, and the distances between that identified $k+1$th left edge region and all right edge regions identified in scan lines 1 through k which are represented in said top view edge point and top view line data and are less than $D_L$ from that identified $k+1^{th}$ line left edge region, and further represenative of the position of the end points which bound that distance,
  ii. determining the distance in said image between each left edge region identified in scan lines 1 through k and represented in said top view edge point and top view line data, less than $D_L$ from and to the right of that identified $k+1^{th}$ line left edge region, and all right edge regions identified in scan lines 1 through k+1 represented in said top view edge point and top view line data, and less than $D_L$ from and to the right of that identified $k+1^{th}$ line left edge region, and when the distance from the left edge region of one of lines 1 through k to one of said right edge regions is less than the $D_L$ data previously stored for that line, replace said $D_L$ data previously stored for that line with replacement $D_L$ data representative of said lesser distance and the position of the end points which bound that distance,
  iii. identifying as a left edge neck the portion of an identified body defined from a left edge in an identified scan line by the distance $D_L$ when said $D_L$ data monotonically decreased for scan lines immediatedly previous to and including said identified scan line, and monotonically increased for scan lines immediately following said identified scan line, C. extracting right edge necks as the $k+1^{th}$ line is scanned for each identified right edge region in said $k+1^{th}$ scan line, by:
  i. determining and temporarily storing data for the $k+1^{th}$ line representative of the minimum of the distance $D_R$ in said image between that identified $k+1^{th}$ right edge region and the next identified left edge region along said $k+1^{th}$ scan line in a direction opposite to said predetermined direction, and the distances between that identified $k+1^{th}$ line right edge region and all left edge regions identified in scan lines 1 through k which are represented in said top view edge point and top view line data and are less than $D_R$ from that identified $k+1^{th}$ right edge region, and further representative of the position of the end points which bound that distance,
  ii. determining the distance in said image between each right edge region identified in scan lines 1 through k and represented in said top view edge point and top view line data, less than $D_R$ from and to the left of that identified $k+1^{th}$ line right edge region, and all left edge regions identified in scan lines 1 through $k+1$ represented in said top view edge point and top view line data, and less than $D_R$ from and to the left of that identified $k+1^{th}$ line right edge region, and when the distance from the right edge region of one of lines 1 through k to one of said left edge regions is less than the $D_R$ data previously stored for that line with replacement of $D_R$ data representative of said lesser distance and the position of the end points which bound that distance,
  iii. identifying as a right edge neck the portion of an identified body defined from a right edge in an identified scan line by the distance $D_R$ when said $D_R$ data monotonically decreased for scan lines immediately previous to and including said identified scan line, and monotonically increased for scan lines immediately following said identified scan line,
D. extracting bottom edge necks as the $k+1^{th}$ line is scanned for each identified bottom edge in said $k+1^{th}$ scan line, by:
  i. determining and temporarily storing data for the $k+1^{th}$ representative of the distance $D_B$ in said image between that identified $k+1^{th}$ line bottom edge and a top edge identified at the same position along one of scan lines 1 through k and represented in said top view edge point and top view line data,
  ii. determining and temporarily storing data for the $k+1^{th}$ line representative of the distance $D_P$ in said image between an edge immediately preceding said identified $k+1^{th}$ line bottom edge and an edge identified at the same position along one of scan lines 1 through k and represented in said top view edge point and top view line data,
  iii. determining and temporarily storing data for the $k+1^{th}$ line representative of the distance $D_S$ in said image between an edge immediately succeeding said identified $k+1^{th}$ line bottom edge and an edge identified at the same position along one of said scan lines 1 through k and represented in said top view edge point and top view line data,
  iv. identifying as a bottom edge neck the portion of an identified body defined from that identified bottom edge in the $k+1^{th}$ scan line by the distance $D_B$ when said $D_P$ data monotonically decreased for identified edges immediately previous to and including said identified bottom edge, and said $D_S$ data monotonically increased for identified edges immediately following said identified bottom edge.

22. The method according to claim 17 comprising the further step of:
identifying segmentation features as a current line is scanned for each identified edge by identifying a portion of the boundary of the object associated with that identified edge as a primitive segment.

23. The method according to claim 22 wherein said segmentation feature identifying step includes the substeps of:
  A. identifying in a current scan line in which a new object is identified, the portion of said new object boundary in said current line as a directed reference segment, and
  B. identifying in a current scan line following said line in which a new object is identified, the portion of said new object which continues to said identified edge in said current line from a previously identified edge in the next previous line as a directed primitive segment.

24. The method according to claim 23 wherein substep B of claim 23 includes the further substeps of determining the angular orientation of a current line directed primitive segment extending between said identified edge in said current line and said previously identified edge with respect to said reference segment, and determining the differnce between said angular orientation of said current line primitive segment and the corresponding angular orientation of the directed primitive segment of the next previous line which is bounded by said previously identified edge, and identifying said current line primitive segment as a:
  i. convex segment when the difference in orientation is a first polarity,
  ii. concave segmwent when the difference in orientation is a second polarity, and
  iii. straight line segment when the difference in orientation is zero.

25. The method according to claim 24 wherein said substep of identifying said current line primitive segment includes the further substep of identifying a current segment as a continued portion of a previously identified segment when said difference in orientation determined for said current line is the same polarity as the corresponding difference in orientation determined for the next previous line.

26. The method according to claim 23 wherein substep B of claim 23 includes the further substeps of determining the angular orientation of a current line directed primitive segment extending between said identified edge in said current line and said previously identified edge with respect to said reference segment, and determining the difference between said angular orientation of said current line primitive segment and the corresponding angular orientation of the directed primitive segment of the next previous line which is bounded by said previously identified edge, and identifying said current line primitive segment as a straight line segment.

27. The method according to claim 26 wherein said substep of identifying said current line primitive segment includes the further substep of identifying a current segment as a continued portion of a previously identified segment when said difference in orientation determined for said current line is the same polarity as the corresponding difference in orientation determined for the next previous line.

28. The method according to claim 23 wherein substep B of claim 23 includes the further substeps of determining the angular orientation of a current line directed primitive segment extending between said identified edge in said current line and said previously identified edge with respect to said reference segment, and determining the difference between said angular orientation of said current line primitive segment and the corresponding angular orientation of the directed primitive segment of the next previous line which is bounded by said previously identified edge, and identifying said current line primitive segment as a:
    i. convex segment when the difference in orientation is a first polarity or zero, and
    ii. concave segment when the difference in orientation is a second polarity.

29. The method according to claim 28 wherein said substep of identifying said current line primitive segment includes the further substep of identifying a current segment as a continued portion of a previously identified segment when said difference in orientation determined for said current line is the same polarity as the corresponding difference in orientation determined for the next previous line.

30. The method according to claim 23 wherein substep B of claim 23 includes the further substeps of determining the angular orientation of a current line directed primitive segment extending between said identified edge in said current line and said previously identified edge with respect to said reference segment, and determining the difference between said angular orientation of said current line primitive segment and the corresponding angular orientation of the directed primitive segment of the next previous line which is bounded by said previously identified edge, and identifying said current line primitive segment as a:
    i. convex segment when the difference in polarity is a first polarity, and
    ii. concave segment when the difference in polarity is a second polarity or zero.

31. The method according to claim 30 wherein said substep of identifying said current line primitive segment includes the further substep of identifying a current segment as a continued portion of a previously identified segment when said difference in orientation determined for said current line is the same polarity as the corresponding difference in orientation determined for the next previous line.

32. Method for extracting features of one or more objects in a two dimensional image, each of said objects having a boundary and being characterized within said boundary by a value of a detectable characteristic in one of r predetermined ranges, where r is an integer, comprising the steps of:
scanning said image in a single pass along a succession of substantially parallel lines of scan,
detecting the value of said characteristic of a succession of contiguous regions of said image along each of said scan lines, and generating scan signals representative thereof,
processing said scan signals to identify said features of said objects as said image is scanned during said single pass,
wherein said feature identifying step includes the stp of identifying neck features in said objects during said single scan.

33. Method for extracting features of one or more objects in a two dimensional image, each of said objects having a boundary and being characterized within said boundary by a value of a detectable characteristic in one of r predetermined ranges, where r is an integer, comprising the steps of:
scanning said image in a single pass along a succession of substantially parallel lines of scan,
detecting the value of said characteristic of a succession of contiguous regions of said image along each of said scan lines, and generating scan signals represenatative thereof,
processing said scan signals to identify said features of said objects as said image is scanned during said single pass,
whereihn said feature identifying step includes the step of identifying segmentation features during said single scan.

34. Method for extracting features of one or more objects in a two dimensional image, each of said objects having a boundary and being characterized within said boundary by a value of a detectable characteristic in one of r predetermined ranges, where r is an integer, comprising the steps of:
scanning said image in a single pass along a succession of substantially parallel lines of scan.
detecting the value of said characteristic of a succession of contiguous regions of said image along each of said scan lines, and generating scan signals representative thereof,
processing said scan signals to identify said features of said objects as said image is scanned during said single pass,
wherein said feature identifying step comprises the further step of:
    C. storing current scan line data, said current scan line data being representative of the detected values of said characteristic for the succession of contiguous regions of a current line being scanned, and storing previous scan line data, said previous scan line data being representative of the detected values of said characteristic for the succession of contiguous regions of the next previously scanned line.

35. Method for extracting features of one or more objects in a two dimensional image, each of said objects having a boundary and being characterized within said boundary by a value of a detectable characteristic in one of r predetermined ranges, where r is an integer, comprising the steps of:
scanning said image in a single pass along a succession of substantially parallel lines of scan,
detecting the value of said characteristic of a succession of contiguous regions of said image along each of said scan lines, and generating scan signal representative thereof,
processing said scan signals to identify said features of said objects as said image is scanned during said single pass.
wherein said feature identifying step comprises:
    A. identifying left edges of objects in each scan line as said lines are scanned, and concurrently generating a left edge signal for each identified left edge, said left edge signal being representative of the position of said identified left edge along said current scan line, identifying right edges of objects in each scan line as said lines are scanned, and concurrently generating a right edge signal for each identified right edge, said right edge signal being representative of the position of said identified right edge in said current scan line, C. storing current scan line data, said current scan line data including left and right edge signals generated as a current line is scanned, and storing previous scan line data, said previous scan line data including left and right edge signals generating during the scan of the next previous line.

36. Method according to claim 35 wherein said feature identifying step comprises the steps of:

D. identifying objects by comparing each stored left and right edge signal of said current scan line data with said left and right edge signals of said stored previous scan line data, and including the steps of:
 i. identifying a new object in said current scan line,
 ii. identifying an object left boundary which continues from said next previous scan line to the current scan line,
 iii. identifying an object right boundary which continues from said next previous scan line to said current scan line,
 iv. identifying an object which has terminated between said next previous and said current scan lines,
 v. identifying an object which has merged with another object between said next previous and current scan lines.

37. System for extracting features of one or more objects against a background in a two dimensional image, said objects having boundaries and being characterized within said boundaries by a value of a detectable characteristic in a first predetermined range, and said background being characterized by a value of said characteristic in a second predetermined range, comprising:

A. means to scan said image in a single pass along a succession of substantially parallel lines,
B. means to detect and identify edges of objects intercepted by said scan,
C. segmentation feature identifying means operative as a current line is scanned for each identified edge to identify a portion of the boundary of the object associated with that identified edge as a primitive segment.

38. The system according to claim 37 wherein said segmentation feature identifying means includes:
means to identify a new object in said current scan line,
first means operative in a current scan line in which a new object is identified, to identify the portion of said new object boundary in said current line as a directed reference segment,
second means operative in a current scan line following said line in which a new object is identified, to identify the portion of said new object which continues to said identified edge in said current line from a previously identified edge in the next previous line as a directed primitive segment.

39. The system according to claim 38 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
 i. convex segment when the difference in orientation is a first polarity,
 ii. concave segment when the difference in orientation is a second polarity, and
 iii. straight line segment when the difference in orientation is zero.

40. The system according to claim 39 wherein said means for identifying said current line primitive segment includes means for identifying a current segment as a continued portion of a previously identified segment when said difference in orientation determined for said current line is the same polarity as the corresponding difference in orientation determined for the next previous line.

41. The system according to claim 38 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bouned by said previously identified edge, and means for identifying said current line primitive segment as a straight line segment.

42. The system according to claim 41 wherein said means for identifying said current line primitive segment includes means for identifying a current segment as a continued portion of a previously identified segment when said difference in orientation determined for said current line is the same polarity as the corresponding difference in orientation determined for the next previous line.

43. The system according to claim 38 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
 i. convex segment when the difference in orientation is a first polarity or zero, and
 ii. concave segment when the difference in orientation is a second polarity.

44. The system according to claim 43 wherein said means for identifying said current line primitive segment includes means for identifying a current segment as a continued portion of a previously identified segment when said difference in orientation determined for said current line is the same polarity as the corresponding difference in orientation determined for the next previous line.

45. The system according to claim 38 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
  i. convex segment when the difference in polarity is a first polarity, and
  ii. concave segment when the difference in polarity is a second polarity or zero.

46. The system according to claim 45 wherein said means for identifying said current line primitive segment includes means for identifying a current segment as a continued portion of a previously identified segment when said difference in orientation determined for said current line is the same polarity as the corresponding difference in orientation determined for the next previous line.

47. System for extracting features of one or more objects against a background in a digitized image forming a multiple cell array having M rows and N columns, said objects having boundaries and being characterized by cells of a first binary state, and said background being characterized by cells of a second binary state, comprising:
  A. means to scan said array along said rows in a single pass, and to detect and identify edges of objects in a succession of contiguous pairs of adjacent rows of said image, and
  B. segmentation feature identifying means operative as a current line is scanned for each identified edge to identify a portion of the boundary of the object associated with that identified edge as a primitive segment.

48. The system according to claim 47 wherein said segmentation feature identifying means includes:
means to identify a new object in said current scan line,
first means operative in a current scan line in which a new object is identified, to identify the portion of said new object boundary in said current line as a directed reference segment,
second means operative in a current scan line following said line in which a new object is identified, to identify the portion of said new object which continues to said identified edge in said current line from a previously identified edge in the next previous line as a directed primitive segment.

49. The system according to claim 48 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
  i. convex segment when the difference in orientation is a first polarity,
  ii. concave segment when the difference in orientation is a second polarity, and
  iii. straight line segment when the difference in orientation is zero.

50. The system according to claim 49 wherein said means for identifying said current line primitive segment includes means for identifying a current segment as a continued portion of a previously identified segment when said difference in orientation determined for said current line is the same polarity as the corresponding difference in orientation determined for the next previous line.

51. The system according to claim 48 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a straight line segment.

52. The system according to claim 51 wherein said means for identifying said current line primitive segment includes means for identifying a current segment as a continued portion of a previously identified segment when said difference in orientation determined for said current line is the same polarity as the corresponding difference in orientation determined for the next previous line.

53. The system according to claim 48 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
  i. convex segment when the difference in orientation is a first polarity or zero, and
  ii. concave segment when the difference in orientation is a second polarity.

54. The system according to claim 53 wherein said means for identifying said current line primitive segment includes means for identifying a current segment as a continued portion of a previously identified segment when said difference in orientation determined for said current line is the same polarity as the corresponding difference in orientation determined for the next previous line.

55. The system according to claim 48 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
  i. convex segment when the difference in polarity is a first polarity, and
  ii. concave segment when the difference in polarity is a second polarity or zero.

56. The system according to claim 55 wherein said means for identifying said current line primitive segment includes means for identifying a current segment as a continued portion of a previously identified segment when said difference in orientation determined for said current line is the same polarity as the corresponding difference in orientation determined for the next previous line.

57. System for extracting features of one or more objects in a two dimensional image, each of said objects having a boundary and being characterized within said boundary by a value of a detectable characteristic in one of r predetermined ranges, where r is an integer, comprising:
  A. scanning means for scanning said image in a single pass along a succession of substantially parallel lines of scan.
  B. detection means operative in conjunction with said scanning means to detect the value of said characteristic of a succession of contiguous regions of said image along each of said scan lines,
  C. left edge identification means responsive to said detection means to identify left edges of objects in each scan line as said lines are scanned, and to concurrently generate a left edge signal for each identified left edge, said left edge signal being representative of the position of said identified left edge along said current scan line,
  D. right edge identification means responsive to said detection means to identify right edges of objects in each scan line as said lines are scanned, and to concurrently generate a right edge signal for each identified right edge, said right edge signal being representative of the position of said identified right edge in said current scan line,
  E. memory means for storing current scan line data, said current scan line data including left and right edge signals generated as a current line is scanned, and for storing previous scan line data, said previous scan line data including left and right edge signals generated during the scan of the next previous line,
  F. object identification means operative in conjunction with said memory means to compare each stored left and right edge signal of said current scan line data with said left and right edge signals of said stored previous scan line data, and including:
    i. means to identify a new object in said current scan line,
    ii. means to identify an object left boundary which continues from said next previous scan line to the current scan line,
    iii. means to identify an object right boundary which continues from said next previous scan line to said current scan line,
    iv. means to identify an object which has terminated between said next previous and said current scan lines,
    v. means to identify an object which has merged with another object between said next previous and current scan lines.

58. The system according to claim 57 further comprising:
a boundary identification means for identifying the left, right, top and bottom edges defining at least one identified object in a current scan line as that line is scanned, and for generating corresponding update edge point data and associated update line data, said update edge point data including:
  A. left edge data words representative of the position of regions in said current scan line identified as left edges of said identified object,
  B. right edge data words representative of the position of regions in said current scan line identified as right edges of said identified object,
  C. top edge data words representative of the position of regions in said current scan line including top edges of said identified object,
  D. bottom edge data words representative of the position of regions in current scan line including bottom edges of said identified object,
  E. a line data word representative of the relative position of said current scan line among said succession of scan lines for each of said left edge, right edge, top edge, and bottom edge data words.

59. The system according to claim 58 further comprising:
  A. projection data means for generating current top view edge point data and current top view line data for at least one identified object in said current scan line as that line is scanned, said current top view data edge point data and current top view line data being representative of said update edge point data and update line data for the regions of said current scan line represented by said update data and being the same as the top view edge point data and top view line data of the next previous scan line for the remaining regions of said current scan line.

60. The system according to claim 59 further comprising:
neck feature identifying means operative as a current line is scanned to identify the position of internal neck features in said image for portions of said one identified object scanned by the previous lines of scan, including:
  B. left edge neck extraction means, operative as a current line is scanned for the identified left edge of said one identified object in said current scan line, to:
    i. determine and temporarily store data for the current line which is representative of the minimum of the distance, $D_L$, in said image between said identified left edge and the next identifed right edge along said current scan line in said predetermined direction, and the distances between said identified left edge and all right edges identified in the previously scanned lines which are represented in said top view edge point and top view line data and are less than $D_L$ from said identified left edge, and which is further representative of the position of the end points which bound that minimum distance,
    ii. determine the distance in said image between each left edge identified in said previously scanned lines represented in said top view edge point and top view line data, and less than $D_L$ from and to the right of said identified left edge, and all right edges identified through the current scan line represented in said top view edge point and top view line data, and less than $D_L$ from, and to the right of said identified left edge, and when the distance from the left edge of one of said previously scanned lines to one of said right edges is less than the $D_L$ data previously stored for that line, replace said $D_L$ data previously stored for that line with replacement $D_L$ data representative of said lesser distance, and representative of the position of the end points which bound that distance, iii. identify as a left edge neck the portion of said one identified object defined from a left edge in an identified scan line by the distance $D_L$ when said $D_L$ data monotonically decreased for scan lines immediately previous to and including said identified scan line, and monotonically increased for scan lines immediately following said identified scan line, C. right edge neck extraction means, operative as a current line is scanned for the identified right edge of said one identified object in said current scan line, to:

i. determine and temporarily store data for the current line which is representative of the minimum of the distance, $D_R$, in said image between said identified right edge and the next identified left edge along said current scan line in a direction opposite to said predetermined direction, and the distance between said identified right edge and all left edges identified in the previously scanned lines which are represented in said top view edge point and top view line data and are less than $D_R$ from said identified right edge, and which is further representative of the position of the end points which bound that minimum distance, ii. determine the distance in said image between each right edge identified in said previously scanned lines, represented in said top view edge point and top view line data, and less than $D_R$ from, and to the left of said identified right edge, and all left edges identified through the current scan line represented in said top view edge point and top view line data, and less than $D_R$ from, and to the left of said identified right edge, and when the distance from the right edge of one of said previously scanned lines to one of said left edges is less than the $D_R$ data previously stored for that line, replace said $D_R$ data previously stored for that line with replacement $D_R$ data representative of said lesser distance and representative of the position of the end points which bound that distance, iii. identify as a right edge neck the portion of said one identified object defined from a right edge in an identified scan line by the distance $D_R$ when said $D_R$ data monotonically decreased for scan lines immediately previous to and including said identified scan line, and monotonically increased for scan lines immediately following said identified scan line, D. bottom edge neck extraction means, operative as a current line is scanned for the identified bottom edge of said one identified object in said current scan line, to:

i. determine and temporarily store data for said current line representative of the distance $D_B$ in said image between said identified bottom edge and a top edge identified at the same position along one of said previously scanned lines, and represented in said top view edge point and top view line data, ii. determine and temporarily store data for said current line representative of the distance $D_P$ in said image between an edge immediately preceding said identified bottom edge and an edge identified at the same position along one of said previously scanned lines, and represented in said top view edge point and top view line data, iii. determine and temporarily store data for said current line representative of the distance $D_S$ in said image between an edge immediately succeeding said identified bottom edge and an edge identified at the same position along one of said previously scanned lines and represented in said top view edge point and top view line data, iv. identify as a bottom edge neck the portion of said one identified object defined from that identified bottom edge in said current scan line by the distance $D_B$ when said $D_P$ data monotonically decreased for identified edges immediately previous to and including said identified bottom edge, and said $D_S$ data monotonically increased for identified edges immediately following said identified bottom edge.

61. The system according to claim 57 further comprising:
segmentation features identifying means operative as a current line is scanned for each identified edge to identify a portion of the boundary of the object associated with that identified edge as a primitive segment.

62. The system according to claim 61 wherein said segmentation feature identifying means includes:
first means operative in a current scan line in which a new object is identified, to identiy the portion of said new object boundary in said current line as a directed reference segment,
second means operative in a current scan line following said line in which a new object is identified, to identify the portion of said new object which continues to said identified edge in said current line from a previously identified edge in the next previous line as a directed primitive segment.

63. System for extracting features of one or more objects in a two dimensional image, each of said objects having a boundary and being characterized within said boundary by a value of a detectable characteristic in one of r predetermined ranges, where r is an integer, comprising:
scanning means for scanning said image in a single pass along a succession of substantially parallel lines of scan,
detection means operative in conjunction with said scanning means to detect the value of said characteristic of a succession of contiguous regions of said image along each of said scan lines, feature extraction means operative as said image is scanned to identify said features of said objects during said single pass, wherein said feature extraction means includes means to identify neck features in said objects during said single scan.

64. System for extracting features of one or more objects in a two diemnsional image, each of said objects having a boundary and being characterized within said boundary by a value of a detectable characteristic in one of r predetermined ranges, where r is an integer, comprising:

scanning means for scanning said image in a single pass along a succession of substantially parallel lines of scan, detection means operative in conjunction with said scanning means to detect the value of said characteristic of a succession of contiguous regions of said image along each of said scan lines, feature extraction means operative as said image is scanned to identify said features of said objects during said single pass, wherein said feature extraction means includes means to identify segmentation features during said single scan.

65. System for extracting features of one or more objects in a two dimensional image, each of said objects having a boundary and being characterized within said boundary by a value of a detectable characteristic in one of r predetermined ranges, where r is an integer, comprising:

scanning means for scanning said image in a single pass along a succession of substantially parallel lines of scan, detection means operative in conjunction with said scanning means to detect the value of said characteristic of a succession of contiguous regions of said image along each of said scan lines, feature extraction means operative as said image is scanned to identify said features of said objects during said single pass, wherein said feature extraction means further comprises:

C. memory means for storing current scan line data, said current scan line data being representative of the detected values of said characteristic for the succession of contiguous regions of a current scan line being scanned, and for storing previous scan line data, said previous scan line data being representative of the detected values of said characteristic for the succession of contiguous regions of the next previous scanned line.

66. System for extracting features of one or more objects in a two diemnsional image, each of said objects having a boundary and being characterized within said boundary by a value of a detectable characteristic in one of r predetermined ranges, where r is an integer, comprising:

scanning means for scanning said image in a single pass along a succession of substantially parallel lines of scan, detection means operative in conjunction with said scanning means to detect the value of said characteristic of a succession of contiguous regions of said image along each of said scan lines, feature extraction means operative as said image is scanned to identify said features of said objects during said single pass, wherein said feature extraction means comprises:

A. left edge identification means responsive to said detection means to identify left edges of objects in each scan line as said lines are scanned, and to concurrently generate a left edge signal for each identified left edge, said left edge signal being representative of the position of said identified left edge along said current scan line, B. right edge identification means responsive to said detection means to identify right edges of objects in each scan line as said lines are scanned, and to concurrently generate a right edge signal for each identified right edge, said right edge signal being representative of the position of said identified right edge in said current scan line, C. memory means for storing current scan line data, said current scan line data including left and right edge signals generated as a current line is scanned, and for storing previous scan line data, said previous scan line data including left and right edge signals generated during the scan of the next previous line.

67. System according to claim 66 wherein said feature extraction means further comprises:

D. object identification means operative in conjunction with said memory means to compare each stored left and right edge signal of said current scan line data with said left and right edge signals of said stored previous scan line data, and including:

i. means to idenfity a new object in said current scan line, ii. means to identify an object left boundary which continues from said next previous scan line to the current scan line, iii. means to identify an object right boundary which continues from said next previous scan line to said current scan line, iv. means to identify an object which has terminated between said next previous and said current scan lines, v. means to identify an object which has merged with another object between said next previous and current scan lines.

68. system for extracting features of one or more objects against a background in a two dimensional image, each of said objects having a boundary and being characterized within said boundary by a value of a detectable characteristic in a first predetermined range, and said background being characterized by a value of said characteristic in a second predetermined range, comrpising:

A. scanning means for scanning said image in a single pass along a succession of substantially parallel lines of scan, B. detection means operative in conjunction with said scanning means to detect the value of said characteristic of a successon of contiguous regions of said image along each of said scan lines, C. left edge identification means responsive to said detection means to identify left edges of objects in each scan line as said lines are scanned, and to concurrently generate a left edge signal for each identified left edge, said left edge signal being representative of the position of said identified left edge along said current scan line, D. right edge identification means responsive to said detection means to identify right edges of objects in each scan line as said lines are scanned, and to concurrently generate a right edge signal for each identified right edge, said right edge signal being representative of the position of said identified right edge in said current scan line, E. memory means for storing current scan line data, said current scan line data including left and right edge signals generated as a current line is scanned, and for storing previous scan line data, said previous scan line data including left and right edge signals generated during the scan of the next previous line, F. object identification means operative in conjunction with said memory means to compare each stored left and right edge signal of said current scan line data with said left and right edge signals of said stored previous scan line data, and including:
 i. means to identify a new body object in said current scan line,
 ii. means to identify a new hole object in said current scan line,
 iii. means to identify an object left boundary which continues from said next previous scan line to the current scan line,
 iv. means to identify an object right boundary which continues from said next previous scan line to said current scan line,
 v. means to identify a body object which has terminated between said next previous and said current scan lines,
 vi. means to identify a hole object which has terminated between said next previous and current scan lines,
 vii. means to idenfity an object which has merged with another object between said next previous and current scan lines.

69. The system according to claim 68 wherein said object identification means further includes:
 i. means to generate and store an object signal in said memory in association with each left and right edge signal of said current scan line data,
 ii. means to generate a unique object number signal for each new identified new body object and to store said object number signal in said memory in association with the left and right edge signals representative of the respective edges of said new body object,
 iii. means to generate a unique object number signal for each identified new hole object and to store said object number signal in said memory in association with the right and left edge signals representative of the respective edges of said new hole object,
 iv. means to generate the same object number signal stored in association with the corresponding left edge signal from said next previous scan line for each identified continued object left boundary and to store said same object number signal in said memory in association with the left edge signal from said current scan line,
 v. means to generate the same object number signal stored in association with the corresponding right edge signal from said next previous scan line for each identified continued object right boundary and to store said same object number signal in said memory in association with the right edge signal from said current scan line.

70. The system according to claim 68 wherein said system further comprises:
 G. object tabulation means including means to generate and store type, status, and parent data for each identified object at a location in said memory associated with said object, and including means to update said stored type, parent and status data at least once per scan line, said tabulation means including:
  i. means to generate said type data in response to the identification of a new object in the current scan line, said type data being representative of a first type when said new object is a body object and of a second type when said new object is a hole object.
  ii. means to generate said status data, said status data being representative of:
   a. continuation status when continued left and right boundaries of said object are identified in said current scan line,
   b. termination status when said object is identified to be a terminated body or hole object in the current scan line,
   c. merge status when said object is identified in the current scan line to be a merged object,
  iii. means to generate said parent data for an identified new object in response to the identification of said new object in the current scan line, said parent data being representative of the object number of the next previous object currently having only a single edge signal identified when said new body is identified, and
  iv. means to update said parent data for two objects identified as merged objects in current scan line, said updated parent data being representative of the object number of a predetermined one of said merged objects.

71. The system according to claim 68 further comprising:
a boundary identification means for identifying the left, right, top and bottom edges defining each identified body object in a current scan line as that line is scanned, and for generating corresponding update edge point data and associated update line data, said update edge point data including:
 A. left edge data words representative of the position of regions in said current scan line identified as left edges of said identified body object,
 B. right edge data words representative of the position of regions in said current scan line identified as right edges of said identified body object,
 C. top edge data words representative of the position of regions in said current scan line including top edges of said identified body object,
 D. bottom edge data words representative of the position of regions in current scan line including bottom edges of said identified body object,
 E. a line data word representative of the relative position of said current scan line among said succession of scan lines for each of said left edge, right edge, top edge, and bottom edge data words.

72. The system according to claim 71 further comprising:
 A. projection data means for generating current top view edge point data and current top view line data for each identified body object in said current scan line as that line is scanned, said current top view data edge point data and current top view line data being representative of said update edge point data and update line data for the regions of said current scan line represented by said update data and being the same as the top view edge point data and top view line data of the next previous scan line for the remaining regions of said current scan line.

73. The system according to claim 72 further comprising:
neck feature identifying means operative as a current line is scanned to identify the position of internal neck features in said image for portions of each identified body object scanned by the previous lines of scan, including:

B. left edge neck extraction means, operative as a current line is scanned for each identified left edge in said current scan line, to:

i. determine and temporarily store data for the current line which is representative of the minimum of the distance, $D_L$, in said image between said identified left edge and the next identified right edge along said current scan line in said predetermined direction, and the distances between said identified left edge and all right edges identified in the previously scanned lines which are represented in said top view edge point and top view line data and are less than $D_L$ from said identified left edge, and which is further representative of the position of the end points which bound that minimum distance, ii. determine the distance in said image between each left edge identified in said previously scanned lines represented in said top view edge point and top view line data, and less than $D_L$ from and to the right of said identified left edge, and all right edges identified through the current scan line represented in said top view edge point and top view line data, and less than $D_L$ from, and to the right of said identified left edge, and when the distance from the left edge of one of said previously scanned lines to one of said right edges is less than the $D_L$ data previously stored for that line, replace said $D_L$ data previously stored for that line with replacement $D_L$ data representative of said lesser distance, and representative of the position of the end points which bound that distance, iii. identify as a left edge neck the portion of an identified body defined from a left edge in an identified scan line by the distance $D_L$ when said $D_L$ data monotonically decreased for scan lines immediately previous to and including said identified scan line, and monotonically increased for scan lines immediately following said identified scan line, C. right edge neck extraction means, operative as a current line is scanned for each identified right edge in said current scan line, to:

i. determine and temporarily store data for the current line which is representative of the minimum of the distance, $D_R$, in said image between said identified right edge and the next identified left edge along said current scan line in a direction opposite to said predetermined direction, and the distance between said identified right edge and all left edges identified in the previously scanned lines which are represented in said top view edge point and top view line data and are less than $D_R$ from said identified right edge, and which is further representative of the position of the end points which bound that minimum distance, ii. determine the distance in said image between each right edge identified in said previously scanned lines, represented in said top view edge point and top view line data, and less than $D_R$ from, and to the left of said identified right edge, and all left edges identified through the current scan line represented in said top view edge point and top view line data, and less than $D_R$ from, and to the left of said identified right edge, and when the distance from the right edge of one of said previously scanned lines to one of said left edges is less than the $D_R$ data previously stored for that line, replace said $D_R$ data previously stored for that line with replacement $D_R$ data representative of said lesser distance and representative of the position of the end points which bound that distance, iii. identify as a right edge neck the portion of an identified body defined from a right edge in an identified scan line by the distance $D_R$ when said $D_R$ data monotonically decreased for scan lines immediately previous to and including said identified scan line, and monotonically increased for scan lines immediately following said identified scan lines D. bottom edge neck extraction means, operative as a current line is scanned for each identified bottom edge in said current scan line, to:

i. determine and temporarily store data for said current line representative of the distance $D_B$ in said image between said identified bottom edge and a top edge identified at the same position along one of said previously scanned lines, and represented in said top view edges point and top view line data, ii. determine and temporarily store data for said current line representative of the distance $D_p$ in said image between an edge immediately preceding said identified bottom edge and an edge identified at the same position along one of said previously scanned lines, and represented in said top view edge point and top view line data, iii. determine and temporarily store data for said current line representative of the distance $D_S$ in said image between an edge immediately succeeding said identified bottom edge and an edge identified at the same position along one of said previously scanned lines and represented in said top view edge point and top view line data, iv. identify as a bottom edge neck the portion of an identified body defined from that identified bottom edge in said current scan line by the distance $D_B$ when said $D_p$ data monotonically decreased for identified edges immediately previous to and including said identified bottom edge, and said $D_S$ data monotonically increased for identified edges immediately following said identified bottom edge.

74. The system according to claim 76 further comprising:
body object area determining means operative as a current line is scanned to determine the number of regions between identified left and right edges for a body object in said current scan line, and to maintain a cumulative count from line to line of said numbers for the first through the current scan lines, said cumulative count being representative of the area, A, of the portion of said identified body object covered by those scan lines.

75. The system according to claim 71 further comprising:
body object perimeter determining means operative as a current line is scanned for maintaining a cumulative count from line to line of said identified left edges, right edges, top edges and bottom edges for an identified body object, said cumulative count being representative of the perimeter, P, of the portion of said identified body object covered by the first through the current scan lines.

76. The system according to claim 71 further comprising:
body object area determining means operative as a current line is scanned to determine the number of regions between identified left and right edges for a body object in said current scan line, and to maintain a cumulative count from line to line of said numbers for the first through the current scan lines, said cumulative count being representative of the area, A, of the portion of said identified body object covered by those scan lines.

77. The system according to claim 76 further comprising means to generate a signal representative of the ratio $P^2/A$.

78. The system according to claim 71 further comprising:
body object X-moment determining means operative as a current line is scanned for generating an incremental X-moment signal for an identified body object representative of the difference between the square of the position of the left edge of said body object in said current scan line and the square of the position of the right edge of said body object in said current scan line, and for maintaining a cumulative X-moment signal proportional to the sum of said incremental X-moment signals, said cumulative X-moment signal being representative of the first moment in the direction of the scan lines of the portion of said identified body object covered by the first through the current scan lines.

79. The system according to claim 71 further comprising:
body object Y-moment determining means operative as a current line is scanned for generating an incremental Y-moment signal for an identified body object representative of the product of the distance between said current and the first scan lines and the difference in position of the left and right edges of said body in said current scan line, and for maintaining a cumulative Y-moment signal proportional to the sum of said incremental Y-moment signals, said cumulative Y-moment signal being representative of the first moment in the direction perpendicular to the direction of said scan lines of the portion of said identified body object covered by the first through the current scan lines.

80. The system according to claim 68 further comprising:
segmentation feature identifying means operative as a current line is scanned for each identified edge to identify a portion of the boundary of the object associated with that identified edge as a primitive segment.

81. The system according to claim 80 wherein said segmentation feature identifying means includes:
first means operative in a current scan line in which a new object is identified, to identify the portion of said new object boundary in said current line as a directed reference segment,
second means operative in a current scan line following said line in which a new object is identified, to identify the portion of said new object which continues to said identified edge in said current line from a previously identified edge in the next previous line as a directed primitive segment.

82. The system according to claim 81 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
 i. convex segment when the difference in orientation is a first polarity,
 ii. concave segment when the difference in orientation is a second polarity, and
 iii. straight line segment when the difference in orientation is zero.

83. The system according to claim 82 wherein said means for identifying said current line primitive segment includes means for identifying a current segment as a continued portion of a previously identified segment when said difference in orientation determined for said current line is the same polarity as the corresponding difference in orientation determined for the next previous line.

84. The system according to claim 81 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a straight line segment.

85. The system according to claim 84 wherein said means for identifying said current line primitive segment includes means for identifying a current segment as a continued portion of a previously identified segment when said difference in orientation determined for said current line is the same polarity as the corresponding difference in orientation determined for the next previous line.

86. The system according to claim 81 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
 i. convex segment when the difference in orientation is a first polarity or zero, and
 ii. concave segment when the difference in orientation is a second polarity.

87. The system according to claim 86 wherein said means for identifying said current line primitive segment includes means for identifying a current segment as a continued portion of a previously identified segment when said difference in orientation determined for said current line is the same polarity as the corresponding difference in orientation determined for the next previous line.

88. The system according to claim 81 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
 i. convex segment when the difference in polarity is a first polarity, and
 ii. concave segment when the difference in polarity is a second polarity or zero.

89. The system according to claim 88 wherein said means for identifying said current line primitive segment includes means for identifying a current segment as a continued portion of a previously identified segment when said difference in orientation determined for said current line is the same polarity as the corresponding difference in orientation determined for the next previous line.

90. System for extracting features of one or more body objects against a background in a two dimensional image, said body objects having boundaries and being characterized within said boundaries by a value of a detectable characteristic in a first predetermined range, and said background being characterized by a value of said characteristic in a second predetermined range, and said image having a border characterized by a value of said characteristic in said first range, comprising:
 A. scanning means for scanning said image in a single pass along a succession of N substantially parallel lines of scan, where N is an integer,
 B. detection means operative in conjunction with said scanning means to detect the value of said characteristic of M contiguous regions of said image along each of said scan lines, where M is an integer,
 C. left edge identification means responsive to said detection means to identify left edge regions in each scan line as said lines are scanned, each of said left edge regions being the first region along said scan line which is characterized by a value of said characteristic in said first range and which follows a region characterized by a value of said characteristic in said second range, and to concurrently generate a left edge signal $X_{Li}(k)$ for each identified left edge region, said left edge signal being representative of the scan line k currently being scanned and in which said left edge region is identified, where k is an integer and $1 \leq k \leq N$, and being further representative of the displacement $X_L$ from the left boundary of said image and the sequential position i of said left edge region along said current scan line, where i is an integer and $1 \leq i \leq M/2$,
 D. right edge is identification means responsive to said detection means to identify right edge regions in each scan line as said lines are scanned, each of said right edge regions being the first region along said scan line which is characterized by a value of said characteristic in said second range, and which follows a region characterized by a value of said characteristic in said first range, and to concurrently generate a right edge signal $X_{Ri}(k)$ for each identified right edge region, said right edge signal being representative of the scan line k currently being scanned and in which said right edge region is identified, and being further representative of the displacement $X_R$ from the left edge of said image and the sequential position i of said pair in said current scan line,
 E. memory means for storing as generated said current ($k^{th}$) line left and right edge signals, $X_{L1}(k)$, $X_{L2}(k)$, ..., $X_{Li}(k)$, ... and $X_{R1}(k)$, $X_{R2}(k)$, ..., $X_{Ri}(k)$, ..., and means operative following the detection of the Mth region in said $k^{th}$ scan line for storing said $k^{th}$ line left and right edge signals as the next previous ($k-1^{th}$) line left and right edge signals, $X_{L1}(k-1)$, $X_{L2}(k-1)$, ..., $X_{Lj}(k-1)$, ..., and $X_{R1}(k-1)$, $X_{R2}(k-1)$, ..., $X_{Rj}(k-1)$, ..., where j is an integer and is representative of the sequential position of one of said edge signals in said $k-1^{th}$ line, and $1 \leq j \leq M/2$,
 F. object identification means operative as said $k^{th}$ line is scanned and in conjunction with said memory means to compare each stored $k^{th}$ line left and right edge signal with said stored $k-1^{th}$ line left and right edge signals, and to generate and store an object number signal in said memory in association with each $k^{th}$ line left and right edge signal, including:
 i. means to identify a new body object having a left boundary at $X_{Li+1}(k)$ when $X_{Ri+1}(k) < X_{Lj+1}(k-1)$ unless $X_{Ri-1}(k) < X_{Lj}(k-1) < X_{Ri}(k)$ $X_{Rj-1}(k-1) < X_{Li}(k) < X_{Rj}(k-1)$, and a right boundary at $X_{Ri+1}(k)$, and further including means to generate a unique object number signal for each identified new body object and to store said object number signal in said memory in association with $X_{Li+1}(k)$ and $X_{Ri+1}(k)$,
 ii. means to identify a new hole object having a left boundary at $X_{Ri}(k)$ when $X_{Li+1}(k) < X_{Rj}(k-1)$, unless $X_{Li}(k) < X_{Rj}(k-1) < X_{Li+1}(k)$ $X_{Lj}(k-1) < X_{Ri}(k) < X_{Lj+1}(k-1)$, and a right boundary at $X_{Li+1}(k)$, and further including means to generate a unique object number signal for each identified new hole object and means to store said object number signal in said memory in association with $X_{Li+1}(k)$ and $X_{Ri}(k)$,
 iii. means to identify an object boundary which continues from $X_{Lj}(k-1)$ to $X_{Li}(k)$ when $X_{Ri-1}(k) < X_{Lj}(k-1) < X_{Ri}(k)$ $X_{Rj-1}(k-1) < X_{Li}(k) < X_{Rj}(k-1)$ and means to generate the same object number signal stored in association with $X_{Lj}(k-1)$ for each identified continued object left boundary and means to store said same object number signal in said memory in association with $X_{Li}(k)$, iv. means to identify an object boundary which continues from $X_{Rj}(k-1)$ to $X_{Ri}(k)$ when $$X_{Li}(k) < X_{Rj}(k-1) < X_{Li+1}(k)$$

$$X_{Lj}(k-1) < X_{Ri}(k) < X_{Lj+1}(k-1)$$

and means to generate the same object number signal stored in association with $X_{Rj}(k-1)$ for each identified continued object right boundary and means to store said same object number signal in said memory in association with $X_{Ri}(k)$, v. means to identify a terminated body object when an object boundary at $X_{Lj}(k-1)$ is not continued at $X_{Li}(k)$ and $$X_{Rj}(k-1) < X_{Li}(k)$$

and the object number signals stored in association with $X_{Lj}(k-1)$ and $X_{Rj}(k-1)$ are identical, vi. means to identify a terminated hole object when an object boundary at $X_{Rj-1}(k-1)$ is not continued at $X_{Ri}(k)$ and $$X_{Lj}(k-1) < X_{Ri}(k)$$

and the object number signals stored in association with $X_{Rj-1}(k-1)$ and $X_{Lj}(k-1)$ are identical, vii. means to identify merged body objects when an object boundary at $X_{Rj-1}(k-1)$ is not continued at $X_{Ri}(k)$ and $$X_{Lj}(k-1) < X_{Ri}(k)$$

and the object number signals stored in association with $X_{Rj-1}(k-1)$ and $X_{Lj}(k-1)$ are representative of different body objects, viii. means to identify merged hole objects when an object boundary at $X_{Lj}(k-1)$ is not continued at $X_{Li}(k)$ and $$X_{Rj}(k-1) < X_{Li}(k)$$

and the object number signals stored in association with $X_{Lj}(k-1)$ and $X_{Rj}(k-1)$ are representative of different hole objects, ix. means to identify a hole object which merges with a body object when:
   a. an object boundary at $X_{Lj+1}(k-1)$ is not continued at $X_{Li+1}(k)$ and $$X_{Rj+1}(k-1) < X_{Li+1}(k)$$

and the object number signals stored in association with $X_{Lj+1}(k-1)$ is representative of a hole object and the object number signal stored in association with $X_{Rj+1}(k-1)$ is representative of a body object, or
   b. an object boundary at $X_{Lj}(k-1)$ is not continued at $X_{Li}(k)$ and $$X_{Rj}(k-1) < X_{Li}(k)$$

and the object number signals stored in association with $X_{Lj}(k-1)$ is representative of a body object and the object number signal stored in association with $X_{Rj}(k-1)$ is representative of a hole object, x. means to identify a body object which merges with a hole object when:
   a. an object left boundary at $X_{Rj}(k-1)$ is not continued at $X_{Ri}(k)$ and $$X_{Lj}(k-1) < X_{Ri}(k)$$

and the object number signal stored in association with $X_{Rj}(k-1)$ is representative of a body object and the object number signal stored in association with $X_{Lj+1}(k-1)$ is representative of a hole object, or
   b. an object boundary at $X_{Rj-1}(k-1)$ is not continued at $X_{Ri}(k)$ and $$X_{Lj}(k-1) < X_{Ri}(k)$$

and the object number signals stored in association with $X_{Rj-1}(k-1)$ is representative of a hole object and the object number signal stored in association with $X_{Lj}(k)$ is representative of a body object.

91. The system according to claim 90 wherein said system further comprises:
   G. object tabulation means including means to generate and store type, status, and parent data for each identified object at a location in said memory associated with said object, and including means to update said stored type, parent and status data at least once per scan line, said tabulation means including:
      i. means to generate said type data in response to the identification of a new object in the $k^{th}$ scan line, said type data being representative of a first type when said new object is a body object and of a second type when said new object is a hole object,
      ii. means to generate said status data, said status data being representative of:
         a. continuation status when continued left and right boundaries of said object are identified in said $k^{th}$ scan line,
         b. termination status when said object is identified to be a terminated body or hole object in the $k^{th}$ scan line,
         c. merge status when said object is identified in the $k^{th}$ scan line to be a body or hole object with which a body or hole object has merged,
      iii. means to generate said parent data for an identified new object in response to the identification of said new object in the $k^{th}$ scan line, said parent data being representative of the object number of the next previous object currently having only a single edge signal identified when said new body is identified, and
      iv. means to update said parent data for two objects identified as merged objects in the $k^{th}$ scan line, said updated parent data being representative of the object number of a predetermined one of said merged objects.

92. The system according to claim 90 further comprising:

a boundary identification means for identifying the left, right, top and bottom edges defining each identified body object in said $k^{th}$ scan line as said $k^{th}$ line is scanned, and for generating corresponding update edge point data and associated update line data, said update edge point data including:
A. left edge data words representative of:
  i. the position in said $k^{th}$ scan line of an identified left edge region, and
  ii. the position of each region in said $k^{th}$ scan line between an identified left edge region and the region in said $k^{th}$ scan line corresponding to an identified left edge region on an identified boundary continuing from said $k-1^{th}$ scan line to said identified left edge region,
B. right edge data words representative of:
  i. the position in said $k^{th}$ scan line of an identified right edge region, and
  ii. the position of each region in said $k^{th}$ scan line between an identified right edge region and the region in said $k^{th}$ scan line corresponding to an identified right edge region on an identified boundary continuing from said $k-1^{th}$ scan line to said identified right edge region,
C. top edge data words representative of:
  i. the position in said $k^{th}$ scan line of each region between the identified left and right edge regions in said $k^{th}$ scan line associated with a body object identified as a new body object in said $k^{th}$ scan line, and
  ii. the position in said $k^{th}$ scan line of each region between regions in said $k^{th}$ scan line corresponding to the identified right and left edge regions in said $k-1^{th}$ scan line associated with a hole object identified as terminated in said $k^{th}$ scan line,
  iii. the position in said $k^{th}$ scan line of each region between regions in said $k^{th}$ scan line corresponding to successive identified right edge and left edge regions in said $k-1^{th}$ scan line when said right edge and left edge regions are associated with body objects identified as merged in said $k^{th}$ scan line,
D. bottom edge data words representative of:
  i. the position in said $k^{th}$ scan line of each region between regions in said $k^{th}$ scan line corresponding to identified left edge and right edge regions in said $k-1^{th}$ scan line when said left and right edge regions are associated with a body object identified as terminated in said $k^{th}$ scan line,
  ii. the position in said $k^{th}$ scan line of each region between the identified right and left edge regions in said $k^{th}$ scan line associated with a hole object identified as a new hole object in said $k^{th}$ scan line,
  iii. the position in said $k^{th}$ scan line of each region in said $k^{th}$ scan line corresponding to successive identified left edge and right edge regions in said $k-1^{th}$ scan line when said left and right edge regions are associated with hole objects identified as merged in said $k^{th}$ scan line,
  iv. the position in said $k^{th}$ scan line of each region in said $k^{th}$ scan line corresponding to successive identified left edge and right edge regions in said $k-1^{th}$ scan line when said left and right edge regions are associated with hole and body objects identified as merged in said $k^{th}$ scan line,
E. a line data word representative of the identity of said $k^{th}$ scan line for each of said left edge, right edge, top edge, and bottom edge data words.

93. The system according to claim 92 further comprising:
A. projection data means for generating and storing current top view edge point and current top view line data for each identified body object in said $k^{th}$ scan line as said $k^{th}$ line is scanned, current top view edge point and top view line data being representative of:
  i. said generated update edge point and update line data for regions of said $k^{th}$ scan line for which said update edge point data is generated
  ii. the same edge point and line data in said top view line data for said $k-1^{th}$ scan line for the remaining regions of said $k^{th}$ scan line.

94. The system according to claim 93 further comprising: neck feature identifying means operative as the $k+1^{th}$ line is scanned to identify the position of internal nech features in said image for portions of an identified body object scanned by the first k of said lines of scan, including:
B. left edge neck extraction means, operative as the $k+1^{th}$ line is scanned for each identified left edge region in said $k+1^{th}$ scan line, to:
  i. determine and temporarily store data for the $k+1^{th}$ line representative of the minimum of the distance, $D_L$ in said image between that identified $k+1^{th}$ line left edge region and the next identified right edge region along said $k+1^{th}$ scan line in said predetermined direction, and the distances between that identified $k+1^{th}$ left edge region and all right edge regions identified in scan lines 1 through k which are represented in said top view edge point and top view line data and are less than $D_L$ from that identified $k+1^{th}$ line left edge region, and further representative of the position of the end points which bound that distance,
  ii. determine the distance in said image between each left edge region identified in scan lines 1 through k and represented in said top view edge point and top view line data, less than $D_L$ from and to the right of that identified $k+1^{th}$ line left edge region, and all right edge regions identified in scan lines 1 through $k+1$ represented in said top view edge point and top view line data, and less than $D_L$ from and to the right of that identified $k+1^{th}$ line left edge region, and when the distance from the left edge region of one of lines 1 through k to one of said right edge regions is less than the $D_L$ data previously stored for that line, replace said $D_L$ data previously stored for that line with replacement $D_L$ data representative of said lesser distance and the position of the end points which bound that distance,
  iii. identify as a left edge neck the portion of an identified body defined from a left edge in an identified scan line by the distance $D_L$ when said $D_L$ data monotonically decreased for scan lines immediately previous to and including said identified scan line, and monotonically increased for scan lines immediately following said identified scan line,
C. right edge neck extraction means, operative as the $k+1^{th}$ line is scanned for each identified right edge region in said $k+1^{th}$ scan line, to:

i. determine and temporarily store data for the $k+1^{th}$ line representative of the minimum of the distance $D_R$ in said image between that identified $k+1^{th}$ right edge region and the next identified left edge region along said $k+1^{th}$ scan line in a direction opposite to said predetermined direction, and the distances between that identified $k+1^{th}$ line right edge region and all left edge regions identified in scan lines 1 through k which are represented in said top view edge point and top view line data and are less than $D_R$ from that identified $k+1^{th}$ right edge region, and further representative of the position of the end points which bound that distance, ii. determine the distance in said image between each right edge region identified in scan lines 1 through k and represented in said top view edge point and top view line data, less than $D_R$ from and to the left of that identified $k+1^{th}$ line right edge region, and all left edge regions identified in scan lines 1 through $k+1$ represented in said top view edge point and top view line data, and less than $D_R$ from and to the left of that identified $k+1^{th}$ line right edge region, and when the distance from the right edge region of one of lines 1 through k to one of said left edge regions is less than the $D_R$ data previously stored for that line with replacement of $D_R$ data representative of said lesser distance and the position of the end points which bound that distance, iii. identify as a right edge neck the portion of an identified body defined from a right edge in an identified scan line by the distance $D_R$ when said $D_R$ data monotonically decreased for scan lines immediately previous to and including said identified scan line, and monotonically increased for scan lines immediately following said identified scan line, D. bottom edge neck extraction means, operative as the $k+1^{th}$ line is scanned for each identified bottom edge in said $k+1^{th}$ scan line, to:

i. determine and temporarily store data for the $k+1^{th}$ line representative of the distance $D_B$ in said image between that identified $k+1^{th}$ line bottom edge and a top edge identified at the same posiion along one of scan lines 1 through k and represented in said top view edge point and top view line data, ii. determine and temporarily store data for the $k+1^{th}$ line representative of the distance $D_p$ in said image between an edge immediately preceding said identified $k+1^{th}$ line bottom edge and an edge identified at the same position along one of scan lines 1 through k and represented in said top view edge point and top view line data, iii. determine and temporarily store data for the $k+1^{th}$ line representative of the distance $D_S$ in said image between an edge immediately succeeding said identified $k+^{th}$ line bottom edge and an edge identified at the same position along one of said scan lines 1 through k and represented in said top view edge point and top view line data, iv. identify as a bottom edge neck the portion of an identified body defined from that identified bottom edge in the $k+1^{th}$ scan line by the distance $D_B$ when said $D_P$ data monotonically decreased for identified edges immediately previous to and including said identified bottom edge, and said $D_S$ data monotonically increased for identified edges immediately following said identified bottom edge.

95. The system according to claim 90 further comprising:

segmentation feature identifying means operative as a current line is scanned for each identified edge to identify a portion of the boundary of the object associated with that identified edge as a primitive segment.

96. The system according to claim 95 wherein said segmentation feature identifying means includes:

first means operative in a current scan line in which a new object is identified, to identify the portion of said new object boundary in said current line as a directed reference segment, second means operative in a current scan line following said line in which a new object is identified, to identify the portion of said new object which continues to said identified edge in said current line from a previously identified edge in the next previous line as a directed primitive segment.

97. The system according to claim 96 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:

i. convex segment when the difference in orientation is a first polarity, ii. concave segment when the difference in orientation is a second polarity, and iii. straight line segment when the difference in orientation is zero.

98. The system according to claim 97 wherein said means for identifying said current line primitive segment including means for identifying a current segment as a continued portion of a previously identified segment when said difference in orientation determined for said current line is the same polarity as the corresponding difference in orientation determined for the next previous line.

99. The system according to claim 96 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a straight line segment.

100. The system according to claim 99 wherein said means for identifying said current line primitive segment includes means for identifying a current segment as a continued portion of a previously identified segment when said difference in orientation determined for said current line is the same polarity as the corresponding difference in orientation determined for the next previous line.

101. The system according to claim 96 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
  i. convex segment when the difference in orientation is a first polarity or zero, and
  ii. concave segment when the difference in orientation is a second polarity.

102. The system according to claim 101 wherein said means for identifying said current line primitive segment includes means for identifying a current segment as a continued portion of a previously identified segment when said difference in orientation determined for said current line is the same polarity as the corresponding difference in orientation determined for the next previous line.

103. The system according to claim 96 wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:
  i. convex segment when the difference in polarity is a first polarity, and
  ii. concave segment when the difference in polarity is a second polarity or zero.

104. The system according to claim 103 wherein said means for identifying said current line primitive segment includes means for identifying a current segment as a continued portion of a previously identified segment when said difference in orientation determined for said current line is the same polarity as the corresponding difference in orientation determined for the next previous line.

105. System for extracting features of one or more objects against a background in a two dimensional image, said objects having boundaries and being characterized within said boundaries by a value of a detectable characteristic in a first predetermined range, and said background being characterized by a value of said characteristic in a second predetermined range, comprising:
  A. means to scan said image in a single pass along a succession of substantially parallel lines,
  B. means to detect and identify boundaries of objects intercepted by said scan,
  C. means to generate and store boundary data for each of the two most recent lines of scan, said boundary data including:
    data representative of the position and type of edges of objects intercepted by said scan in said two most recent lines, said type being left, right, top or bottom,
  D. means to generate, and to update during each scan, top view data from said boundary data, said top view data being representative of the position in said image and type of the left, right, top or bottom edge of an object which is nearest to the current point of scan and which is located at the same point along a previous scan line as the current point of scan.

106. The system according to claim 105 further comprising:
  E. left edge neck extraction means, operative as a current line is scanned for each identified left edge in said current scan line, to:
    i. determine and temporarily store data for the current line which is representative of the minimum of the distance, $D_L$, in said image between said identified left edge and the next identified right edge along said current scan line in said predetermined direction, and the distances between said identified left edge and all right edges identified in the previously scanned lines which are represented in said top view data and are less than $D_L$ from said identified left edge, and which is further representative of the position of the end points which bound that minimum distance,
    ii. determine the distance in said image between each left edge identified in said previously scanned lines represented in said top view data, and less than $D_L$ from and to the right of said identified left edge, and all right edges identified through the current scan line represented in said top view data, and less than $D_L$ from, and to the right of said identified left edge, and when the distance from the left edge of one of said previously scanned lines to one of said right edges is less than the $D_L$ data previously stored for that line, replace said $D_L$ data previously stored for that line with replacement $D_L$ data representative of said lesser distance, and representative of the position of the end points which bound that distance,
    iii. identify as a left edge neck the portion of an identified body defined from a left edge in a scan line by the distance $D_L$ when said $D_L$ data monotonically decreased for scan lines immediately previous to and including said identified scan line, and monotonically increased for scan lines immediately following said identified scan line,
  F. right edge neck extraction means, operative as a current line is scanned for each identified right edge in said current scan line, to:
    i. determine and temporarily store data for the current line which is representative of the minimum of the distance, $D_R$, in said image between said identified right edge and the next identified left edge along said current scan line in a direction opposite to said predetermined direction, and the distance between said identified right edge and all left edges identified in the previously scanned lines which are represented in said top view data and are less than $D_R$ from said identified right edge, and which is further representative of the position of the end points which bound that minimum distance, ii. determine the distance in said image between each right edge identified in said previously scanned lines, represented in said top view data, and less than $D_R$ from, and to the left of said identified right edge, and all left edges identified through the current scan line represented in said top view data, and less than $D_R$ from, and to the left of said identified right edge, and when the distance from the right edge of one of said previously scanned lines to one of said left edges is less than the $D_R$ data previously stored for that line, replace said $D_R$ data previously stored for that line with replacement $D_R$ data representative of said lesser distance and representative of the position of the end points which bound that distance, iii. identify as a right edge neck the portion of an identified body defined from a right edge in an identified scan line by the distance $D_R$ when said $D_R$ data monotonically decreased for scan lines immediately previous to and including said identified scan line, and monotonically increased for scan lines immediately following said identified scan line, G. bottom edge neck extraction means, operative as a current line is scanned for each identified bottom edge in said current scan line, to:

i. determine and temporarily store data for said current line representative of the distance $D_B$ in said image between said identified bottom edge and a top edge identified at the same position along one of said previously scanned lines and represented in said top view data, ii. determine and temporarily store data for said current line representative of the distance $D_P$ in said image between an edge immediately preceding said identified bottom edge and an edge identified at the same position along one of said previously scanned lines, and represented in said top view data, iii. determine and temporarily store data for said current line representative of the distance $D_S$ in said image between an edge immediately succeeding said identified bottom edge and an edge identified at the same position along one of said previously scanned lines, and represented in said top view data, iv. identify as a bottom edge neck the portion of an identified body defined from that identified bottom edge in said current scan line by the distance $D_B$ when said $D_P$ data monotonically decreased for identified edges immediately previous to and including said identified bottom edge, and said $D_S$ data monotonically increased for identified edges immediately following said idenified bottom edge.

107. System for extracting features of one or more objects against a background in a digitized image forming a multiple cell array having M rows and N columns, said objects having boundaries and being characterized by cells of a first binary state, and said background being characterized by cells of a second binary state, comprising:

A. means to detect and identify boundaries of objects in a succession of contiguous pairs of adjacent rows of said image, B. means to generate and store boundary data for each of the most recent pairs of rows in said succession, said boundary data including:
data representative of the position and type of edges of objects intercepted by said two most recent rows, said type being left, right, top, or bottom, C. means to generate, and to update for each pair of rows, top view data from said boundary data, said top view data being representative of the cell position in said image and type of the left, right, top or bottom edge of an object which is both nearest to the respective cells in the most recent row of said succession and which is located at the same point along a previous row as the respective cells.

108. The system according to claim 107 further comprising:

D. left edge neck extraction means, responsive to the generated top view data for each pair of rows, and for each identified left edge in said most recent row, to:

i. determine and temporarily store data for said most recent row which is representative of the minimum of the distance, $D_L$, in said image between said identified left edge and the next identified right edge along said most recent row in said predetermined direction, and the distances between said identified left edge and all right edges identified in the previously scanned line which are represented in said top view data and are less than $D_L$ from said identified left edge, and which is further representative of the position of the cells which bound that minimum distance, ii. determine the distance in said image between each left edge identified in the previous rows represented in said top view data, and less than $D_L$ from and to the right of said identified left edge, and all right edges identified through said most recent row represented in said top view data, and less than DL from, and to the right of said identified left edge, and when the distance from the left edge of one of said previous rows to one of said right edges is less than the $D_L$ data previously stored for that row, replace said $D_L$ data previously stored for that row with replacement $D_L$ data representative of said lesser distance, and representative of the position of the cells which bound that distance, iii. identify as a left edge neck the portion of an identified body defined from a left edge in an identified row by the distance $D_L$ when said $D_L$ data monotonically decreased for rows immediately previous to an including said identified row, and monotonically increased for rows immediately following said identified row, F. right edge neck extraction means, responsive to the generated top view data for each pair of rows, and for each identified right edge in said most recent row, to:

i. determine and temporarily store data for said most recent row which is representative of the minimum of the distance, $D_R$, in said image between said identified right edge and the next identified left edge along said most recent row in a direction opposite to said predetermined direction, and the distance between said identified right edge and all left edges identified in the previous rows which are represented in said top view data and are less than $D_R$ from said identified right edge, and which is further representative of the position of the cells which bound that minimum distance, ii. determine the distance in said image between each right edge identified in said previous rows, represented in said top view data, and less than $D_R$ from, and to the left of said identified right edge, and all left edges identified through said most recent row represented in said top view data, and less than $D_R$ from, and to the left of said identified right edge, and when the distance from the right edge of one of said previous rows to one of said left edges is less than the $D_R$ data previously stored for that line, replace said $D_R$ data previously stored for that row with replacement $D_R$ data representative of said lesser distance and representative of the position of the cells which bound that distance, iii. identify as a right edge neck the portion of an identified body defined from a right edge in an identified row by the distance $D_R$ when said $D_R$ data monotonically decreased for rows immediately previous to and including said identified row, and monotonically increased for rows immediately following said identified row, G. bottom edge neck extraction means, responsive to the generated top view data for each pair of rows, and for each identified bottom edge in said most recent row, to:

i. determine and temporarily store data for said most recent row representative of the distance $D_B$ in said image between said identified bottom edge and a top edge identified at the same position along one of said previous rows and represented in said top view data, ii. determine and temporarily store data for said most recent row representative of the distance $D_P$ in said image between an edge immediately preceding said identified bottom edge and an edge identified at the same position along one of said previous rows, and represented in said top view data, iii. determine and temporarily store data for said most recent row representative of the distance $D_S$ in said image between an edge immediately succeeding said identified bottom edge and an edge identified at the same position along one of said previous rows, and represented in said top view data, and iv. identify as a bottom edge neck the portion of an identified body defined from that identified bottom edge in said most recent row by the distance $D_B$ when said $D_P$ data monotonically decreased for identified edges immediately previous to and including said identified bottom edge, and said $D_S$ data monotonically increased for identified edges immediately following said identified bottom edge.

109. System for extracting features of one or more objects against a background in a digitized image forming a multiple cell array having M rows and N columns, said objects having boundaries and being characterized by cells of a first binary state, and said background being characterized by cells of a second binary state, comprising:

A. means to detect and identify edges of objects in a succession of contiguous pairs of adjacent rows of said image, and B. segmentation feature identifying means operative as a current line is scanned for each identified edge to identify a portion of the boundary of the object associated with that identified edge as a primitive segment, wherein said segmentation feature identifying means includes:

means to identify a new object in said current scan line, first means operative in a current scan line in which a new object is identified, to identify the portion of said new object boundary in said current line as a directed reference segment, second means operative in a current scan line following said line in which a new object is identified, to identify the portion of said new object which continues to said identified edge in said current line from a previously identified edge in the next previous line as a directed primitive segment, wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said parviously identified edge, and means for identifying said current line primitive segment as a:

i. convex segment when the difference in orientation is a first polarity ii. concave segment when the difference in orientation is a second polarity, and iii. straight line segment when the difference in orientation is zero.

110. The system according to claim 109 wherein said means for identifying said current line primitive segment includes means for identifying a current segment as a continued portion of a previously identified segment when said difference in orientation determined for said current line is the same polarity as the corresponding difference in orientation determined for the next previous line.

111. System for extracting features of one or more objects against a background in a digitized image forming a multiple cell array having M rows and N columns, said objects having boundaries and being characterized by cells of a first binary state, and said background being characterized by cells of a second binary state, comprising:

A. means to detect and identify edges of objects in a succession of contiguous pairs of adjacent rows of said image, and B. segmentation feature identifying means operative as a current line is scanned for each identified edge to identify a portion of the boundary of the object associated with that identified edge as a primitive segment, wherein said segmentation feature identifying means includes:

means to identify a new object in said current scan line, first means operative in a current scan line in which a new object is identified, to identify the portion of said new object boundary in said current line as a directed reference segment, second means operative in a current scan line following said line in which a new object is identified, to identify the portion of said new object which continues to said identified edge in said current line from a previously identified edge in the next previous line as a directed primitive segment, wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the cprresponding angular orientation of the directed primitive segment of the next previous line which is bounded by said previously identified edge, and means for identifying said current line primitive segment as a straight line segment.

112. The system according to claim 111 wherein said means for identifying said current line primitive segment includes means for identifying a current segment as a continued portion of a previously identified segment when said difference in orientation determined for said current line is the same polarity as the corresponding difference in orientation determined for the next previous line.

113. System for extracting features of one or more objects against a background in a digitized image forming a multiple cell array having M rows and N columns, said objects having boundaries and being characterized by cells of a first binary state, and said background being characterized by cells of a second binary state, comprising:

A. means to detect and identify edges of objects in a succession of contiguous pairs of adjacent rows of said image, and B. segmentation feature identifying means operative as a current line is scanned by each identified edge to identify a portion of the boundary of the object associated with that identified edge as a primitive segment, wherein said segmentation feature identifying means includes:

means to identify a new object in said current scan line, first means operative in a current scan line in which a new object is identified, to identify the portion of said new object boundary in said current line as a directed reference segment, second means operative in a current scan line following said line in which a new object is identified, to identify the portion of said new object which continues to said identified edge in said current line from a previously identified edge in the next previous line as a directed primitive segment, wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:

i. convex segment when the difference in orientation is a first polarity or zero, and ii. concave segment when the difference in orientation is a second polarity.

114. The system according to claim 113 wherein said means for identifying said current line primitive segment includes means for identifying a current segment as a continued portion of a previously identified segment when said difference in orientation determined for said current line is the same polarity as the corresponding difference in orientation determined for the next previous line.

115. System for extracting features of one or more objects against a background in a digitized image forming a multiple cell array having M rows and N columns, said objects having boundaries and being characterized by cells of a first binary state, and said backgound being characterized by cells of a second binary state, comprising:

A. means to detect and identify edges of objects in a succession of contiguous pairs of adjacent rows of said image, and B. segmentation feature identifying means operative as a current line is scanned for each identified edge to identify a portion of the boundary of the object associated with that identified edge as a primitive segment, wherein said segmentation feature identifying means includes:

means to identify a new object in said current scan line, first means operative in a current scan line in which a new object is identified, to identify the portion of said new object boundary in said current line as a directed reference segment, second means operative in a current scan line following said line in which a new object is identified, to identify the portion of said new object which continues to said identified edge in said current line from a previously identified edge in the next previous line as a directed primitive segment, wherein said second means includes means operative in a current scan line for determining the angular orientation of a current line directed primitive segment extending between said identified edge in said current line and said previously identified edge with respect to said reference segment, and means for determining the difference between said angular orientation of said current line primitive segment and the corresponding angular orientation of the directed primitive segment of the next previous line which is bounded by said previously identified edge, and means for identifying said current line primitive segment as a:

i. convex segment when the difference in polarity is a first polarity, and ii. concave segment when the difference in polarity is a second polarity or zero.

116. The system according to claim 115 wherein said means for identifying said current line primitive segment includes means for identifying a current segment as a continued portion of a previously identified segment when said difference in orientation determined for said current line is the same polarity as the corresponding difference in orientation determined for the next previous line.

* * * * *